(12) United States Patent
Grinkemeyer et al.

(10) Patent No.: US 11,258,679 B2
(45) Date of Patent: *Feb. 22, 2022

(54) SYSTEMS AND METHODS FOR AUTOMATED TESTING OF MOCA NETWORKS

(71) Applicant: Spirent Communications, Inc., San Jose, CA (US)

(72) Inventors: Douglas Grinkemeyer, Germantown, MD (US); David Dailey, Boyds, MD (US)

(73) Assignee: SPIRENT COMMUNICATIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,672

(22) Filed: Aug. 6, 2019

(65) Prior Publication Data

US 2020/0145301 A1      May 7, 2020

Related U.S. Application Data

(63) Continuation-in-part of application No. 16/184,889, filed on Nov. 8, 2018, now Pat. No. 10,742,523, which is a continuation of application No. 15/592,173, filed on May 10, 2017, now Pat. No. 10,129,102, application No. 16/533,672, filed on
(Continued)

(51) Int. Cl.
*H04L 12/24*      (2006.01)
*H04L 43/55*      (2022.01)
*H04L 43/50*      (2022.01)
*H04L 43/0829*      (2022.01)
*H04H 20/12*      (2008.01)
(Continued)

(52) U.S. Cl.
CPC ........ *H04L 41/5038* (2013.01); *H04H 20/12* (2013.01); *H04L 43/0829* (2013.01); *H04L 43/0835* (2013.01); *H04L 43/0852* (2013.01); *H04L 43/50* (2013.01); *H04W 84/12* (2013.01)

(58) Field of Classification Search
CPC .................................................. H04L 41/5038
See application file for complete search history.

(56) References Cited

U.S. PATENT DOCUMENTS 4,484,218 A    11/1984   Boland et al.
6,889,255 B1    5/2005   DeLuca
(Continued)

OTHER PUBLICATIONS

U.S. Appl. No. 14/810,898—Pre-Appeal Brief after Final Office Action dated Sep. 21, 2018, filed Mar. 20, 2019, 5 pages.
(Continued)

*Primary Examiner* — Jason E Mattis
(74) *Attorney, Agent, or Firm* — Haynes Beffel & Wolfeld LLP; Ernest J. Beffel, Jr.; Andrew L. Dunlap

(57) ABSTRACT

The present invention relates to testing signals on a coaxial home network that carries a digital video signal. It has direct application to testing Multimedia over Coax Alliance (MoCA) standards-compliant networks and applies to similar networks such as Data Over Cable Service Interface Specification (DOCSIS), Ethernet, and Wi-Fi. An embedded expert system can guide an inexperienced operator through the process of evaluating and resolving problems with a home network with little operator input.

12 Claims, 28 Drawing Sheets

Related U.S. Application Data

Aug. 6, 2019, which is a continuation-in-part of application No. 15/456,313, filed on Mar. 10, 2017, now Pat. No. 10,382,314, application No. 16/533,672, filed on Aug. 6, 2019, which is a continuation-in-part of application No. 14/810,898, filed on Jul. 28, 2015, now Pat. No. 10,448,007.

(60) Provisional application No. 62/334,873, filed on May 11, 2016, provisional application No. 62/307,392, filed on Mar. 11, 2016.

(51) Int. Cl.
*H04L 43/0852* (2022.01)
*H04W 84/12* (2009.01)

(56) References Cited

U.S. PATENT DOCUMENTS

| | | | |
|---|---|---|---|
| 6,891,803 | B1 | 5/2005 | Chang et al. |
| 7,075,981 | B1 | 7/2006 | Clark |
| 7,212,490 | B1 | 5/2007 | Kao et al. |
| 7,212,496 | B1 | 5/2007 | Chong |
| 7,433,925 | B1 | 10/2008 | Shankar et al. |
| 7,459,898 | B1 | 12/2008 | Woodings |
| 7,587,029 | B2 | 9/2009 | Pepper et al. |
| 7,964,989 | B1 | 6/2011 | Puschnigg et al. |
| 8,040,901 | B1 | 10/2011 | Kompella et al. |
| 8,146,125 | B2 | 3/2012 | Grinkemeyer et al. |
| 8,179,838 | B2 | 5/2012 | Tang et al. |
| 8,767,688 | B2 | 7/2014 | Qian et al. |
| 9,191,282 | B2 | 11/2015 | Kakadia et al. |
| 10,033,618 | B1 | 7/2018 | Grinkemeyer et al. |
| 10,129,102 | B2 * | 11/2018 | Grinkemeyer ...... H04L 43/0829 |
| 10,348,602 | B2 | 7/2019 | Grinkemeyer et al. |
| 10,742,523 | B2 * | 8/2020 | Grinkemeyer ......... H04H 20/12 |
| 2002/0010854 | A1 | 1/2002 | Ogura et al. |
| 2004/0073437 | A1 | 4/2004 | Halgas et al. |
| 2004/0124864 | A1 | 7/2004 | Feld et al. |
| 2006/0221876 | A1 | 10/2006 | Kosanovic et al. |
| 2006/0234698 | A1 | 10/2006 | Fok et al. |
| 2006/0264178 | A1 | 11/2006 | Noble et al. |
| 2007/0121712 | A1 | 5/2007 | Okamoto |
| 2007/0180485 | A1 | 8/2007 | Dua |
| 2007/0234135 | A1 | 10/2007 | Boyes et al. |
| 2008/0013612 | A1 | 1/2008 | Miller et al. |
| 2008/0089239 | A1 | 4/2008 | Todd et al. |
| 2008/0120675 | A1 | 5/2008 | Morad et al. |
| 2008/0285476 | A1 | 11/2008 | Rajakarunanayake |
| 2009/0031185 | A1 | 1/2009 | Xhafa et al. |
| 2009/0046595 | A1 | 2/2009 | Clark |
| 2009/0059933 | A1 * | 3/2009 | Huang ................... H04L 43/50 370/401 |
| 2009/0113045 | A1 | 4/2009 | Kozisek |
| 2009/0147719 | A1 | 6/2009 | Kang |
| 2009/0248794 | A1 | 10/2009 | Helms et al. |
| 2009/0282455 | A1 | 11/2009 | Bell et al. |
| 2009/0296584 | A1 | 12/2009 | Bernard et al. |
| 2009/0303876 | A1 | 12/2009 | Wu |
| 2009/0328098 | A1 | 12/2009 | Beyabani |
| 2010/0020685 | A1 | 1/2010 | Short et al. |
| 2010/0150319 | A1 | 6/2010 | Irenze et al. |
| 2010/0299713 | A1 | 11/2010 | Salinger et al. |
| 2010/0312889 | A1 | 12/2010 | Mori |
| 2010/0315942 | A1 | 12/2010 | Jackson et al. |
| 2010/0324855 | A1 | 12/2010 | Parker |
| 2011/0001833 | A1 | 1/2011 | Grinkemeyer et al. |
| 2011/0022641 | A1 | 1/2011 | Werth et al. |
| 2011/0055632 | A1 | 3/2011 | Zimmerman |
| 2011/0107220 | A1 | 5/2011 | Perlman |
| 2011/0107389 | A1 | 5/2011 | Chakarapani |
| 2011/0125897 | A1 | 5/2011 | Qian et al. |
| 2011/0149720 | A1 | 6/2011 | Phuah et al. |
| 2012/0078994 | A1 | 3/2012 | Jackowski et al. |
| 2012/0140641 | A1 | 6/2012 | Reese et al. |
| 2012/0155358 | A1 | 6/2012 | Hao et al. |
| 2012/0207030 | A1 | 8/2012 | Luong |
| 2012/0239794 | A1 | 9/2012 | Klein |
| 2013/0117442 | A1 | 5/2013 | Mountain |
| 2013/0191570 | A1 | 7/2013 | Lee et al. |
| 2013/0198361 | A1 | 8/2013 | Matsuzaki et al. |
| 2013/0222640 | A1 | 8/2013 | Baek et al. |
| 2013/0279333 | A1 | 10/2013 | Aharbi et al. |
| 2013/0322462 | A1 | 12/2013 | Poulsen |
| 2013/0343467 | A1 | 12/2013 | Sogani et al. |
| 2014/0010889 | A1 | 1/2014 | Minatelli et al. |
| 2014/0105036 | A1 | 4/2014 | Anschutz |
| 2014/0130111 | A1 | 5/2014 | Nulty et al. |
| 2014/0156226 | A1 | 6/2014 | Hashemian et al. |
| 2014/0187173 | A1 | 7/2014 | Partee |
| 2014/0254392 | A1 | 9/2014 | Wolcott et al. |
| 2014/0359389 | A1 | 12/2014 | Seastrom et al. |
| 2015/0029869 | A1 | 1/2015 | Wolcott et al. |
| 2015/0058691 | A1 | 2/2015 | Olgaard et al. |
| 2015/0063133 | A1 | 3/2015 | Olgaard et al. |
| 2015/0249603 | A1 | 9/2015 | Tompkins et al. |
| 2015/0249620 | A1 | 9/2015 | Folsom et al. |
| 2016/0044695 | A1 | 2/2016 | Gunner |
| 2017/0094703 | A1 | 3/2017 | Matsuda |
| 2017/0149645 | A1 * | 5/2017 | Kumar ..................... H04L 43/12 |
| 2017/0264502 | A1 | 9/2017 | Kahkoska et al. |
| 2017/0302994 | A1 | 10/2017 | Kumar et al. |
| 2019/0075033 | A1 | 3/2019 | Grinkemeyer |

OTHER PUBLICATIONS

U.S. Appl. No. 14/810,898—Notice of Allowance dated Jun. 4, 2019, 9 pages.
U.S. Appl. No. 14/810,898—Pre-Appeal Brief after Final Offie Action dated Sep. 21, 2018, filed Mar. 20, 2019, 5 pages.
U.S. Appl. No. 14/810,898—Notice of Allowane dated Jun. 4, 2019, 9 pages.
U.S. Appl. No. 15/592,173—Notice of Allowance dated Jul. 12, 2018, 9 pages.
Wireless Broadband Router MI424WR, Rev. 1 User Manual, Verizon, 2011, 205 pages.
Hardware Design Guide, MoCA 2.0 Network Interface using the EN2710, EN1410 and EN 1050 Chip Set, Entropic Communications, 2011, 46 pages.
Ethernet to Coax MoCA Network Adapter model ECB2200, Actiontec.com, 2009, 2 pages.
Spirent Tech-X Flex Field Test Solution for Telcos and MSOs, Spirent Communications, 2012, 4 pages.
The Future of MPEG Video Transport Over QAM, CED magazine, Dec. 4, 2013, 10 pages, accssed at (http://www.cedmagazine.com/article/2013/01/future-mpeg-video-transport-over-qam).
Deploying Enhanced Media Services with MoCA, The Challenges and Rewards of MoCA Deployment for the Home Network, Society of Cable Telecommunications Engineers, 2009, 29 pages, accessed at (http://www.mocalliance.org/marketing/whitepapers/Branded_Implication_Paper_MoCA.pdf).
Telchemy—VQmon/EP, VQmon Performance, accessed on Dec. 30, 2008 at http://www.telechemy.com/vqmonperf.html, pp. 1-4.
Clark, Alan, "Non-Intrusive Monitoring of VoIP Call Quality," Telechemy Incorporated, 2002, pp. 1-29.
VQmon/SA-VM 2.2, Telchemy, Incorporated, 2006, pp. 1-2.
CompuLab Products page: CM-X270 Computer-On-Module, accessed on Dec. 30, 2008 at http://www.compuland.co.il/x270cm/html/x270-cm-datasheet.htm, pp. 1-4.
Stascheit, Bernhard, et al., "The Use of Ethernet-Over-Coax in HFC Networks", 2007, 5 pgs.
U.S. Appl. No. 12/496,545—Non-final Office Action dated Jul. 21, 2011, 19 pages.
U.S. Appl. No. 12/496,545—Response to Non-final Office Action dated Jul. 21, 2011, dated Oct. 20, 2011 12 pages.
JS U.S. Appl. No. 12/496,545—Notice of Allowance dated Nov. 30, 2011, dated Oct. 20, 2011, 8 pages.
U.S. Appl. No. 13/353,026—Non-final Office action dated Nov. 26, 2014, 21 pages.

(56) References Cited

OTHER PUBLICATIONS

U.S. Appl. No. 13/353,026—Response to Non-final Office action dated Nov. 26, 2014 dated May 22, 2015, 78 pages.
U.S. Appl. No. 13/353,026—Non-final Office action dated Sep. 28, 2015, 50 pages.
U.S. Appl. No. 13/353,026—Response to Non-final Office action dated Sep. 28, 2015, dated Jan. 28, 2016, 28 pages.
U.S. Appl. No. 13/353,026—Final Office action dated May 19, 2016, 49 pages.
U.S. Appl. No. 13/353,026—Response to Final Office action dated May 19, 2016, dated Jul. 25, 2016, 53 pages.
U.S. Appl. No. 13/353,026—Advisory action dated Sep. 6, 2016, 10 pages.
U.S. Appl. No. 13/353,026—Rule 131 Affidavit filed Feb. 16, 2017, Sep. 6, 2016, 175 pages.
U.S. Appl. No. 13/353,026—Non-final Office action dated Mar. 8, 2017, 30 pages.
Monk, A., et al., "The Multimedia Over Coax Alliance," Proceedings of the IEEE, San Diego, CA, Copyright 2013, 17 pages.
"MoCA Installation and Troubleshooting Reference Guide," Cisco Systems Inc., Lawrenceville, GA, Copyright Aug. 2012, 26 pages.
Ansley, C., MoCA Troubleshooting Experiences, Recommendations for Efficient Installations, Suwanee, GA, Retrieved online: <http://www.arrisi.com/dig_lib/white_papers/_docs/MoCA_Troubleshooting.pdf>, accessed Jan. 20, 2015, 17 pages.
"MoCA Networking FAQ and Troubleshooting," TiVo Inc., Copyright 2013, Retrieved online: <http://support.tivo.com/app/answers/detail/a_id/2412>, accessed Jan. 20, 2015, 3 pages.
U.S. Appl. No. 14/810,898—Non-final Office Action dated Jul. 28, 2016, 20 pages.
U.S. Appl. No. 14/810,898—Non-final Office Action dated Jul. 28, 2016, filed Aug. 24, 2016, 9 pages.
U.S. Appl. No. 14/810,898—Final Office Action dated Sep. 23, 2016, 21 pages.
U.S. Appl. No. 14/810,898—Response to Final Office Action dated Sep. 23, 2016, filed Nov. 17, 2016, 8 pages.
"CPE WAN Management Protocol v1.1—TR-069," Broadband Forum, Technical Report, Version 1 Amendment 2, Version Date of Dec. 2007, 138 pages.
U.S. Appl. No. 14/810,898—Advisory Action dated Dec. 9, 2016, 7 pages.
U.S. Appl. No. 13/353,026—Response to Non-final Office action dated Mar. 8, 2017, filed Jul. 31, 2017, 16 pages.
U.S. Appl. No. 13/353,026—Final Office action dated Nov. 2, 2017, 40 pages.
U.S. Appl. No. 13/353,026—Response to Final Office action dated Nov. 2, 2017, filed Jan. 29, 2018, 13 pages.
U.S. Appl. No. 13/353,026—Notice of Allowance dated Mar. 28, 2018, 18 pages.
U.S. Appl. No. 14/810,898—Response to Final Office Action dated Sep. 23, 2016, filed Dec. 23, 2016, 13 pages.
U.S. Appl. No. 14/810,898—Non-Final Office Action dated Aug. 29, 2016, 31 pages.
U.S. Appl. No. 14/810,898—Response to Non-Final Office Action dated Aug. 29, 2017, filed Feb. 28, 2018, 13 pages.
U.S. Appl. No. 15/456,313—Notice of Allowance dated Apr. 2, 2019, 20 pages.
U.S. Appl. No. 13/353,026—Final Office action dated Nov. 1, 2017, 40 pages.
U.S. Appl. No. 13/353,026—Response to Final Office action dated Nov. 1, 2017, filed Jan. 29, 2018, 13 pages.
U.S. Appl. No. 13/353,026—Notice of Allowance dated Mar. 28, 2019, 18 pages.
U.S. Appl. No. 14/810,898—Nonfinal Office Action dated Sep. 11, 2018, 20 pages.
U.S. Appl. No. 14/810,898—Response to Nonfinal Office Action dated Sep. 11, 2018, filed Dec. 11, 2018, 8 pages.
U.S. Appl. No. 14/810,898—Notice of Allowance dated Feb. 6, 2019, 27 pages.
U.S. Appl. No. 14/810,898—Office Action dated Aug. 29, 2017, 31 pages.
U.S. Appl. No. 14/810,898—Response to Office Action dated Aug. 29, 2017, filed Feb. 28, 2018, 13 pages.
U.S. Appl. No. 14/810,898—Final Office Action dated Sep. 21, 2018, 30 pages.
U.S. Appl. No. 12/496,545—Notice of Allowance dated Nov. 30, 2011, dated Oct. 20, 2011, 8 pages.
U.S. Appl. No. 16/184,889—Office Action dated Nov. 27, 2019, 15 pages.
U.S. Appl. No. 16/184,889—Notice of Allowance dated Apr. 8, 2020, 27 pages.

\* cited by examiner

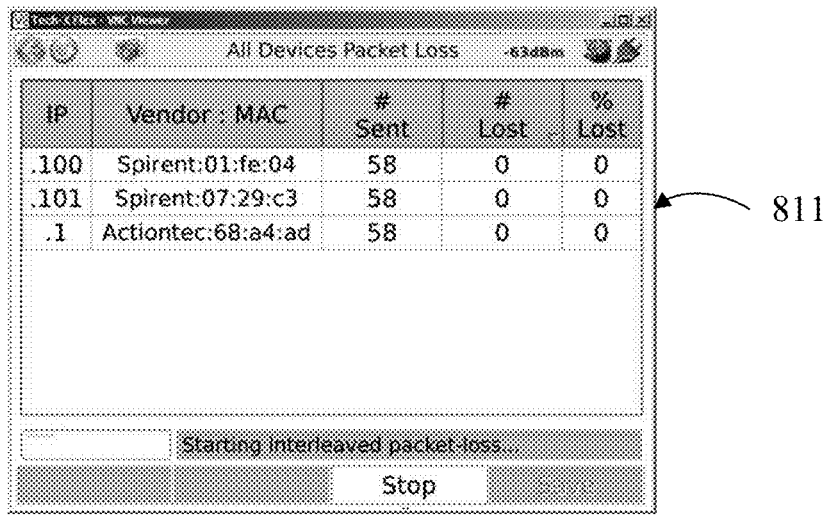
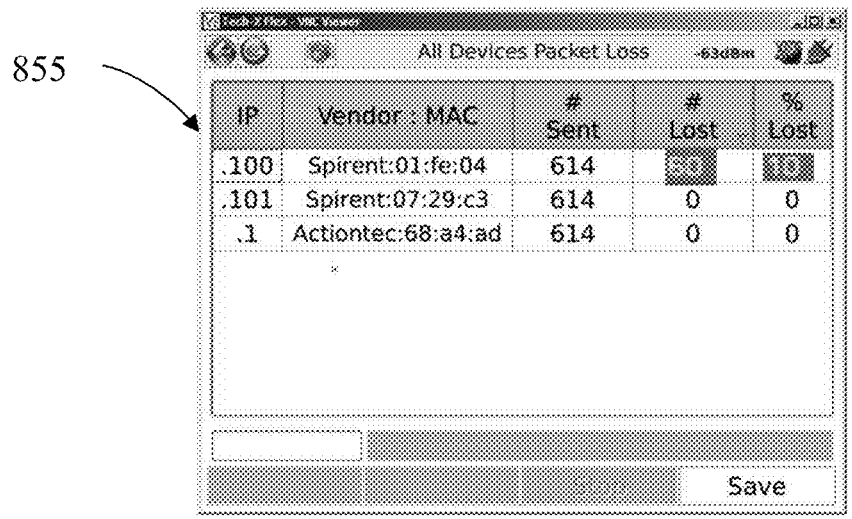
Packet Loss
FIG. 8

Configuring thresholds

FIG. 17A

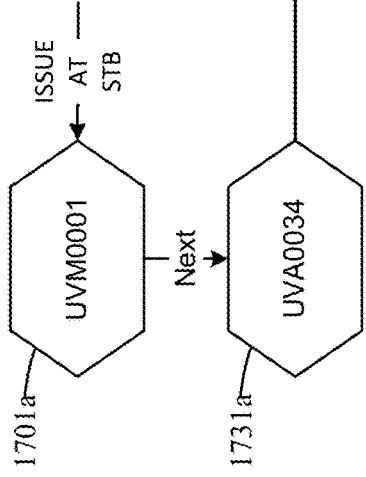

FIG. 17B

| UVM0001 | 701b | Play animation showing Replace Device Under test with Flex |
|---|---|---|
| UVA0034 | 731b | Set instance variable to 1 |
| TTA0000-0 | 725b | Perform test clean-up (MultiDVR only) |
| TTA0002-0 | 727b | Enable MoCA Module |
| TTM0001-0 | 747b | Join MoCA A-Side LAN |
| TTA0021-0 | 767b | Acquires DHCP IP Address with Option 60 of IP-STB |
| UVA0010 | 759b | Maps AutoRoutinesCompleted variable to flow input |
| TTA0030-0 | 788b | Sets IP Filter variable to previously set DVR IP |
| TTM0005-0 | 776b | Retrieves all IP's on current subnet |
| Continue | 786b | Continue to subsequent test steps |

SYSTEMS AND METHODS FOR AUTOMATED TESTING OF MOCA NETWORKS

PRIORITY

This application is a continuation-in-part of U.S. patent application Ser. No. 15/456,313, titled "SYSTEMS AND METHODS FOR AUTOMATED TESTING OF MOCA NETWORKS", filed 10 Mar. 2017, now U.S. Pat. No. 10,382,314 issued 13 Aug. 2019, which claims priority to and the benefit of U.S. Provisional Application No. 62/307,392, titled "SYSTEMS AND METHODS FOR AUTOMATED TESTING OF MOCA NETWORKS" filed 11 Mar. 2016.

This application is also a continuation-in-part of U.S. patent application Ser. No. 14/810,898 titled "DISCOVERY AND IDENTIFICATION OF LAYER 2 COAX PROBLEMS IN MOCA NETWORKS", filed 28 Jul. 2015.

This application is also a continuation-in-part of U.S. patent application Ser. No. 16/184,889 entitled "SERVICE BASED TESTING", filed 8 Nov. 2018 which is a continuation of U.S. application Ser. No. 15/592,173 entitled "SERVICE BASED TESTING", filed on 10 May 2017, now U.S. Pat. No. 10,129,102, issued 13 Nov. 2018, which claims the benefit of U.S. Provisional Patent Application No. 62/334,873, entitled "SERVICE BASED TESTING", filed on 11 May 2016.

The priority applications are incorporated by reference for all purposes.

RELATED APPLICATIONS

This application is related to U.S. Pat. No. 8,146,125, entitled, "COMPUTERIZED DEVICE AND METHOD FOR ANALYZING SIGNALS IN A MULTIMEDIA OVER COAX ALLIANCE (MOCA) NETWORK AND SIMILAR TDM/ENCRYPTED NETWORKS", filed 27 Mar. 2012.

This application is related to U.S. patent application Ser. No. 13/353,026, entitled "SYSTEMS AND METHODS FOR EVALUATING CUSTOMER PREMISES NETWORKS", filed 18 Jan. 2012, now U.S. Pat. No. 10,033,618, issued 24 Jul. 2018.

This application is related to U.S. patent application Ser. No. 16/015,092, entitled "SYSTEMS AND METHODS FOR EVALUATING CUSTOMER PREMISES NETWORKS", filed 21 Jun. 2018, now U.S. Pat. No. 10,348,602, issued 9 Jul. 2019.

The related applications are incorporated by reference for all purposes.

BACKGROUND

This application relates to testing of small networks. In particular, the technology described is useful for testing a coaxial-cabled network running a protocol such as MoCA.

Many service providers compete to deliver video to the home or business. As home networks become more prevalent and consumers/small businesses tend to have some kind of network in place, providers take on responsibility for delivery of services across customer-provided networks. Multimedia over Coax Alliance (MoCA) is an industry standard for enabling whole-home distribution of high definition video and content over existing in-home coaxial cabling. Service providers need diagnostic tools to troubleshoot failures in video delivery to a television, video monitor, or set-top box.

There are several challenges of troubleshooting video delivery in a MoCA network. One challenge of troubleshooting video delivery is servicing multiple set-top boxes and other devices in the local network. Another challenge is that coaxial cable can be degraded by the addition of splitters and devices that cause interference. Current instrumentation, such as a digital voltage ohm meter, an RF tester, an optical loss meter, or even a spectrum analyzer have proven inadequate for the task. These tools are not designed to analyze traffic or bandwidth in a local area network. Nor can these tools test actual IP video service, such as shared digital video recorders.

Additionally, earlier generation testing devices measured the contributions of various packet errors to signal degradation, including packet loss, jitter, and latency. The device made it possible to monitor traffic between two active devices, tap into the line to measure throughput, and provide raw statistics to technically trained personnel. It was useful to technicians with strong technical insight, who were capable of deciphering the statistics delivered and determining what actions to take to identify and repair faults in a home network. The prior generation device, used to test MoCA signals routed to a set-top-box and evaluate performance of the set-top-box, uses parts of the technology disclosed in U.S. Pat. No. 8,146,125 entitled, "Computerized Device and Method for Analyzing Signals in a Multimedia over Coax Alliance (MoCA) Network and Similar TDM/Encrypted Networks" which is hereby incorporated by reference.

Furthermore, these MoCA network architectures bring with them new and special needs for installation and testing. For example, conducting testing on home network installations using traditional methods involves dispatching technicians to the home, necessitating not just a highly skilled labor force, but the ability to schedule convenient times for the homeowner in order to enter the premises and conduct testing and repair. This can be time consuming, inconvenient and expensive for both the network operator and the homeowner. There simply needs to be a better way to conduct testing of on-premises installed networks.

An opportunity arises to introduce improved testing devices and protocols. Testing technologies with easy-to-read output may reduce the burden of training field technicians and reduce the time needed to find and fix a problem with video delivery to the end device.

SUMMARY

The operation of a testing device for troubleshooting failures in a MoCA LAN system is disclosed that discovers IP addresses of devices on a MoCA LAN. These automatically discovered devices are then sent a large number of data packets that each elicit a response from the recipient. The packets transmitted for which no corresponding response is received are counted as lost packets, and the packet loss results for each tested device enables identifying the source of a failure in the network.

MoCA technology may be used in a home to enable the secure and reliable delivery of data, Internet access and standard/HD video around the home. MoCA technology runs over the existing in-home, coaxial cabling and can be used as a transport to extend wireless connectivity. MoCA technology is in use by pay TV operators such as cable, satellite, IPTV, and telephone companies. High speed IP-based multimedia may be sent to devices such as a computer, set-top box, or television over the cable. Data is passed to devices on a MoCA LAN that exists on a home coax network. In some cases, there is a MoCA WAN to a customer router which then passes data to devices onto the home MoCA LAN.

Additionally, an opportunity has been identified to develop an expert system for debugging home networks, a system that automatically analyzes technical statistics and directs the debug and repair process. An expert system that responds directly to measurements made with special purpose hardware can transform the home network debug and repair process. In this disclosure, we introduce an expert system emulating components of a home network, isolating potentially faulty segments of the network and measuring communication between components to determine faults.

Furthermore, some tests can be implemented as services. A network provider can deploy ("push") a test to a container resident on one or more devices of the network, either at installation, periodically, or when a problem is reported. When a customer reports an issue, services running on one or more devices of the customer installation can cause the containerized tests to be run. For example, the central office of the network provider can initiate a request to run the test through the internet (or other connection) by the container. In some implementations, the container acts as a recipient for test set(s) deployed or provisioned either before customer installation or on premise or both. In some implementations, there is an overlap of the service-based test set with traditional technician-initiated test sets forming a hybrid testing architecture.

Implementations can provide the capability to build, ship, and run distributed applications anywhere accessible by networks. In implementations, containers are isolated, but share OS (hypervisor not necessary). In some implementations home network information is collected preemptively to form a baseline. Implementations can reduce onsite service calls, and/or reduce time-to-resolve problems by personnel dispatched to the installation site

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 8 shows example screen shots for viewing detailed test results for each device being tested, according to an implementation of the invention.

FIGS. 17A & 17B illustrate an example of a directed graph mapping to a rule-based expert system.

DETAILED DESCRIPTION

The technologies described herein fall into at least three different categories, including (I) discovery and identification of layer 2 coax problems in MoCA networks, (ii) automated testing of MoCA networks and (iii) service-based testing. FIGS. 1-10 are mostly related to the category of discovery and identification of layer 2 coax problems in MoCA networks, FIGS. 11-18 are mostly related to the category of automatically testing MoCA networks and FIGS. 19-23 are mostly related to the category of service-based testing.

Discovery and Identification Category

Figure 1:
FIG. 1 is picture of a pixelated image seen on a television.

Regarding the discovery and identification category, FIG. 1 is picture of a pixelated image seen on a television. High speed digital video delivered to a television is sent using a real-time protocol, where there is no time to detect missing packets and resend. The loss of even 1 packet in 50,000 can create a viewer-noticeable glitch on the screen. When a customer experiences a failure such as this on the network, it may be difficult to isolate and correct the problem. Observable failures may be intermittent and difficult to reproduce.

In a MoCA network, unlike with Ethernet, failures are most likely due to a fault in the physical cable layout within the home. That is, failures are more likely to be attributed to a bad cable, a bad connection, a faulty splitter, excessive cable length, or too many cable segments. The usual way of troubleshooting a failure on a MoCA network is to use tools that characterize the physical cable directly. For example, a digital voltage ohm meter, an RF tester, or even a spectrum analyzer may be used to determine whether a particular cable or cable connection is bad. Attenuation may be caused by excessive cable length or cascading of splitters on a single path.

Probe testing is used in Ethernet LAN's to isolate problems such as configuration problems such as networking configuration errors. As mentioned before, the physical Ethernet itself is unlikely to be the cause of a service failure. IP-based testing is used to diagnose failures at these high levels of the networking stack. The technology disclosed herein relies on probe testing for the purpose of diagnosing the physical cable infrastructure. It is different from prior MoCA troubleshooting techniques in the cable layout is not directly measured. In fact, it is not necessary to directly access every cable connector in the home in order to perform the test. The disclosed technology is also different from Ethernet testing because it is the physical network that is being diagnosed, not software configuration of the network.

Figure 2:
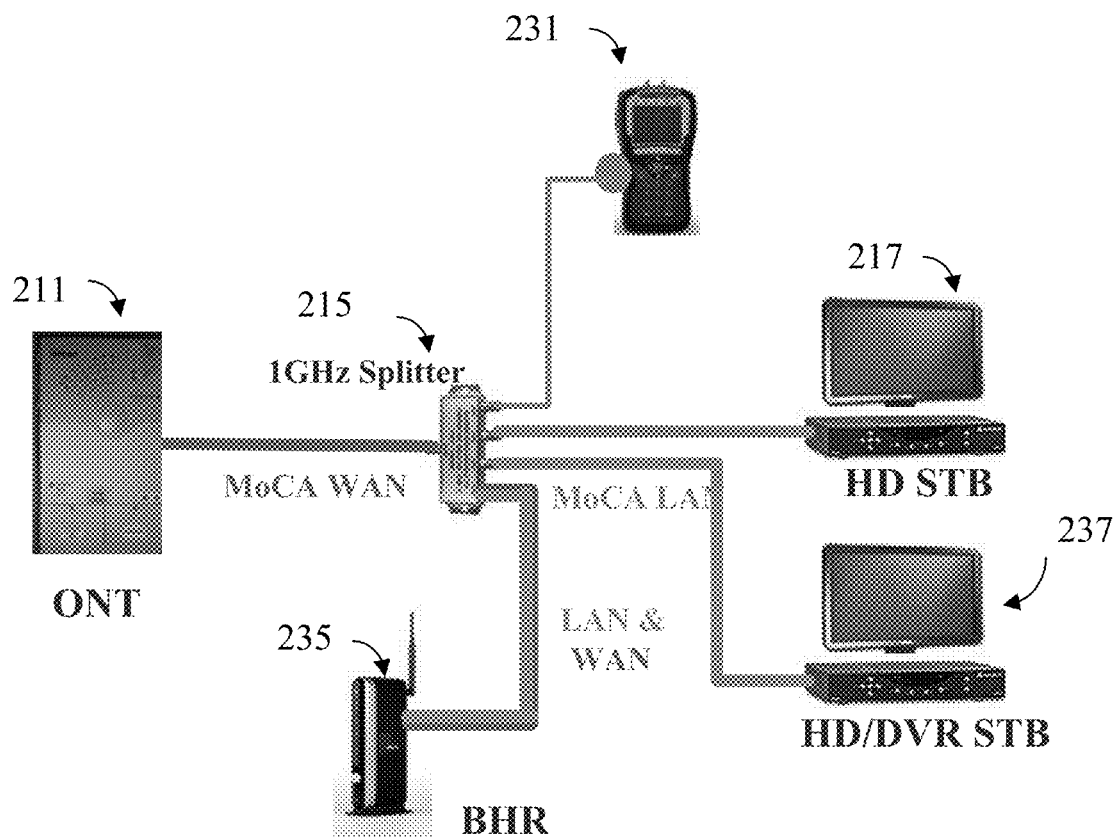
FIG. 2 is a block diagram of an example MoCA network including both a MoCA WAN and a MoCA LAN, with a test device connecting to directly into MoCA network, according to an implementation of the invention.

FIG. 2 is a block diagram of an example MoCA network including both a MoCA WAN and a MoCA LAN, with a test device connecting directly into MoCA network. The network comprises an Optical Network Terminal (ONT) 211 that connects a fiber optic cable carrying broadband to the home with the MoCA wide area network (WAN). The illustrated network includes a Broadband Home Router (BHR) 235 that connects the MoCA WAN with the MoCA local area network (LAN) within the home. A high definition (HD) set top box (STB) 217 and a HD digital video recorder STB 237 are also on the MoCA LAN. When a device is plugged into the MoCA network, the device listens for a beacon on a particular frequency to discover the location of a network controller. The network controller allocates time slots for the newly joined device to send and receive data to/from each other device on the network. Each time slot is reserved for traffic from one particular device to another particular device (i.e. one way point-to-point traffic). In particular, when the test device 231 joins the MoCA network, the network controller creates a schedule for the test device to communicate with the BHR.

As can be seen in FIG. 2, there are multiple potential failure spots. Individual ports on Splitter 215 could fail or connections may be loose, the connection between the coax and the device may be loose, a cable may be defective, or a long coaxial cable length may cause signal attenuation resulting in less bandwidth.

Figure 3:
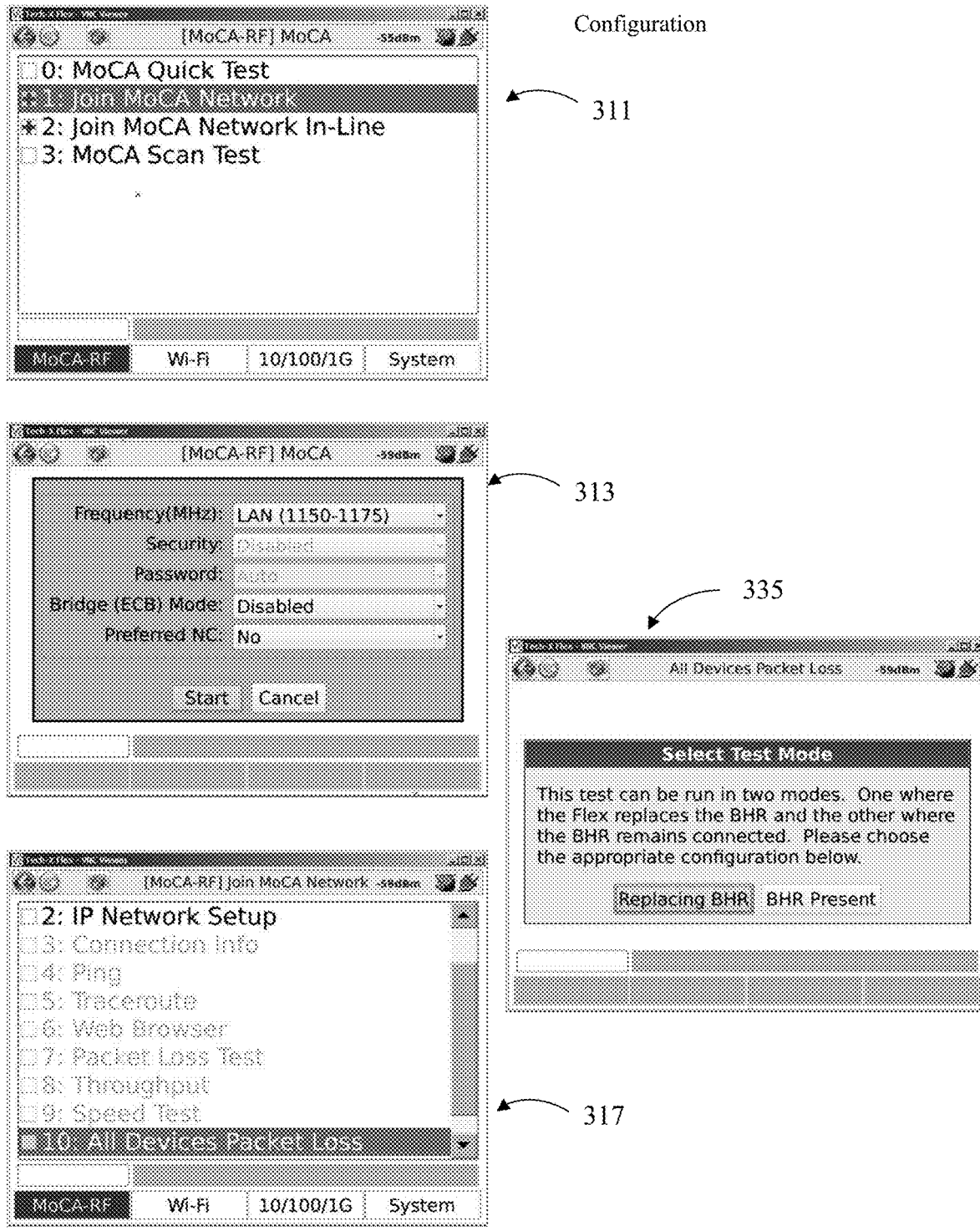
FIG. 3 illustrates an example user interface for configuring a test device to troubleshoot a problem on a MoCA LAN, according to an implementation of the invention.

FIG. 3 illustrates an example user interface for configuring a test device to troubleshoot a problem on a MoCA LAN, according to an implementation of the invention. The test device may include a display, and the user interface may be provided directly on the test device display. Alternatively, the test device may be communicatively coupled with a test device controller that provides a display for the user interface, and user commands may be sent to the testing device and results may be received from the testing device for display to the user.

In an implementation, the test device joins the MoCA Network as seen in 311 (MoCA-RF option is selected at the bottom of the screen). Screen 313 illustrates selecting a frequency band for the test device on the MoCA network. In screen 317 menu item 10: All Devices Packet Loss is selected. In this implementation, the BHR 235 continues to participate in the MoCA network and will be a target for test packets from test device 231. The IP addresses of the devices on the MoCA LAN are discovered. In an implementation, the range of IP addresses used by each vendor of network devices is configured into the test device, or delivered to the test device upon request. A ping packet (also referred to herein as a probe or a probe packet) is sent to every IP address within the configured address ranges. Returning acknowledgement packets identify the IP address assigned to a device. The acknowledgement packet includes the MAC address of the responding device. The MAC address may be used to determine which devices are on the MoCA network and to filter out IP addresses for devices not on the MoCA network. The MAC addresses on the MoCA network are known to the testing device. At the end of the discovery process, the test device has constructed a list of IP addresses of every (minimally functional and reachable) device on the MoCA LAN.

Figure 4:
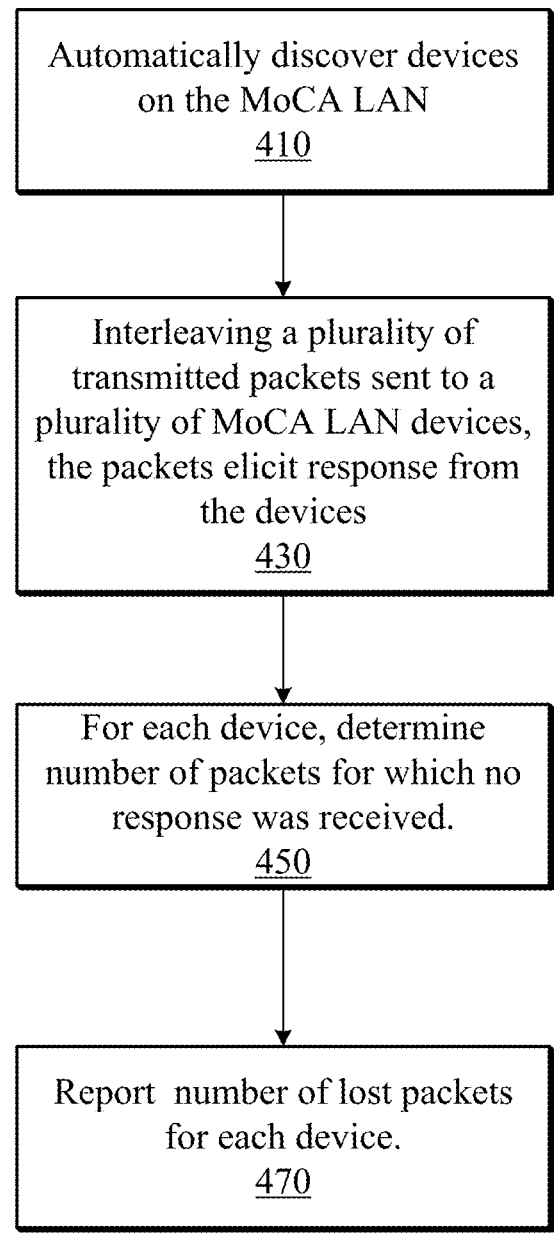
FIG. 4 illustrates a flow chart showing a process for determining packet loss, according to an implementation of the invention.

FIG. 4 illustrates a flow chart showing a process for determining packet loss, according to an implementation of the invention. At 410, the test device automatically discovers the other devices on the MoCA LAN, which in this example includes HD STB 217, HD/DVR STB 237, and BHR 235. At 430, test packets are sent directly to each of the discovered devices on their respective channel. The transmission of packets attempts to simulate the transmission of IP video traffic, so a very large number of test packets are sent in rapid succession to each device. In an implementation, multiple devices being tested may receive and respond to probe packets concurrently and the probe packets transmitted asynchronously and interleaved in time. For example, a probe packet may be sent to one device before and after sending a probe packet to different device. Thus, the devices may not be tested serially. Unlike with Ethernet, using dedicated point-to-point channels for each transmission avoids interference between one packet and another.

The packets sent to each device implement a protocol in which the receiving device responds to the test packet. An example of such a protocol is ICMP echo, where a "ping" is sent to a device and a response is expected back. A failure is assumed when no response is received back. Ping may be used to identify a path that includes an unresponsive device, broken cable, and/or loose connection.

The technique disclosed herein is different from an administrator or network operator determining the availability of a device. An administrator may use probe packets to verify that a particular device is up and reachable. Usually, knowing that a different device is up and reachable is not helpful in performing the diagnosis. However, because of the coax cable network topology, test results for multiple devices may be useful for isolating a portion of the cable or connections that are failing. For example, if the cable segment between the splitter and the home router is the only failing component, the test device would observe packet loss for the router, but no packet loss for any of the other devices. Another distinction between a network operator/administrator using ping for diagnosing a network and the technique described herein is that troubleshooting IP video streaming requires sending a large number of very fast packets sent over the network, which is generally not needed when diagnosing IP connectivity problems.

At 450, the number of packets sent for which no corresponding response was received, may be totaled and compared to the number of packets that were sent to the device. A packet loss rate is determined. At 470 packet loss information for each MoCA device may be reported to the user. The absolute number of packets transmitted and received may be reported, and/or a proportion of failed or successful packets may be reported.

Figure 5:
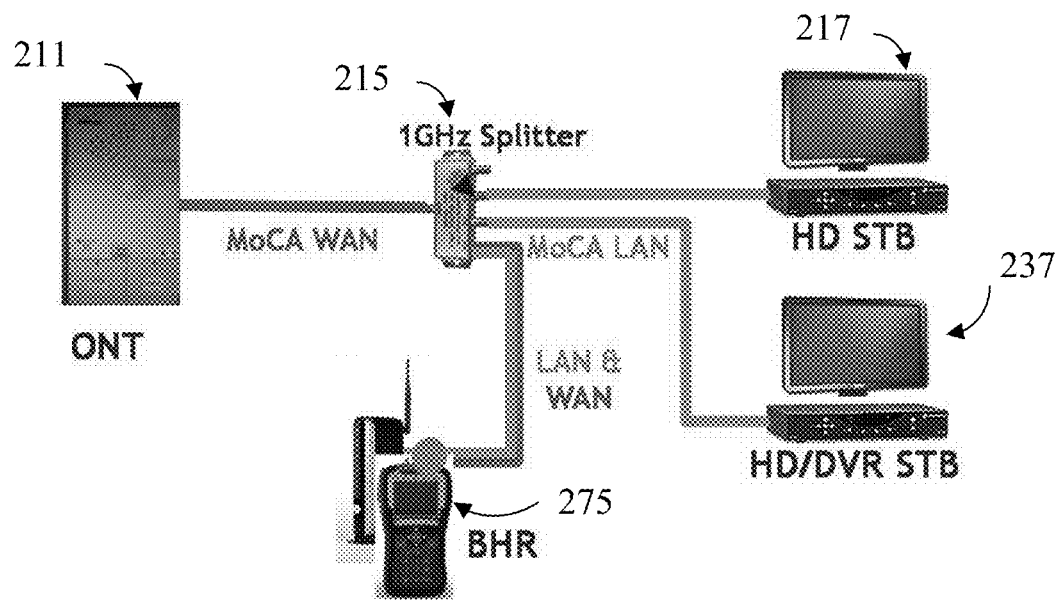
FIG. 5 is a block diagram of MoCA network with test device connecting directly into MoCA network, replacing BHR, according to an implementation of the invention.

In a different implementation, the test device having additional functionality may replace the BHR. FIG. 5 is a block diagram of a MoCA network with the test device 275 connecting directly into MoCA network and replacing the BHR, according to an implementation of the invention. 275 is a MoCA device with combined router and testing functionality. Building device 275 may be realized in a variety of ways. The test device, in addition to discovering devices on the network and probing the devices, may be adapted to perform the functions of the BHR, and the test device may replace the BHR temporarily during the test. For example, the BHR responds to DHCP requests to assign an IP address to a device on the network. Once the test device assembles the list of active IP address as normal procedure in preparation for testing, the test device can use that list for allocating new IP addresses in response to DHCP requests while the router is disconnected. The screen shown in 335 illustrates configuring the test device 275 to replace the BHR.

In an alternative implementation, the test device probing functionality may be added into the BHR 235 device so that the testing capability is always available. The BHR already maintains the active IP addresses on the MoCA network, so no additional discovery is needed for the purpose of testing. Having the testing capability built into the router may obviate the need for a repair person to come on site into the home to gather the packet loss information.

Figure 6:
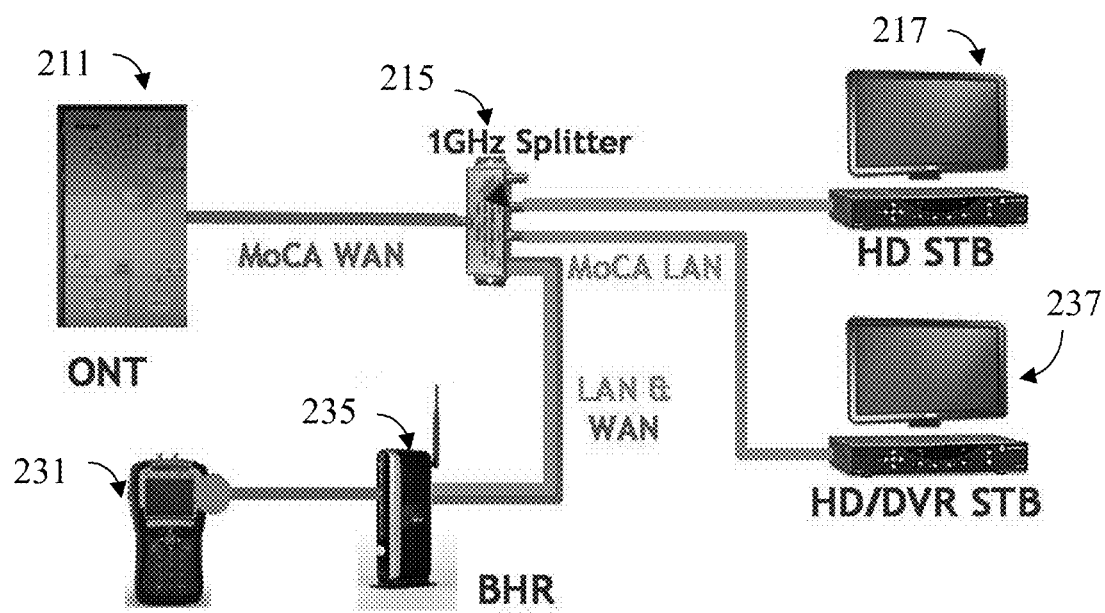
FIG. 6 is a block diagram of MoCA network with test device connecting to BHR over Ethernet, according to an implementation of the invention.

FIG. 6 is a block diagram of a MoCA network with the test device connecting to BHR over Ethernet, according to an implementation of the invention. In this configuration, no changes are made to the MoCA network. The test device does not join the MoCA network and need not have a MoCA interface. Instead, test device 231 connects to the BHR 235 over an Ethernet LAN. (Though not shown in the figure, screen 311 would have the 10/100/1G option selected). The test device 231 is able to discover the IP devices through the BHR and send IP traffic to those devices through the BHR. The response messages are received through the BHR by the test device over the Ethernet connection.

Figure 7:
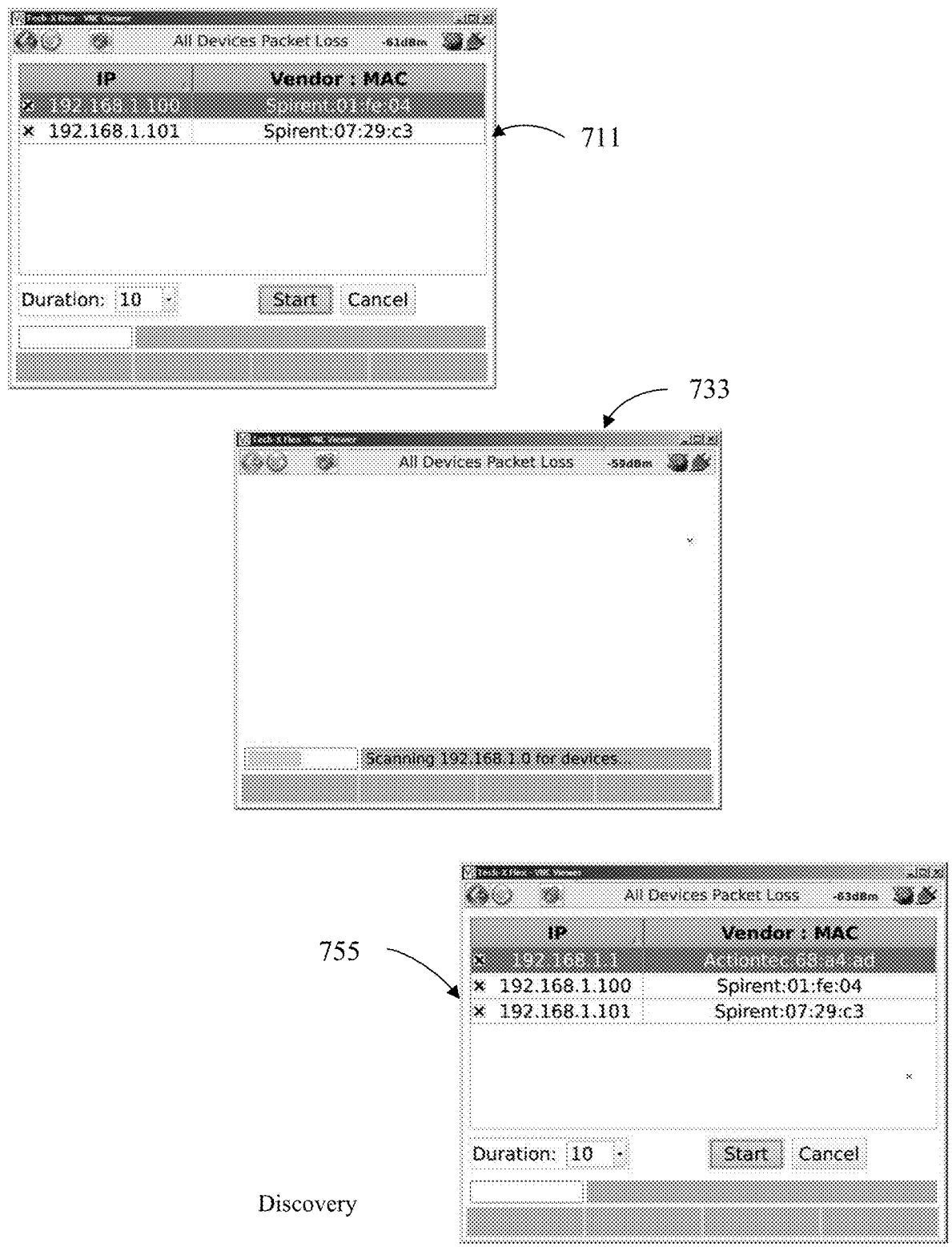
FIG. 7 illustrates an example user interface for performing the "all devices packet loss" test on the MoCA network, according to an implementation of the invention.

FIG. 7 illustrates an example user interface for performing the "all devices packet loss" test on the MoCA network, according to an implementation of the invention. In screen 711, a discovery process is conducted. In this example, two devices have been discovered at IP addresses 192.168.1.100 and 192.168.1.101. Screen 733 illustrates continuing to search for IP devices on the network. Screen 755 illustrates that a third device is discovered at IP address 192.168.1.1. Actiontec manufacturers routers, so MAC address 68:a4:ad might correspond to the home router. Once the devices are discovered, pressing the "start" button on screen 755 starts the packet loss test. Probe packets are generated and sent to each IP address in the discovered list.

FIG. 8 shows example screen shots for viewing detailed test results for each device being tested. Screen 811 shows the status after 58 test packets have been sent each of the devices. In this example, no packets were lost, and thus the percentage of packets lost is also zero. Screen 855 shows that the operator stopped the test after sending 614 packets, and the device at address 01:fe:04 lost 60 packets amounting to 10% of packets lost.

Figure 9:
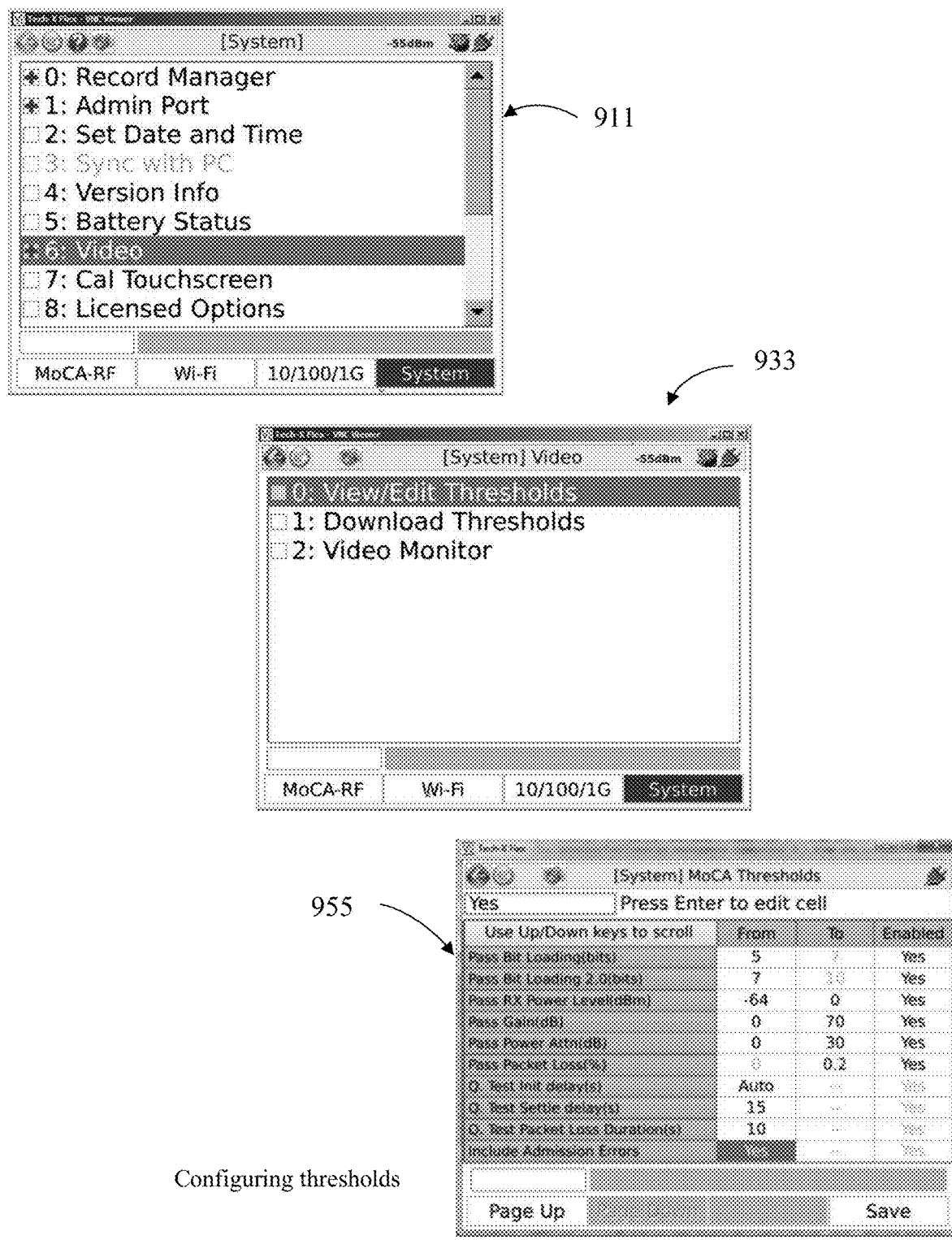
FIG. 9 illustrates an example user interface for configuring packet loss thresholds, according to an implementation of the invention.

FIG. 9 illustrates an example user interface for configuring packet loss thresholds, according to an implementation of the invention. Screen 911 shows configuration options. In this example, options for video testing are selected. Screen 933 shows selecting to view and edit packet loss thresholds. The packet loss thresholds may be used to determine a status of all devices on the MoCA LAN based on the absolute number or proportion of packets lost. The test status may be determined by comparing the number or proportion of lost packets to a user-configured threshold that may be specified through a user interface. Example screen 955 shows configuring a packet loss threshold of 0.2%. If 0.2% of the transmitted packets to a device are lost, the test status for the device will be indicated as failed.

Figure 10:
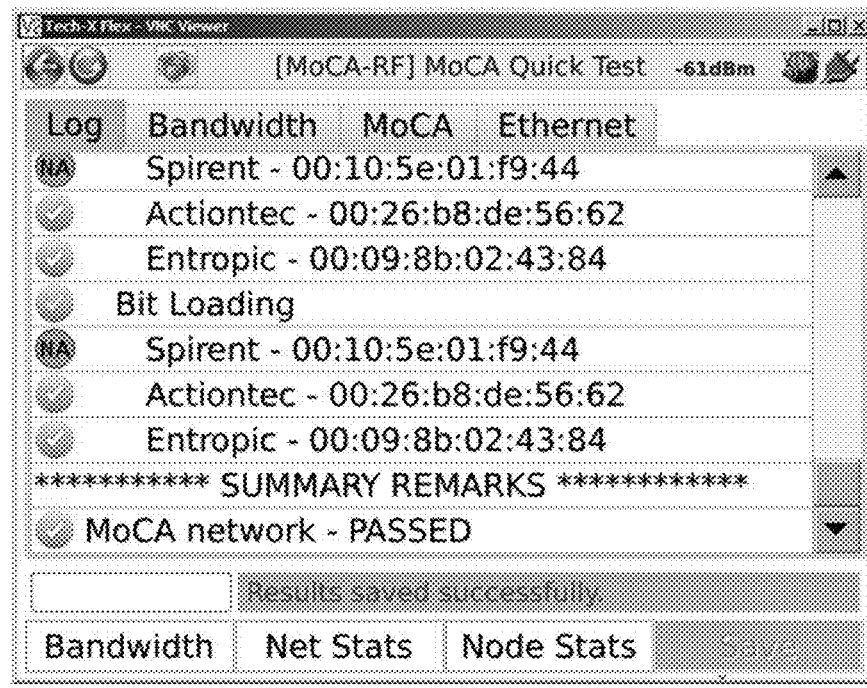
FIG. 10 is an example screenshot of a quick test results summary, according to an implementation of the invention.

FIG. 10 is an example screenshot of a quick test results summary. Above the summary remarks, there is one status line for each device being tested. The green check mark indicates that the packet loss if any was in an acceptable range below configured thresholds and the device passed the test.

Automated Testing Category

Regarding automated testing category, a brief introduction is provided before FIGS. 11-19 are discussed.

Introduction

The increasing demands for network bandwidth in the home, for applications such as high definition (HD) television, interactive gaming, video on demand (VOD) and digital video recorders (DVR), requires increasingly complex in-home networking. Technologies such as MoCA and data over cable service interface specification (DOCSIS) are being implemented to address these demands. However, incompatibilities between competing technologies and inevitable failure of active and passive devices create a need for expert knowledge in the field to maintain and repair equipment. This growing need challenges technical support organizations. Tens of millions of homes have been equipped with MoCA technology, and the number continues to grow. It will be impractical to scale a support workforce possessing the technical competence currently required to service this growing infrastructure.

The technology disclosed reduces the technician expertise needed in the field by providing an expert system, such as a rule-based or directed graph expert system. In the hands of a relatively inexperienced operator, an expert system can select and perform a sequence of complex tests running on special purpose hardware to solve a problem generically identified by the operator. This can decrease the service time for a truck roll, reduce inappropriate equipment replacement, and improve customer satisfaction.

Historically, cable delivery of home entertainment has involved the use of MPEG video transport. Cable television providers encode and transmit cable channels using quadrature amplitude modulation (QAM) over coaxial cable or "coax". As IP-based packet traffic becomes more integrated with video devices in the home, new standards, such as those created by the MoCA organization, have been developed to take advantage of this integration. MoCA is a technology that allows a coax network to carry additional signals that travel on a frequency band mostly unused by cable TV transmissions.

Using the technology disclosed, diagnostic errors by technicians can be reduced by automatically capturing data from the network itself, such as DHCP addressing for devices, technical information about the signal strength and bandwidth of wireless transceivers, and operational frequencies for various MoCA channels. Use of an expert system helps to avoid human bias towards preconceived solutions. Once the disclosed expert system is invoked, it can emulate a variety of devices and perform a number of role-specific tests. Results of tests are immediately and automatically used to select further tests and, ultimately, identify a fault and direct a technician's response to correct the fault.

MoCA Home Network

Figure 11:
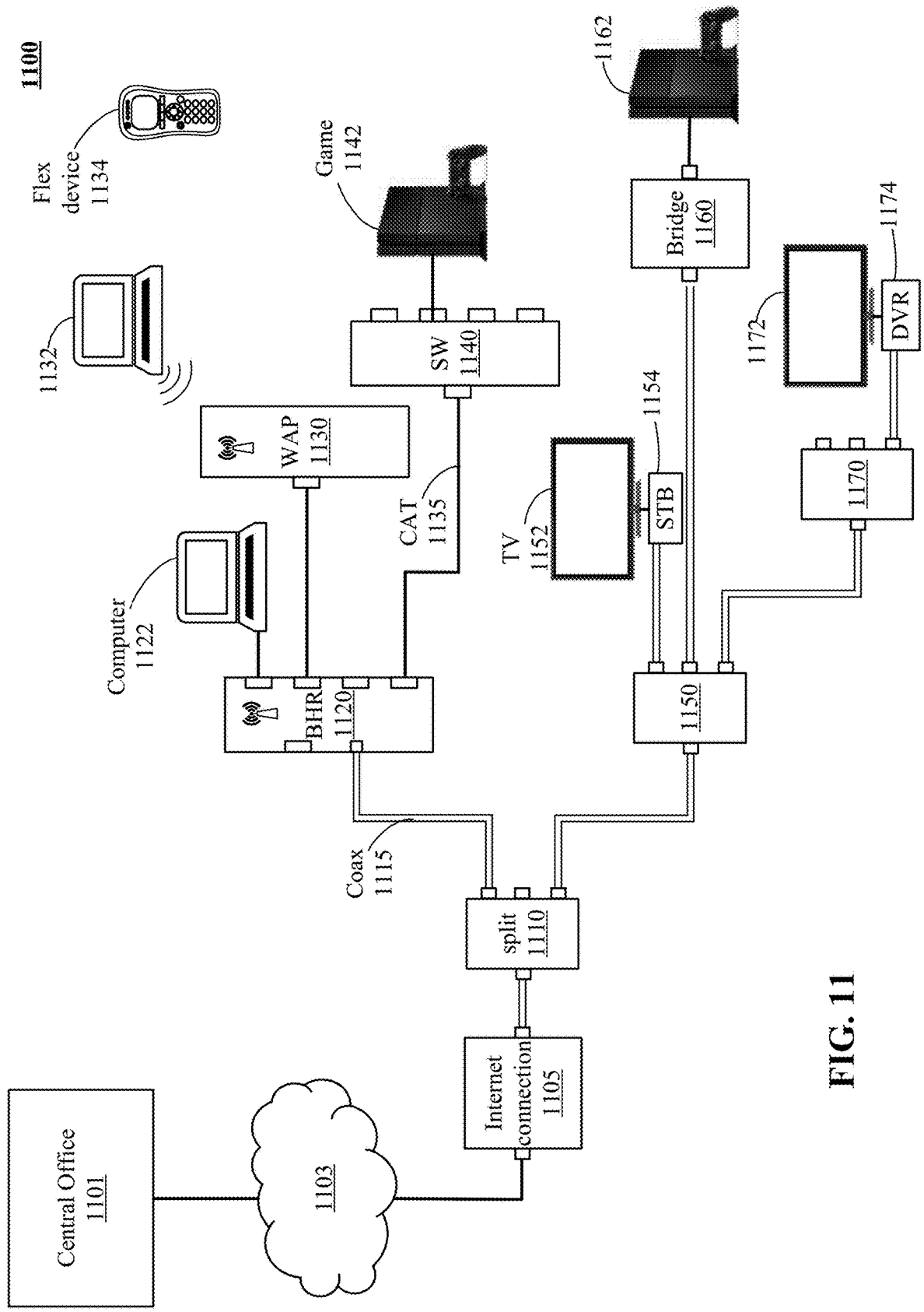
FIG. 11 illustrates a home network with MoCA and wireless components, which the technology disclosed can be used to diagnose.

FIG. 11 illustrates an example home network in which the technology disclosed can be used to find faults or errors. Home networks of this sort offer integrated wired and wireless Ethernet traffic with coax-based MoCA traffic. Problems with MoCA and wireless portions of the network to be diagnosed can include replay of videos stored in a DVR, Ethernet device errors in traffic through a Broadband Home Router (BHR) or Access Point (WAP), and physical layer issues with cabling, connectors and splitters. The environment illustrated in FIG. 11 includes a connection to a Wide Area Network (WAN) 1103 with an internet connection 1105 and an entry point adapter such as an Optical Network Terminal (ONT) or coax connection. The WAN can be MoCA-compliant. The home MoCA LAN 1100 typically includes a coax cable 1115, illustrated as double lines between devices, and an Ethernet cable 1135, drawn as a single line. The WAN 1103 can connect to a Central Office 1101 with a head end that exchanges data with the home in-home LAN 1100.

The home MoCA LAN 1100 includes a Broadband Home Router (BHR) 1120 connected through a passive first splitter 1110, via a coax cable 1115. The BHR is also coupled to the internet connection 1105. In one example, the BHR 1120 is an Actiontec MI424WR wireless broadband router, which acts as a server for DHCP, NAT, signal decryption, and other common home router services. The BHR 1120 can integrate both the Wi-Fi and Ethernet networks with QAM in compliance with MoCA standards.

In this example, a first computer 1122 is connected to the BHR 1120 by an Ethernet cable. A Wireless Access Point (WAP) 1130, that supports wireless technologies such as IEEE 802.11b, a, g, n, and ac, is also connected to the BHR 1120 via an Ethernet cable or integrated into the BHR. A second computer 1132 is connected wirelessly to the WAP 1130 or BHR 1120. Similarly, an Ethernet switch 1140 can be connected to the BHR 1120 via an Ethernet cable 1135 or integrated into the BHR. A first gaming system 1142 can be connected to the Ethernet switch 1140 via an Ethernet cable.

A second splitter 1150 can be connected to the first splitter 1110 via coax cable, and a Set Top Box (STB) 1154 via coax cable. The set top box 1154 can be connected to a first television 1152 with a technology such as HDMI or Component Video. A MoCA bridge 1160 can be connected to the second splitter 1150 via coax cable, and to a second gaming system 1162 via Ethernet. A third splitter 1170 can be connected to the second splitter 1150. And a Digital Video Recorder (DVR) 1174 can be connected to the third splitter 1170 via a coax cable. A second television 1172 can then be connected to the DVR 1174 with a technology such as HDMI or Component Video.

A Flex device (also referred to herein as a Configurable Test Subsystem) 1134 using the technology disclosed can be inserted into the home MoCA LAN 1100 in a plurality of positions, which physically isolate portions of the MoCA LAN 1100 for testing. For example, the Flex device 1134 can assume the role of the first computer 1122 with an Ethernet connection, the second computer 1132 with a wireless connection, the BHR 1120, the WAP 1130, a gaming system 1142, 1162, the STB 1154, a TV 1152, 1172, or the DVR 1174.

The Flex device 1134 is capable of performing a plurality of tests for a home MoCA LAN 1100. These tests can be run individually by an operator, with technical results of each test presented to the operator for expert analysis. In this scenario, known as classic mode, the operator decides which test of the plurality of tests is to be run, the order that tests are to be run, and the significance of any results obtained by each individual test. These tests can be extremely complicated, with equally complicated results.

In an expert system mode, the technology disclosed can direct the operator to a starting place toward the best place in the home MoCA LAN 1100 to insert the Flex device 1134 based on a general problem type identified by the operator. The technology disclosed can then choose one or more tests to run autonomously, process the results of the tests, and instruct the operator as to whether there is a problem in that portion of the home MoCA LAN 1100, how to remediate the problem. Details of the Flex device 1134 are shown in the block diagram illustrated in FIG. 12.

Software Block Diagram

Figure 12:
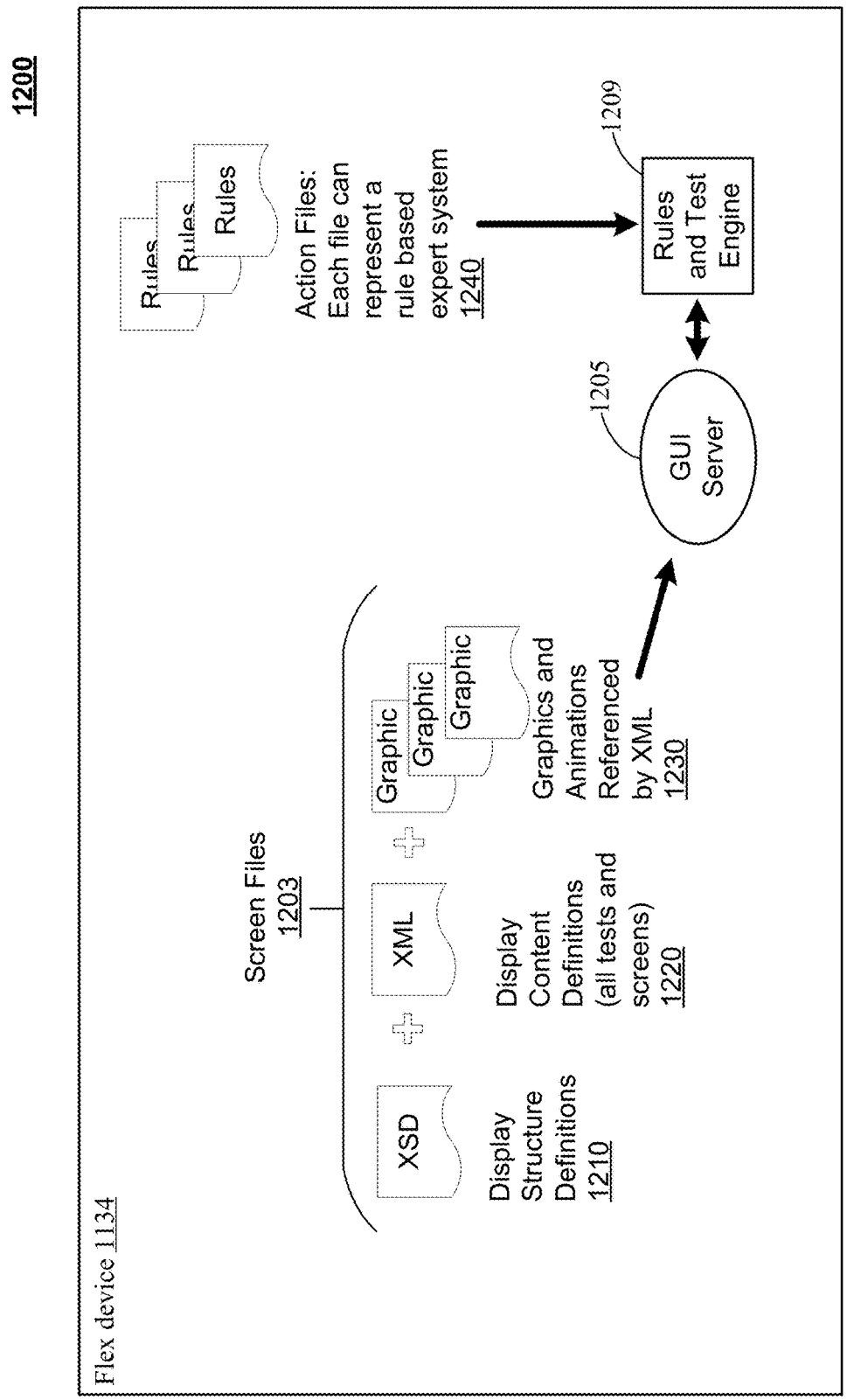
FIG. 12 illustrates a block diagram of software for an example Flex device.

FIG. 12 illustrates a block diagram of software 1200 for an example Flex device. The Flex device 1134 comprises a set of specialized hardware, screen files 1203 that define the text and graphics displayed on the device, and action files 1240 that describe the actions to be taken based on various inputs.

Screen display-related files 1203 can include an XSD or other schema file 1210, a display XML or other markup data file 1220, and graphic files 1230. An XSD file 1210 can be used to define the schema of the display XML file 1220. The display XML file 1220 contains the information that is displayed on each screen, and links to the actions that can be followed based on inputs. The actions that can occur include the rendering of other screens defined within the display XML file 1220, the rendering of graphics files 1230, such as animations, or the invocation of action files 1240. An action file 1240 defines the rules of an expert system. Screen files are rendered on the display by a GUI server 1205, such as a browser or light weight client app. Action files are processed by a rules and test engine 1209, which can communicate with the GUI server 1205 to request more information from an operator, or to supply information and instructions to the operator. The specialized hardware of the Flex device 1134 is described with reference to FIG. 13.

Hardware Description

Figure 13A:
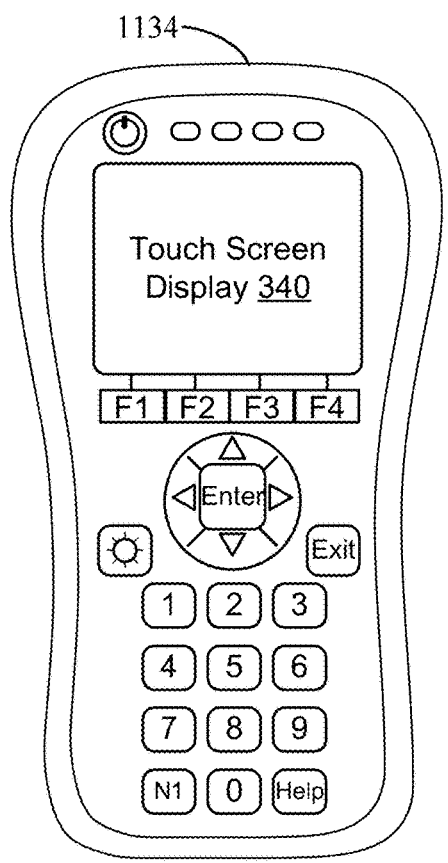
FIGS. 13A & 13B illustrate a form factor and block diagram of the example Flex hardware.
Figure 13B:
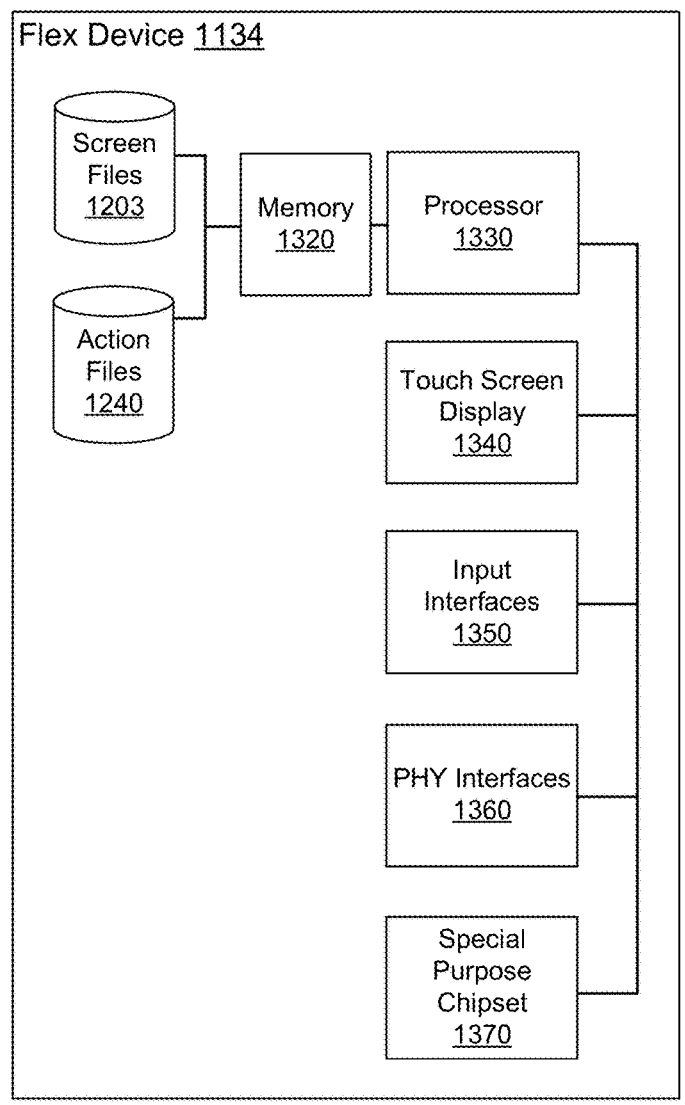

FIGS. 13A & 13B illustrate a form factor FIG. 13A and block diagram FIG. 13B of the example Flex device 1134, which is a third generation device on which the expert system disclosed can operate. A first generation device was a dedicated tester device with a display, described without an expert system. An example first generation device is described in U.S. Pat. No. 8,146,125. A second generation device divided functions between a special purpose test device, without a display, and a tablet computing device, as described in the related U.S. patent application Ser. No. 13/353,026. In an example second generation device, sometimes called a brick, the processor of the brick can provide some or all of the logic required to carry out the testing routines, using a tablet as a display for the brick. The technology disclosed can be practiced using either an integrated device with a display or a brick and tablet combination. Using the brick and tablet combination, the expert logic can run either on the brick or the tablet. When running on the brick, the brick can act as a server and the tablet as a client. A browser or app on the tablet can access the server on the brick.

The example integrated Flex device 1134 illustrated in FIG. 13A, includes a memory 1320 that stores screen files 1203 and action files 1240. It also includes a processor 1330, a touch screen display 1340 that renders text and graphics and that can also act as an input device, input interfaces 1350, and physical (PHY) interfaces 1360. The hardware can also include a special purpose chipset 1370, such as the Entropic EN2710 chipset, for signal processing.

Additional components of the example system include a GUI server 1205 and a rules and test engine 1209 running on the receiver. The GUI server 1205 renders text and images defined in the screen files 1203 onto the touch screen display 1340. The GUI server can accept inputs from the touch screen display. The touch screen display can be divided into different input areas based on definitions stored in the screen files. The hardware can also include input interfaces 1350 in the form of physical data entry with key and navigation buttons and physical interfaces 1360 for coax, twisted pair, and Wi-Fi interface connections.

A special purpose chipset 1370, such as the Entropic EN2710 chipset, can support MoCA, RF, Ethernet and Wi-Fi testing. Wi-Fi protocols supported tree chip set include b, g, n, a, and c networks. The Flex device can be used to solve issues with RF broadcast video tiling, tiling on IPTV, VOD, or DVR; data speeds below SLA, internet connectivity problem and Wi-Fi connectivity problems.

The Flex device 1134 includes hardware that can be used to can diagnose video tiling, noise, and faulty wiring and equipment issues. For example, to solve RF broadcast video tiling issues, the Flex supports tests and RF measurements, used to isolate a root cause to faulty wiring, splitter, and/or equipment. Tests used in the expert system can diagnose issues with tiling on IPTV, VOD, or DVR playback by evaluating packet loss on MoCA and Ethernet interfaces to isolate root cause to noise, faulty wiring or faulty equipment. Tests of assess video quality (VMOS) on MoCA and Ethernet interfaces to find issue in home or upstream and view video on the Flex device to isolate faulty TVs in the home. The system can run speed tests on various interfaces such as MoCA and Ethernet to verify upload and download speeds and segment issues on home or upstream networks to resolve issues with data speeds below Service Level Agreements (SLAs). Internet connectivity problems can be solved by the use of a complete suite of embedded IP tests to verify connectivity to various internet sites and determine location of failure. Additionally, Wi-Fi connectivity problems can be solved by scanning Wi-Fi signals and testing specific channel performance to isolate issues to interference, coverage or equipment location, or faulty equipment.

The hardware illustrated in FIGS. 13A and 13B is used by the expert system on the Flex device 1134 to test MoCA networks. MoCA networking comprises a physical (PHY) layer, which uses 50 MHz channels located in the spectrum 850-1525 MHz, which can overlap with QAM. These MoCA channels are organized into multiple bands. Only one channel per band is used on a physical network, though multiple MoCA networks can be formed over the same coaxial cable plant using different bands. At the physical layer, MoCA uses a technique called Adaptive Constellation Multi-Tone (ACMT), modeled after Orthogonal Frequency-Division Multiplexing (OFDM), to carry data between nodes. Units of data named ACMT symbols are mapped onto 224 discrete orthogonal sub-carriers that occupy the 50 MHz MoCA channel bandwidth. Each of the sub-carriers is modulated independently using 1-8 bits per symbol (BPSK-256 QAM). The MoCA MAC layer, MoCA QoS, and MoCA Link Privacy layers build upon the MoCA PHY layer. MoCA can be an abstraction layer for the discovery and identification of transport protocols such as Wi-Fi, Ethernet, and HomePlug, which allows the transport protocols to be transmitted over coax, and which also further complicates remediation efforts. The disclosed expert system can measure communication between components, isolate potentially faulty segments of the network, and emulate components of the system to ensure an efficiently functioning MoCA network.

Expert System Interface

Figure 14A:
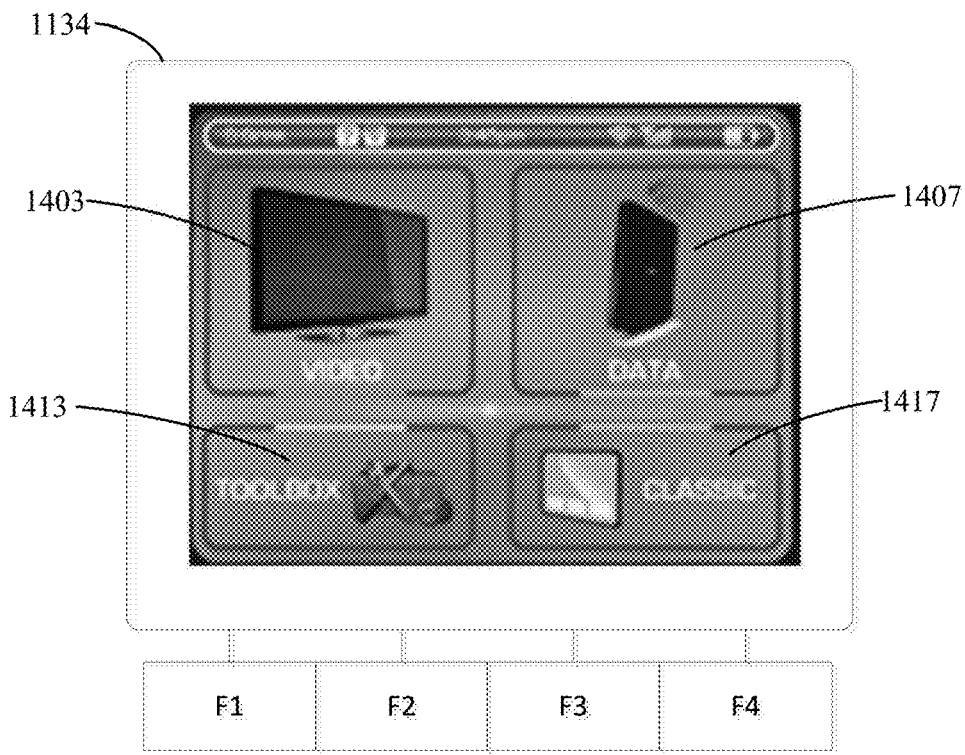
FIGS. 14A & 14B illustrates one implementation of a GUI interface and a message map supporting user interaction with an expert diagnostic system.
Figure 14B:
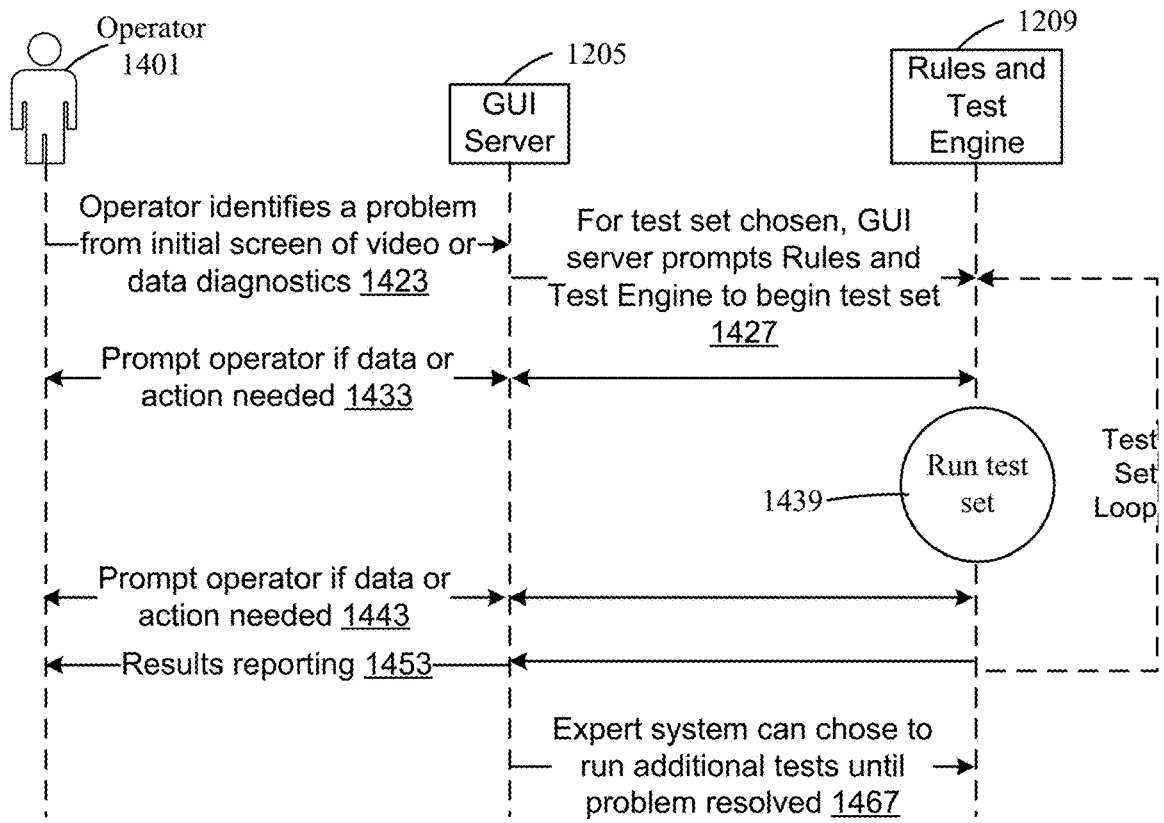

FIGS. 14A and 14B illustrate an example GUI interface and message map, respectively, supporting user interaction with a rule-based expert diagnostic system. FIG. 14A includes an example graphic image that can be displayed on a Flex device 134, used by a technician to generically indicate the category of problem being diagnosed, that can indicate which expert system to select. FIG. 14B shows a message map that includes a sequence of messages between an operator and a Flex device 1134.

The GUI interface of FIG. 14A can provide access to one or more expert systems that can diagnose electronic video devices, data, and the cabling infrastructure of the in-home network. The display of the Flex device 1134 renders images and text. The number of areas and size of each area on the Flex device display is programmable. In one example, a video testing area 1403 (button) is defined, and labeled with an image of a video device and/or the text "VIDEO". The video testing area 1403 can be tied to a hardware button such as F1 or one can be a touch sensitive on-screen button as an input area in which an operator can touch the display to indicate a selection of video rules and tests. A data testing area 1407 can also be defined, and can be used to render an image of a data device that includes the text "DATA". The data testing area 1407 can be programmed as an input area in which an operator can touch to indicate a selection of data rules and tests.

FIG. 14B illustrates an example message map between an operator 1401, a GUI server 1205, and a rules and test engine 1209. The GUI server 1205 can render images on the display, such as video testing area 1403 and data testing area 1407. The GUI server 1205 can also accept input from operator 1401 and, based on that input, invoke the expert systems through the rules and test engine 1209. The GUI server 1205 can also relay results and instructions from the rules and test engine 1209 to the operator 1401.

In one example of an expert system message exchange, the operator 1401 identifies a problem from an initial screen for video 1403 or data 1407 diagnostics 1423. The expert system for video 1403 and data 1407 can address video and data problems experienced on a home network. In another implementation, a toolbox 1413 can be used to select smaller, discrete tests when the expert system is not needed. And a highly trained field technician can select classic tests 1417 to perform discrete tests and view technical result details.

The GUI server 1205 accepts input from the operator 1401, and prompts the rules and test engine 1209 to solve the selected problem or begin the selected test set 1427. In one application, the rules and test engine 1209 begins analysis of a MoCA network. As the test proceeds, the rules and test engine proceeds based on measurements from or tests performed on the device under test. It can use the GUI server 1205 to prompt the operator to enter more data or to perform additional actions as needed 1433. The rules and test engine 1209 can run a test set 1439 that addresses a selected problem or from a selected test regime. It sends instructions to the operator 1401 via the GUI server 1205, requesting additional information or additional user actions as needed 1443. As results from the test set 1439 isolate network segments and identify issues within the home network under test, the GUI server 1205 can report those results to the operator 1453. Unilaterally and automatically, the rules and test engine can choose to run additional test sets until the problem is resolved 1467. For example, a Wi-Fi test can be performed by the rules and test engine 1209 to solve a user identified problem with a Wi-Fi device that is not working. The Wi-Fi test may, in a first step, find a fault with the Wi-Fi device in a first test set, or may find no fault with the Wi-Fi device and direct a further test setup to isolate a fault in a cable connecting the Wi-Fi device to the home network.

MRDVR Message Map Example

Figure 15:
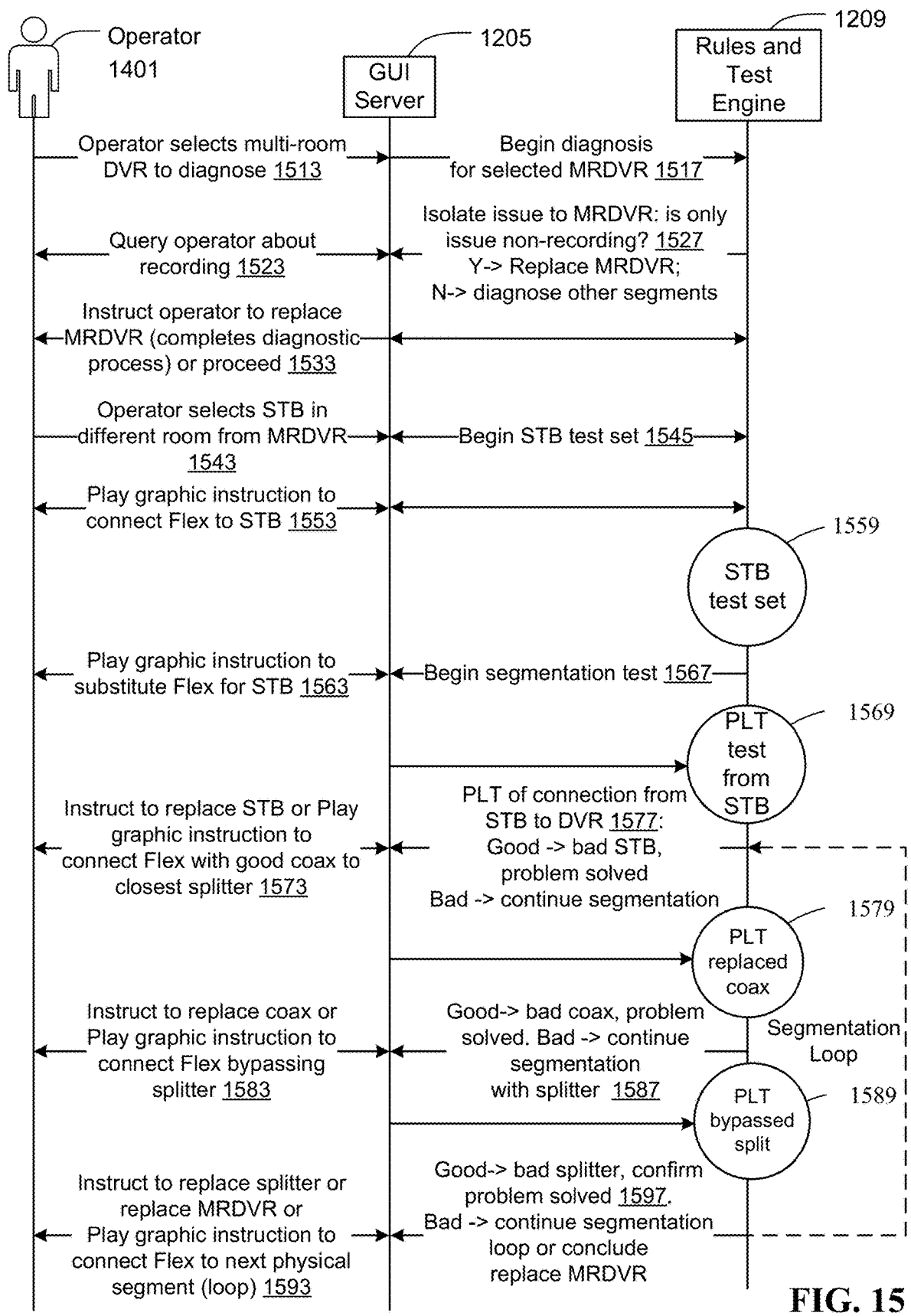
FIG. 15 illustrates one example of messaging during a Multi-Room Digital Video Recorder (MRDVR) test.

FIG. 15 illustrates an example of messaging during a Multi-Room Digital Video Recorder (MRDVR) test after operator 1401 has selected a video test button 1403. The video testing 1403 button leads to choices among expert subsystems for diagnosing Video On Demand (VOD), Multi Room Digital Video Recorder (MRDVR), and Live TV. In this section, an expert system controlled MRDVR diagnosis example is described. FIGS. 16A-16G illustrate images presented by a Graphical User Interface (GUI) 1205 that are used to lead a technician through isolating network segments using the messaging illustrated in FIG. 15.

FIGS. 15 and 16 walk through an MRDVR diagnostic sequence, illustrating message exchanges and examples of animations that guide an operator through positioning the Flex to isolate segments of the network. Parts of the example (e.g., FIGS. 16A, 16B and 16G) are explained with input files for display screens and screen sequencing. The rules and test engine 1209 is capable of performing automated decision making during analysis of an MRDVR issue with minimal human intervention, in communication via a GUI server 1205 with an operator 1401. FIG. 15 illustrates a testing and messaging sequence directed by the rules and test engine.

An MRDVR test is useful when, for example, a Digital Video Recorder 1174 is connected over a MoCA network with at least one Set Top Box (STB) 1154 in another room. Problems with playback from the MRDVR can result from faults in the STB, the DVR, the coax cable 1115 between them, or any splitters 1150, 1170 in the coax infrastructure. Some faults, such as a broken coax connector, are easily recognized. Diagnosis of other problems can require expert analysis. Quick and efficient diagnosis is accomplished using the technology disclosed, which automatically sequences test steps without requiring operator analysis of intermediate results.

Figure 16A:
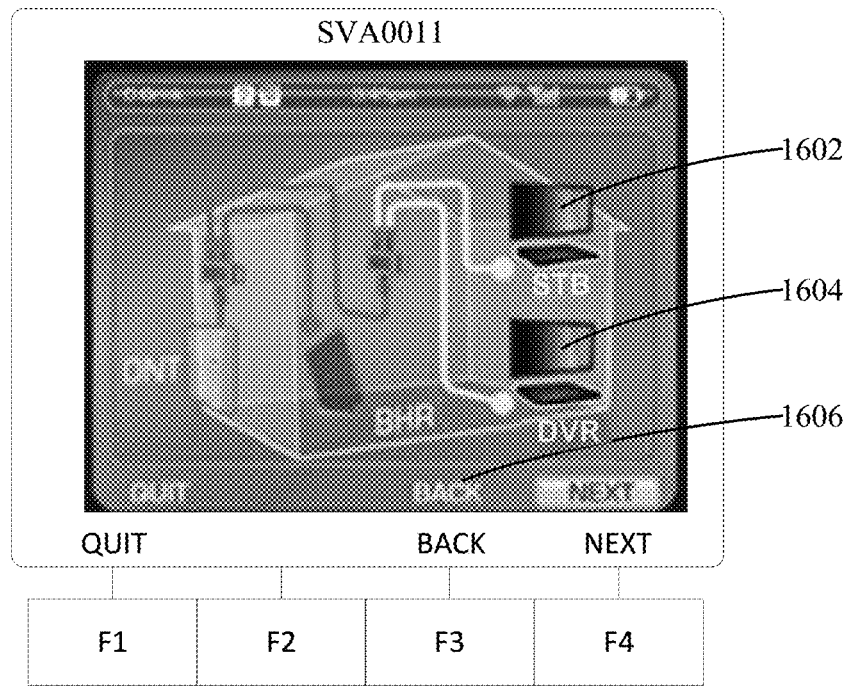
FIGS. 16A, 16B, 16C, 16D, 16E, 16F & 16G illustrate images from a Graphical User Interface (GUI) that can be used to lead a technician through isolating network segments.
Figure 16B:
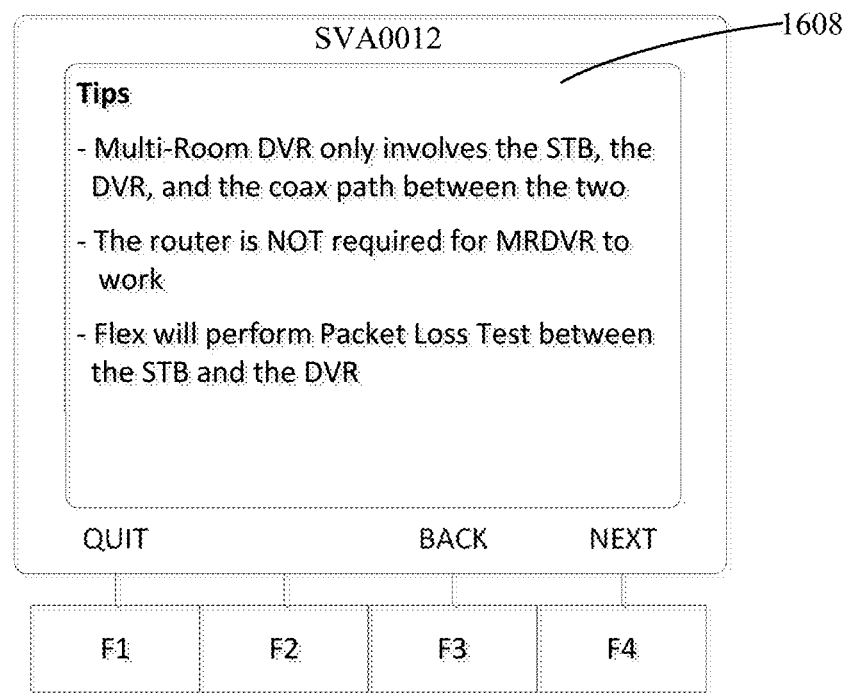

In this example, an operator 1401 selects a Multi Room DVR diagnosis 1513 from a GUI. Data indicating this selection is returned to a GUI server 1205. The GUI server 1205 triggers the MRDVR test 1517 to be processed by the rules and test engine 1209. The Flex device 1134 GUI screens illustrated in FIG. 16A and FIG. 16B are examples of instructions and information to the operator that can be displayed. FIG. 16A illustrates one implementation of a MRDVR test, in which the systems under test are a DVR 1604, a STB 1602, and the cabling infrastructure between them. Although this example shows one DVR 1604 and one STB 1602, the MoCA network can contain a plurality of DVR and/or STB devices, all of which can be addressed with the MRDVR test. Each of the primary screens, such as the one shown in FIG. 16A, can have an associated "Tips" screen 1608, as illustrated in FIG. 16B. In this example, the operator can access the "Tips" screen by selecting the Back control 1606.

Continuing through FIG. 15, the rules and test engine 1209 uses a query to determine whether the issue is an isolated MRDVR 1527 function, by asking the operator whether the only issue being diagnosed involves DVR recording 1523. If the problem is the recording service of the DVR, the Flex device instructs the operator 1401 to replace the MRDVR 1533, which completes this diagnostic process (subject to restarting diagnosis if the user identifies additional problems). However, if the problem is not with the DVR recording capability, the rules and test engine 1209 guides the operator 1401 through a controlled segmentation of the MoCA network 1100, since a generic MRDVR problem can be traced to the STB, to any segment of infrastructure between the STB and the DVR, or to the DVR itself. When the user indicates that the DVR recording works, testing can begin from a STB 1602 in different room from the MRDVR 1543. A reusable portion of the MRDVR test sequence, the STB test set 1545, causes the Flex device to display graphic instructions (FIGS. 16C-16D) for the operator to connect the Flex device 1134 to the STB 1553.

Figure 16C:
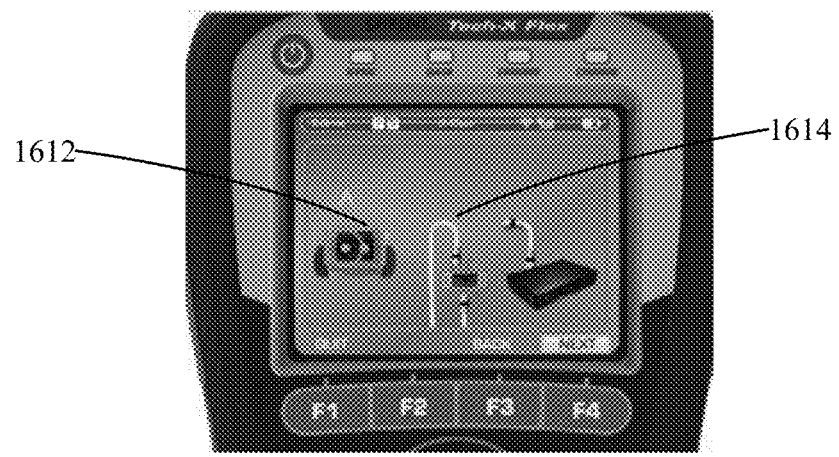
Figure 16D:
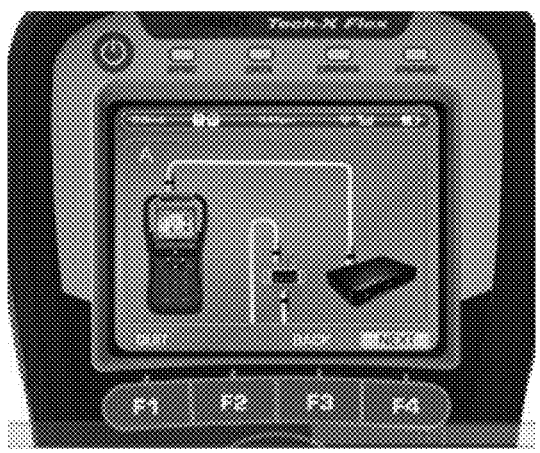

FIG. 16C illustrates the beginning of an animation to prepare the STB for the MRDVR test. The graphic instructs the operator to detach the end of the coax cable 1614 that connects the STB to a first splitter while identifying the location of the coax connection on the Flex device 1134. FIG. 16D illustrates the end of the animation to prepare the STB for the MRDVR test, showing the operator a good connection between the Flex device and the STB. The expert system in the Flex device, particularly the STB test set 1559, emulates the DVR offering services to the STB. Once the Flex device has established MRDVR emulation with the STB, a simulated playback is performed. The Flex then prompts the operator to indicate whether an appropriate image appears on a display connected to the STB. If the emulated DVR services to the STB appear correct to the operator, the test advances to the next stage. If the emulated DRV services to the STB do not appear correct to the operator, the Flex instructs the user to connect the Flex device to the STB with a known, good cable, and the test is repeated.

In classic mode or in another test sequence, the Flex can perform MoCA-specific tests of the STB, such as response to remote control button presses that are directed to head end equipment. The tests of the STB also can include effective handling by the STB of image distortion, packet or frame loss, freezing, and jitter.

If the rules and test engine 1209 discovers a problem with the STB, it informs the operator 1401 of appropriate steps to take to resolve the issue or issues, and the diagnosis is complete. If no problems are found with the STB, the rules and test engine 1209 leads the operator 1401 through additional steps to prepare for cable segment testing 1567. The Flex plays a graphic instruction asking the operator to substitute the Flex device 1134 for the STB 1563.

Figure 16E:
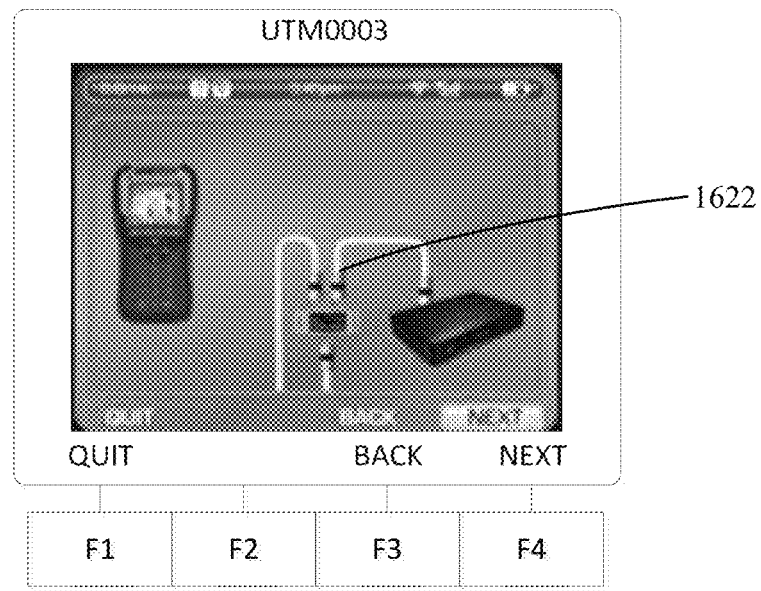
Figure 16F:
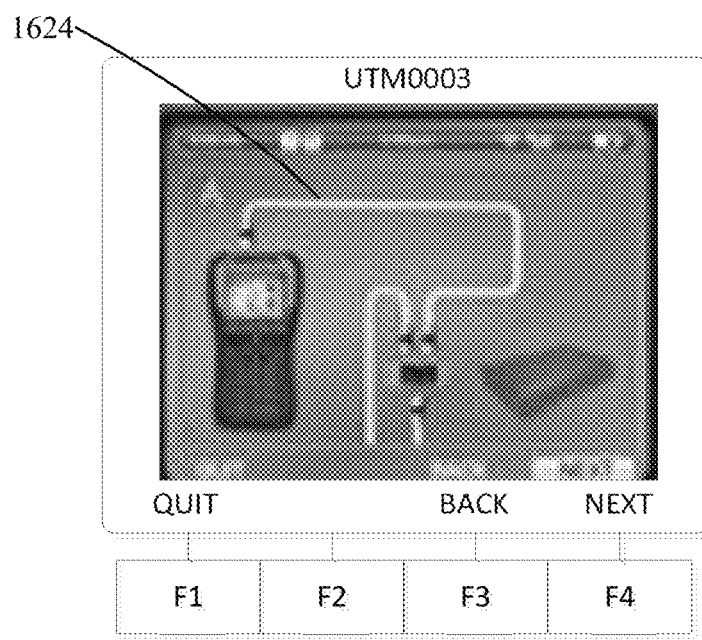

Throughout the MRDVR test sequence, the Flex device visually guides the operator in positioning the Flex relative to active and passive components. FIG. 16E illustrates a GUI animation of segmentation for infrastructure testing, starting with using the Flex to replace and emulate STB. In this example, the operator is instructed to detach one end of a coax cable 1622 that connects a first splitter to the STB. FIG. 16F shows the Flex device connected to the coax cable 1624 that was disconnected from the STB. Animation frames (not shown) can illustrate unfastening the STB connection, rerouting the cable, and making the Flex connection. The rules and test engine 1209 can detect that the connection is established or the user can advise that the connection has been made. The rules and test engine 1209 begins one or more tests of segments between the Flex device 1134 and the MRDVR. It emulates the STB 1154 and, in this example, performs a Packet Loss Test (PLT) to the DVR.

A PLT is an example of one of several tests available to the Flex device 1134. Versions of this test apply to MoCA, DOCSIS, Wi-Fi, and Ethernet networks. If the PLT test 1569 from the STB 1154 to the DVR shows no errors 1577, after the STB has passed testing, then the problem can be an intermittent problem with the STB, and further testing of the STB can be performed or the STB can be replaced. If the PLT test 1569 shows an error, then the segment isolation progresses to the next passive or active component. In this example, the infrastructure connecting the STB and MRDVR consists of passive coax cables and splitters. A wired Ethernet example might include diagnosis of an active wired switch, but the cabling in our MoCA example only includes passive components.

Figure 16G:
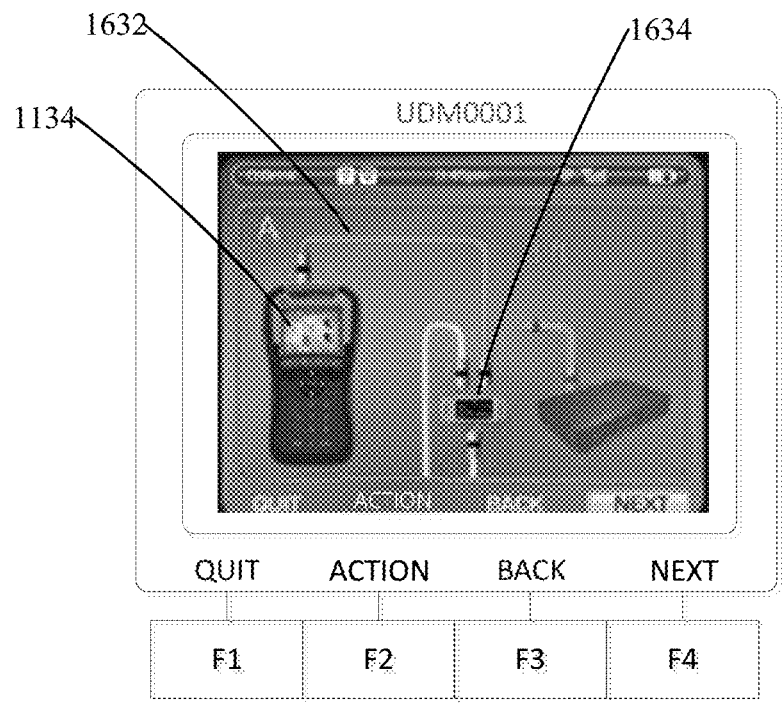

FIG. 16G illustrates part an animation used to direct an operator 1573 to replace the infrastructure coax between the Flex device 1134 and the first splitter 1634 with a good test coax cable 1632. Once the good coax cable 1632 has been installed, the rules and test engine 1209 conducts a PLT test 1579 with the replacement coax. The test will show either packets still being lost, or no packets lost 1587. If no packets are being lost, then the problem was in the replaced coax cable between the first splitter and the STB, and diagnostics are complete. However, if packets continue to be lost, then the operator is instructed to connect the Flex device 1134 bypassing the first splitter 1583. Once the first splitter has been bypassed, the rules and test engine 1209 repeats the PLT test to determine performance of the bypassed splitter 1589.

If the PLT or other test after bypassing splitter 1589 shows no errors, then the bypassed splitter is faulty and can be replaced. The diagnostics are complete. However, if the PLT test 1589 shows errors, the GUI server 1205 instructs the operator 1401 to loop back through the process with the next physical segment 1593, replacing the next coax segment with the good test coax. Any number of coax and splitter segments can be diagnosed in sequence.

After the operator has tested the passive coax and splitter components between the STB and the DVR, the final test is to connect the Flex device 1134 directly to the DVR 1174. In some test sequences, a Packet Loss Test can be performed. Or, playback from the MRDVR can be triggered and playback images viewed. In other examples, tests for image distortion, loss, freezing, and jitter, as well as MoCA-specific testing can be performed by the technology disclosed with minimal input from the operator. These tests can be conducted and video quality measured from packet statistics, without viewing of the playback.

While this test sequence is described as tracing from the STB to the MRDVR, of course the testing can run in the other direction, from MRDVR to STB.

Screen File and Action Files

In this section, we describe a GUI technology that supports user interaction and graphical animation playback. The screens and animations represented by FIGS. 16A-16G can be defined by one or more screen files 1203, and one or more action files 1240. Other file formats such as JSON or another tagged or key-value representation can be substituted for XML. These files functionally control what is rendered on the display, and what actions are to be taken based on inputs from the operator or from the physical Flex device ports. The order in which the screens appear on the display is can be thought of as workflow steps. FIG. 16A illustrates an example of a screen entitled SVA0011. FIG. 16B illustrates another example of a screen entitled SVA0012.

FIG. 16A the screen ID is "SVA0011". An example XML file 1220 can combine several screen descriptions. The description for SVA011 invokes a graphic file and assigns responses to function keys F1, F3, and F4. The graphic file 1230 named "Summary_multiDVR.mp4" is rendered as the image for screen SVA0011.

Example XML form file 1220 section for screen SVA0011 follows:

```
<Screen ShortDescription="Indicates equipment and wiring tested for Multi Room DVR Service" screenType="SummaryRecommendation" ID="SVA0011">
<UserInteractionScreen>
<Title>SUMMARY</Title>
<Description>
Animation showing equipment and wiring tested for Multi Room DVR Service.
</Description>
<FKeys>
<F1Key>QUIT</F1Key>
<F3Key>BACK</F3Key>
<F4Key>NEXT</F4Key>
</FKeys>
<Graphic>Summary_multiDVR.mp4</Graphic>
</UserInteractionScreen>
</Screen>
```

A style sheet or other program that parses this XML can be used to produce the display in FIG. 16A.

The corresponding action file 1240 segment for screen SVA0011 shows the actions to be taken for the values assigned to the function keys in the display XML file 1220. For example, pressing the F4 key with the screen SVA0011 rendered on the display passes the value "NEXT" to the associated action file 1240 section, which identifies the action as loading a screen titled UVA0026-000. The example of the action file section follows:

```
<Screen ScreenID="SVA0011-000">
<!-- Indicates equipment and wiring tested for Multi Room DVR Service -->
<Input Value="QUIT">
<NextScreen ScreenID="FINAL"/>
</Input>
<Input Value="BACK">
<NextScreen ScreenID="SVA0012-000"/>
</Input>
<Input Value="NEXT">
<NextScreen ScreenID="UVA0026-000"/>
</Input>
</Screen>
```

In another example, pressing the F3 key during the display of the screen SVA0011 will cause the value of "BACK" to be passed to the action file 1240 as an input value, which is interpreted by the action file as an instruction to load a ScreenID of "SVA0012-000", the tip screen illustrated in FIG. 16B. The display XML file 1220 for screen SVA0012 follows:

```
<Screen ShortDescription="Tips screen for Multi Room DVR Summary"
screenType="SummaryRecommendation" ID="SVA0012">
<UserInteractionScreen>
<Title>TIPS</Title>
<Description>Tips screen for Multi Room DVR Summary</Description>
<ScreenText>
```

*Multi room DVR test only involves the STB, the DVR, and the coax path between the two*The router is NOT required for MRDVR to work*Flex will perform Packet Loss Test between the STB and the DVR

```
            </ScreenText>
            <FKeys>
            <F1Key>QUIT</F1Key>
            <F3Key>BACK</F3Key>
            <F4Key>NEXT</F4Key>
            </FKeys>
            </UserInteractionScreen>
            </Screen>
```

In this example, the tip text 1608 is displayed. Nothing will occur if the operator presses F2, as there are no values associated with that button in the display XML file 1220 section for SVA0011, or in the action file 1240 below. If the operator presses F1 or F3 for values "QUIT" or "BACK" respectively, the action file performs a "FINAL" action that concludes diagnostics, and returns the operator to an initial screen. If the operator presses the F4 button, then the value "NEXT" is passed from the screen SVA0012 to the action file SVA0012-000", and the action file 1240 causes the GUI server 1205 to render the screen "SVA0011-000", thereby returning to the previous screen. Action file 1240 section associated with screen "SVA0012" follows:

```
            <Screen ScreenID="SVA0012-000">
            <!-- Tips screen for Multi Room DVR Summary -->
            <Input Value="QUIT">
            <NextScreen ScreenID="FINAL"/>
            </Input>
            <Input Value="BACK">
            <NextScreen ScreenID="FINAL"/>
            </Input>
            <Input Value="NEXT">
            <NextScreen ScreenID="SVA0011-000"/>
            </Input>
            </Screen>
```

As outlined above, the user can press the F4 button during a display of a ScreenID "SVA0011", which passes the value "NEXT" to its action file 1240 section. The action file then invokes the ScreenID "UVA0026-000", which has the following definition within the XML file 1220:

```
<Screen ShortDescription="Video Pixelates at DVR or at STB"
screenType="UserInteraction" ID="UVA0026">
<UserInteractionScreen>
<Title>Select where Video Pixelates</Title>
<Description>Video Pixelates at DVR or at STB</Description>
<ScreenText>Select where Video Pixelates</ScreenText>
<FKeys>
<F1Key>QUIT</F1Key>
<F3Key>BACK</F3Key>
</FKeys>
```

-continued

```
<SelectableGraphics>
<Graphic Value="PIXELATION_DVR" Label="Recording Issue at DVR"
graphicFile="pix_DVR.png"/>
<Graphic Value="PIXELATION_NON_DVR" Label="Recording Issue
only at Remote STB" graphicFile="pix_not_DVR.png"/>
</SelectableGraphics>
</UserInteractionScreen>
</Screen>
```

In this example, the operator is offered a choice of selecting a pixilation issue with a DVR, or a pixilation issue with a STB. This is just one example of a plurality of options that can be made available to an operator.

As the operator identifies the options for test selection, the expert system invokes a plurality of reusable procedures. These procedures can be illustrated by a directed graph, of which one example is shown in FIG. 17A.

Rule-Based Expert Systems and Directed Graphs

The expert systems embedded within the Flex device 1134 can be represented as an ordered or directed graph, which is illustrated in FIG. 17A, represented as a set of rules, which is illustrated in FIG. 17B, or in a combination of rules and graphs. The directed graph is a set of connected vertices, includes edges that are directed from one vertex to another. In one implementation, an Integrated Development Environment (IDE) can be used to create and edit a directed graph, which clearly identifies the possible flows based on conditions specified within the directed graph. The directed graph can then be processed into rule tables for a rule based expert system inference engine by traversing the directed graph of FIG. 17A into an equivalent rules table as illustrated in FIG. 17B. FIG. 17B is a partial example of a rule table generated by a directed graph. A more completed rule table would include branching instructions. For example, node TTA0002-0 1727A has one outcome of "Pass", and another outcome of "Fail". A more complete rule table FIG. 17B could contain two additional columns; one which identified branching instructions for a first outcome, and one that identified branching instructions for a second outcome if one existed. For the sake of brevity, FIG. 17B outlines only those outcomes necessary to illustrate the technology disclosed, and the processing order is from top to bottom of the rule table.

In this example, the nodes of the directed graph are named per a naming convention with 7 characters, in which the first 3 characters are alphabetic and the remaining 4 characters are numeric. The naming convention also allows for a suffix, which is used to identify the instance of a set of shapes that constitute a reusable code segment.

In the example shown in FIG. 17A, the first character can be a "T", "R", "S", or "U":

T—Test
R—Recommendation
S—Summary
U—User Input
The second character can be a "V", "D", or "T":
V—Video
D—Data
T—Toolbox
The third character can be a "W", "M", "R", "E", or "A":
W—Wi-Fi
M—MoCA
R—RF
E—Ethernet
A—All or more than one of the above In this example, a node named UVM0001 1701*a* indicates a screen file for a User Input, Video, and MoCA screen. A node indicating a user interface, such as UVM0001, can have entries in both a screen file and an action file. The remaining 4 digits of the 7 character name can be used to ensure unique labeling. For example, a screen file, represented in display XML file 2220, can include an entry, listed below, for UVM0001 1701*a*, which contains an animation showing how to replace a device for diagnostic purposes with the Flex device 1134.

```
<Screen ShortDescription="Animation showing Replace Device Under test
with Flex" screenType="UserInteraction" ID="UVM0001">
<UserInteractionScreen>
<Title>Flex to BHR eth</Title>
<Description>
Animation showing Replace Device Under test with Flex
</Description>
<ScreenText>Connect Flex as shown then click "NEXT" to
proceed</ScreenText>
<FKeys>
<F1Key>QUIT</F1Key>
<F2Key>ACTION</F2Key>
<F3Key>BACK</F3Key>
<F4Key>NEXT</F4Key>
</FKeys>
<Graphic>LiveTv_B2.mp4</Graphic>
</UserInteractionScreen>
</Screen>
```

Action file 1240 can include an entry, listed below, for UVM0001 1701*a* which contains the actions to be taken, based on the user's entry to the user interface. In this example node, UVM0001 1701*a* in the directed graph is equivalent to rule UVM0001 1701*b* in the rule table.

```
<Screen ScreenID="UVM0001-000">
<!-- Animation showing Replace Device Under test with Flex -->
<Input Value="QUIT">
<NextScreen ScreenID="FINAL"/>
</Input>
<Input Value="ACTION">
<NextScreen ScreenID="UVA0027-001"/>
</Input>
<Input Value="BACK">
<NextScreen ScreenID="UVA0027-001"/>
</Input>
<Input Value="NEXT">
<NextScreen ScreenID="UVA0034-000"/>
</Input>
</Screen>
```

As an illustration, the next code segment shows the value "NEXT" being passed from the screen file to the action file, which sets the FixedValue value to "N1" for the VariableName equal to "Instance" in step UVA0034 1731*a/b*. That is, the screen file entry for UVA0034 1731*a/b* is used to set the instance variable and no information is presented on the display.

```
<Screen ShortDescription="Sets Instance variable to 1"
screenType="UserInteraction"
ID="UVA0034">
<VariableMapScreen>
<FixedToVariable FixedValue="N1" VariableName="INSTANCE"/>
</VariableMapScreen>
</Screen>
```

In this example, setting the FixedValue variable to "N1" informs subsequent nodes of reusable code of the identity of the calling node. This allows the nodes of reusable code to perform as a subroutine call, with a return location, in a script without a subroutine structure.

Action file 1240 also includes an entry for UVA0034 1731*a/b* that passes control to a node named TTA0000 1725*a/b*.

```
<Screen ScreenID="UVA0034-000">
<!-- Sets Instance variable to 1 -->
<Input Value="NEXT">
<NextScreen ScreenID="TTA0000-000"/>
</Input>
</Screen>
```

Next, we describe an example cleanup node, which can be used to clean up memory and variables within the Flex device 1134. The node named TTA0000, which is a test node from the toolbox used for all tests, is used to clean up memory and variables as an initial step for a new test, and as a final step for any failed test components. For example, TTA0000-0 1725*a/b* is used to initially cleanup for node TTA0002 1725*a/b*, while TTA0000-003 1745*a/b* is used to cleanup if errors are encountered with nodes such as TTA0002 1727*a/b*, TTM0001 1747*a/b*, TTA021 1767*a/b*, or TTM0005 1776*a/b*. The instance of TTA0000-000 1725*a/b* calls the screen file entry for TTA0002-000 1727*a/b*, which enables the MoCA hardware on the Flex device 1134.

```
<Screen ShortDescription="Enables MoCA Module"
screenType="Active" ID="TTA0002">
<ActiveTestScreen>
<Title>Enabling MoCA</Title>
<Description>Enables MoCA module</Description>
<FKeys/>
<EnableHardware>
<hardware-component>MOCA</hardware-component>
</EnableHardware>
</ActiveTestScreen>
</Screen>
```

Once initial cleanup is complete, the next step in the test sequence activates the MoCA hardware in the Flex device 1134. The action file entry for TTA0002-000 1727*a/b* addresses a successful activation of the MoCA hardware by passing control to TTM0001 1747*a/b*, and addresses a failure to activate the MoCA hardware by passing control to TTA0000-003 1745*a/b*.

```
<Screen ScreenID="TTA0002-000">
<!-- Enables MoCA Module -->
<Input Value="PASS">
<NextScreen ScreenID="TTM0001-000"/>
</Input>
<Input Value="FAIL">
<NextScreen ScreenID="TTA0000-003"/>
</Input>
</Screen>
```

TTM0001 1747*a/b* passes control to TTA0021 1767*a/b* so that the Flex device 134*a/b* can acquire a DHCP address, as if it was a STB. Node TTA0021 1767*a/b* then passes control to node UVA0010 1759*a/b*, When the test modules that comprise UVA0010 1759*a/b* have run to completion with no failures, the AutoRoutineCompleted variable is set. If a module within the routines called by UVA0010 1759*a/b* indicates that the Flex device 1134 needs an update to a screen file, an action file, or device firmware, then node TTA0012 1779*a/b* is activated. A failure of an update to a screen file, action file, or firmware does not signal the system to stop processing. Once testing is complete, in order to change the IP filter to the DVR IP address, UVA0010 1759a/b passes control to node TTA0030 1788a/b, which in turn obtains all other IP addresses on the current subnet by passing control to TTM0005 1776a/b. Node TTM0005 1776a/b then passes control to additional nodes that perform additional tests on the subnet.

Data Speed Message Map Example

Figure 18:
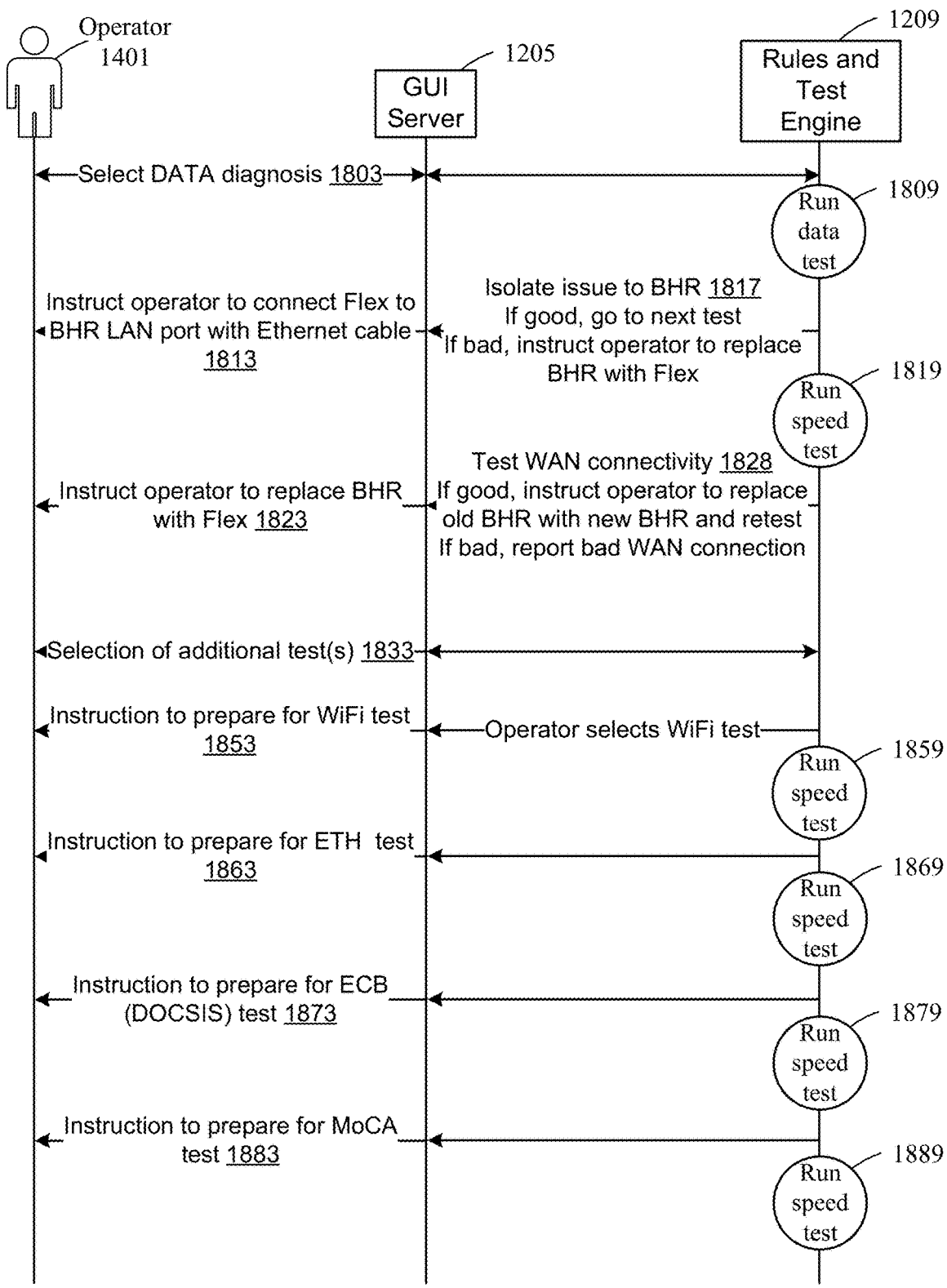
FIG. 18, like FIG. 15, illustrates an example of messaging during test of data access across various physical layers in the home network.

FIG. 18, like FIG. 15, illustrates an example of messaging during a test. This test looks for bottle necks in access speed to the Internet from devices connected through the Broadband Home Router (BHR) via various physical layers. The Flex can be positioned in place of a STB, home computer, laptop or other device that accesses the Internet. Once speedy access to the Internet from the BHR position is confirmed, bottlenecks within the home can be analyzed.

Data issues can occur in MoCA, DOCSIS, Ethernet or Wi-Fi home networks, and can include connectivity, speed, or partial data loss issues. In one implementation, a speed test can be useful in discovering the location of a fault within a network, including a Local Area Network (LAN) and a Wide Area Network (WAN). In some cases, such as with a broken connector or a dead device, the problem is obvious. However, some problems required an expert understanding of the intricacies of a data network.

In one implementation, an operator 1401 selects DATA diagnosis 1803 from a GUI server 1205, as illustrated in 1407 of FIG. 14A. The GUI server invokes the DATA test 1809 to be processed by the rules and test engine 1209. In this example, the data test uses a speed test as a first step in analysis of the home network. The speed test can identify if network connectivity is available. The speed test can also be used by the rules and test engine 1209 to analyze the quality of the network connection. The operator 1401 is instructed to connect the Flex device 1134 to a BHR 1120 LAN port with a known good Ethernet cable 1813. This will isolate the issue to the BHR 1817. The rules and test engine 1209 then runs a speed test 1819, which first validates that a connection to the Internet is available, and second validates that a good connection works at an expected speed 1828. The expert system recognizes that the first step in the data test sequence is to validate the WAN connectivity.

If the connection to the Internet through the BHR LAN port is not available, or the quality of the connection is not as expected, the problem can be the BHR. The rules and test engine 1209 can instruct the operator 1401 to replace the BHR with the Flex device 1823, which then simulates the actions of the BHR. If the connection is still not available, or the quality of the connection is still not as expected, the rules and test engine 1209 will send a message to the operator 1401 through the GUI server 1205 to report a bad WAN connection, and the diagnostic is complete. However, if the connection to the Internet by the Flex device performs as expected, the operator is instructed to replace the old BHR with a new BHR and retest.

If the connection to the Internet through the BHR LAN performs as expected, the rules and test engine can send a message to the operator to select an additional test 1833. In this example, an additional test can include a Wi-Fi test 1859, an Ethernet test 1869, a DOCSIS test 1879, or a MoCA test 1889.

A Wi-Fi test can include a Wi-Fi service embedded in the BHR, or a Wi-Fi service provided by a device such as a Wireless Access Point (WAP) that is connect to the BHR by coax or Ethernet cable. If the operator selects a Wi-Fi test for a Wi-Fi service embedded in the BHR, the operator 1401 is instructed by the rules and test engine 1209 to stand 6 feet from the BHR in a direct line of site 1853, with the Flex coax connector pointed at the router. The rules and test engine 1209 then connects to the Wi-Fi service within the BHR using information such as SSID and password supplied by the operator, then invokes a speed test 1859. If the speed test finds that the Wi-Fi service in the BHR is performing as expected, the summary results of the speed test are sent to the operator 1401, and the diagnostic is complete. The operator can also be instructed to move the BHR to a location where the Wi-Fi service offered by the BHR is closer to the devices using the Wi-Fi service. If the speed test finds that the Wi-Fi service in the BHR is not performing as expected, the operator is instructed to replace the BHR with a new BHR and retest.

If the operator selects a Wi-Fi test for a Wi-Fi service provided by in a WAP, the operator 1401 is instructed by the rules and test engine 1209 to stand 6 feet from the WAP in a direct line of site, with the Flex coax connector pointed at the WAP. The rules and test engine 1209 then connects to the Wi-Fi service within the WAP using information such as SSID and password supplied by the operator, then invokes a speed test 1859. If the speed test finds that the Wi-Fi service in the WAP is performing as expected, the summary results of the speed test are sent to the operator 1401, and the diagnostic is complete. The operator can also be instructed to move the WAP to a location where the Wi-Fi service offered by the WAP is closer to the devices using the Wi-Fi service. If the speed test finds that the Wi-Fi service in the WAP is not performing as expected, the operator is instructed to replace the WAP with the Flex device and retest.

WAP devices can be connected to the LAN with cable such as coax or Ethernet. If the cabling is coax, the infrastructure between the WAP under test and the BHR can have zero or more bridges, one or more segments of coax, and zero or more splitters. For each segment of coax, and for each splitter, segmentation can occur wherein the infrastructure is tested for each segment moving from the WAP to the BHR. If the cabling is Ethernet, the infrastructure between the WAP under test and the BHR can have one or more segments of Ethernet cabling, and zero or more switches or hubs. For example, in FIG. 11, the WAP 1130 is connected to the BHR 1120 by one segment of Ethernet cable. In this example, the Wi-Fi speed test 1859 would have only one segment to test after the WAP 1130.

If the operator selects a data Ethernet test 1863 for an Ethernet device such as a game console 1162, the rules and test engine 1209 would instruct the operator to substitute the Flex device 1134 for the game console 1162, and test each segment between the game console and the BHR, alternating between Ethernet cable, a MoCA bridge 1160, coax 1115, and splitters 1150, 1110.

If the operator selects a DOCSIS test 1879, the operator is instructed to prepare for a DOCSIS test 1873 and a segmentation equivalent to the Wi-Fi speed test 1859 is invoked by the rules and test engine 1209.

If the operator selects a MoCA test 1889, the operator is instructed to prepare for a MoCA test 1883 and a segmentation equivalent to the Wi-Fi speed test 1859 is invoked by the rules and test engine 1209.

Example Active and Passive Tests Invoked by Expert System

The following list of tests and other implementations of the technology disclosed can include one or more of the following tests or test features and/or tests or test features described in connection with additional tests disclosed. In the interest of conciseness, the combinations of tests disclosed in this application are not individually enumerated and are not repeated with each base set of tests or test features. The reader will understand how tests or test features identified in this section can readily be combined with sets of base tests or test features identified as implementations impacting details of test implementation and analysis and of setting thresholds based on test results.

Each of the active and passive tests below, as components of expert system tests such as Video On Demand, MRDRV, Live TV, and Data. These tests can be incorporated and can be executed on the PHY interfaces 1360 identified in FIG. 13.

Active Tests

TST-BURST

Provides a network quality test with bursty traffic, possibly useful to evaluate a traffic policing and traffic shaping framework.

TST-ECHO

Provides an overall snapshot of basic network health, measuring important characteristics such as jitter, latency, and loss. It is useful for verifying SLA compliance and in determining network integrity for VoIP and other real-time protocols that are heavily affected by these parameters.

TST-ETHDM-Y1731

For Y.1731-enabled networks, provides an Ethernet-layer tool focused on frame delay measurements between the unit and a known endpoint. This type of OAM testing is sometimes referred to as "ETH-DM"

TST-LINKTRACE-xx

Provides a layer 2 (MAC/Ethernet) tracing tool for reporting the hops a test frame traverses from source to destination, compliant with a subset of either IEEE 802.1ag or ITU-T Y.1731. It can serve as an important tool for determining the topology of a LAN service, especially for services that involved multiple bridged LANs to complete the end-to-end path.

TST-LPBK-xx

Provides a tool for fault verification and isolation, as well as measurement of important network characteristics such as latency and loss. The test operates at the Ethernet layer on an 802.1ag and Y.1731-enabled networks, where loopback request frames are sent to a target NE (MEP/MIP), which should then return the frames to the unit for analysis. This type of OAM testing is sometimes referred to as "ETH-LB".

TST-MLPBK-Y1731

Performs a multicast loopback to identify MEPs on the service. The test operates at the Ethernet layer, where a multicast loopback request frame is transmitted into the network and then returned to the originator by all available MEPs.

TST-PING

Verifies that a specified IP destination (endpoint) can be reached, as a basic test of network-level connectivity. The destination device must support ICMP ping.

TST-RFC2544

Run a group of tests originally designed to benchmark the performance characteristics of a network interconnecting device, adapted to refer to overall service or link performance.

TST-THRUPUT

Determines the maximum data rate that can be sent between the unit and a remote echo server, up to the CIR specified when the test session was established. This test is most useful when testing data services rather than real-time transport such as VoIP or video. For this reason, the test is best suited for evaluating data flow performance for processes such as file transfers and web page traffic. This test can be used as a speed test, as it measures throughput.

TST-TRACERT

Provides a standard ICMP over UDP traceroute function that runs three concurrent traceroute processes and reports every router "hop" along the path. The results provide a topological view of the route that packets are using to reach the destination.

TST-TWAMP

Initiates and manages a Two-Way Active Measurement Protocol (TWAMP) client session to analyze and report metrics such as network jitter, latency, and loss.

Passive Tests

MON-ETH-CAPTURE

Launches a capture of Ethernet frames according to any filter and/or capture settings provided. Following the capture, a capture file is generated that can be transported off the unit for external analysis.

MON-ETH-CONN

Tracks and reports the conversation statistics between either pairs of Ethernet MAC addresses or pairs of IP addresses, including the number of bytes and frames being transmitted in each direction of the conversation.

MON-ETH-FRMSIZE

Provides a comparative view of the size of Ethernet frames flowing through the service. Results are presented as comparative frame counts and percentages of total frame count.

MON-ETH-PRTDIST

Reports on IP packet distribution based on TCP/IP link, internet, and transport-level protocols, such as OSPF, and TCP, or application-level protocols such as HTTP and SNMP. It provides a comparative view of network usage according to logical protocols.

MON-ETH-PTY

Provides a high-level view of traffic on the link sorted by VLANs and VLAN priorities, or VLANs and DSCP (class of service/CoS) values, as detected within Ethernet frame and IP packet headers, as applicable.

MON-ETH-TOPU

Reports the top users of the network based on bandwidth consumption. Depending on the test setup, a "user" can be a device sending traffic or an application protocol in use on the network. This information provides a high-level view of the primary users of the network and what the network is being used for.

MON-ETH-VLAN

Provides comprehensive layer 2 statistics on the link sorted by VLAN, as detected within Ethernet frame headers. It includes overall data measurements such as frame and data counts, link utilization, frame sizes, and a variety of other information.

Service Based Testing Category

Regarding service based testing category, a brief introduction is provided before FIGS. 19-23 are discussed.

Introduction

Historically, cable delivery of home entertainment has involved the use of MPEG video transport. Cable television providers encode and transmit cable channels using quadrature amplitude modulation (QAM) over coaxial cable or "coax". As IP-based packet traffic becomes more integrated with video devices in the home, new standards, such as those created by the MoCA organization, have been developed to take advantage of this integration. MoCA is a technology that allows a coax network to carry additional signals that travel on a frequency band mostly unused by cable TV transmissions.

Tens of millions of homes have been equipped with MoCA technology, and the number continues to grow. The increasing demands for network bandwidth in the home, for applications such as high definition (HD) television, interactive gaming, video on demand (VOD) and digital video recorders (DVR), requires increasingly complex in-home networking. Technologies such as MoCA and data over cable service interface specification (DOCSIS) are being implemented to address these demands. However, incompatibilities between competing technologies and inevitable failure of active and passive devices create a need for expert knowledge in the field to maintain and repair equipment. This growing need challenges technical support organizations. It will be impractical to scale a support workforce possessing the technical competence currently required to service this growing infrastructure.

On premises testing methods typically entail technicians using special purpose devices visiting the installation to measure the contributions of various packet errors to signal degradation, including packet loss, jitter, and latency. These devices made it possible to monitor traffic between two active devices, tap into the line to measure throughput, and provide raw statistics to technically trained personnel. Technicians with strong technical insight were capable of deciphering the statistics delivered and determining what actions to take to identify and repair faults in a home network. One such example device, used to test MoCA signals routed to a set-top-box and evaluate performance of the set-top-box, employs portions of the technology disclosed in commonly owned U.S. Pat. No. 8,146,125 entitled, "Computerized Device and Method for Analyzing Signals in a Multimedia over Coax Alliance (MoCA) Network and Similar TDM/Encrypted Networks" which is hereby incorporated by reference for all purposes.

The disclosed technology describes a Configurable Test Subsystem in which tests can be implemented as services, e.g., a cable company has a customer with an issue, and the services running in "Docker" (or similar technology) containers can be invoked to perform testing and provide results for analysis to a central office of the cable company, for example. Containers are useful to encapsulate processes and the filesystem environment of the process—enabling the process to be deployed and executed in a variety of environments. (Docker is a product of Docker, Inc. of San Francisco, Calif.).

A request to run the test comes from a central office through the internet into the containers. Alternatively, a local trigger, such as can be provided by a scheduler on board a device, can be used to initiate running a test. In one implementation, the central office will "push" test cases to a container once a problem is reported. Additionally, there are cases where it may be desirable to block PC traffic, in which case the container can receive instructions to block traffic from specific machines. Such techniques can be useful when, for example a network card fails and fills a network with miscellaneous traffic. This can serve as an interim patch until service personnel can come out to replace the card. Devices that are targets for containerized tests can be Linux based.

In another scenario, the technology disclosed provides for automatically scheduling a test set for the home MoCA LAN 1100 housed by the Configurable Test Subsystem 1134 based on a scheduling paradigm selected under control of the central office. The technology disclosed can then initiate one or more tests to run autonomously according to a schedule, process the results of the tests, and provide results to an operator back at the home office. Results can instruct the operator as to whether there is a problem in that portion of the home MoCA LAN 1100, and potentially whether an on-site follow up visit is required to remediate the problem. Details of the Configurable Test Subsystem 1134 are shown in the block diagram illustrated in FIG. 19.

Active and Passive Testing

Testing regimes can include implementations having one or both of active monitoring and passive monitoring of network components, links, devices and the like. Active monitoring typically entails injecting test traffic onto a network and monitoring the flow of that traffic. Active monitoring techniques are especially useful for conducting simple test protocols; for example, timing the latency between two devices on a wide area network, as well as more complex tasks such as collecting measurements to verify quality of service (QoS) agreements are being met. Active monitoring techniques that provide some control over an experimental scenario can enable collection of data on particular aspects of network performance.

Passive monitoring techniques typically involve less control over an experimental scenario and more observation. For example, rather than injecting an artificial traffic flow into an MoCA network under test, passive monitoring techniques can include monitoring traffic that is already present on the network. Passive monitoring techniques are typically conducted using a device on the network to capture network packets for analysis. This can be done using one or more probes configured to capture network data, or with built-in capabilities on switches or other network devices, or combinations thereof. Passive network monitoring can collect large volumes of data which can be used to derive a wide range of information; for example, TCP headers contain information that can be used to derive network topology, identify services and operating systems running on networked devices, and detect potentially malicious activity by hackers or the like.

Configurable Test Subsystem System Stack

Figure 19:
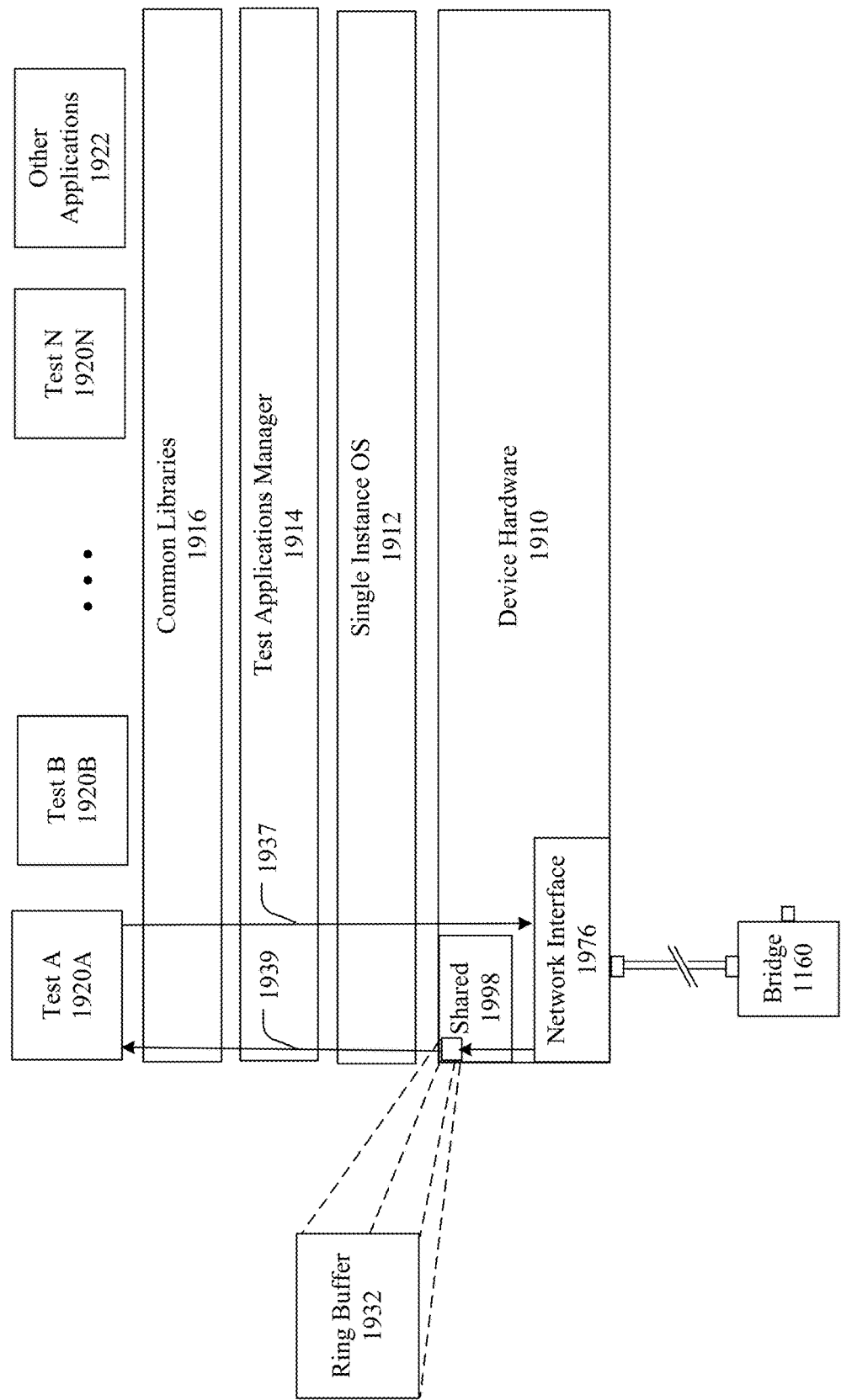
FIG. 19 illustrates a block diagram of configurable test subsystem for an example MoCA device.

FIG. 19 illustrates a block diagram of a configurable test subsystem for an example MoCA device. In FIG. 19, a Configurable Test Subsystem 1134 is illustrated with reference to a component portions making up a system stack of the subsystem. Hardware layer 1910 includes one or more network connections, processor and memory and various input and output devices. Specific components, interconnections and configurations can vary, however for a more detailed view of one example implementation of hardware 1910 components, reference may be had to FIG. 23 herein and accompanying text. Single instance OS 1912 resides in storage, transitory and/or non-transitory, and provides control over access to system resources, such as the devices making up hardware layer 1910, manages storage and provides resources accessible to other programs and applications of higher layers. A Test Applications Manager 1914 is deployed as a part of configurable test subsystem 134 as part of the manufacturing process pre-installation, and enables receiving and installing of test sets, such as test case A 1920A, test case B 1920B, test case N 1920N, etc., as well as other applications 1922 that can have non-test related functionality. Test Applications Manager 1914 supports common libraries 1916 to provide functionality accessible by any of test case A 1920A, test case B 1920B, test case N 1920N, and so forth.

Further with continued reference to FIG. 19, in an example scenario of conducting testing, test case A 1920A during execution generates and sends outbound test traffic 1937 via OS 1912 and network interface 1976 of device hardware 1910. A second network device 160, reachable by the MoCA, serves as a "target" that receives the outbound test traffic 1937 sent by test case A 1920A and replies with a response traffic 1939. Response traffic 1939 is received by network interface 1976 and copied into ring buffer 1932 residing in a shared memory 1998 portion of the device hardware 1910. Test case A 1920A retrieves response traffic 1939 from the ring buffer 1932. Direct retrieval of response traffic 1939 from the ring buffer 1932 in shared memory portion of hardware 1910 advantageously provides test case A 1920A the capability to circumvent delays from accessing response traffic via system utilities.

For example, and with reference to FIG. 11 and FIG. 19, in order to test connectivity between device BHR 1120 and bridge 1160, test case A 1920A which resides in a container deployed in configurable test subsystem 1134 of BHR 1120 could generate a "ping" as outbound traffic 1937 directed to bridge 1160 of the MoCA. Bridge 1160 would respond with a ping response, the response traffic 1939. Depending on the network conditions, e.g., the "health" of the connections and devices 1110 and 1150 as well as target device, bridge 1160, and originating device BHR 1120, the ping response will exhibit a certain latency to traverse the network path. Depending upon the latency measured, and the latency expected, a health of the devices along the path can be inferred. If no ping response is received (timeout) a failure of one or more of these devices is implicated.

While the foregoing has used a relatively simple "ping" test scenario to illustrate the operation of just one example configuration of select devices, other more complex test scenarios are readily incorporated into containerized entities for deployment onto network devices of various types and configurations without significantly departing from the techniques described herein.

Ring Buffer

Figure 20:
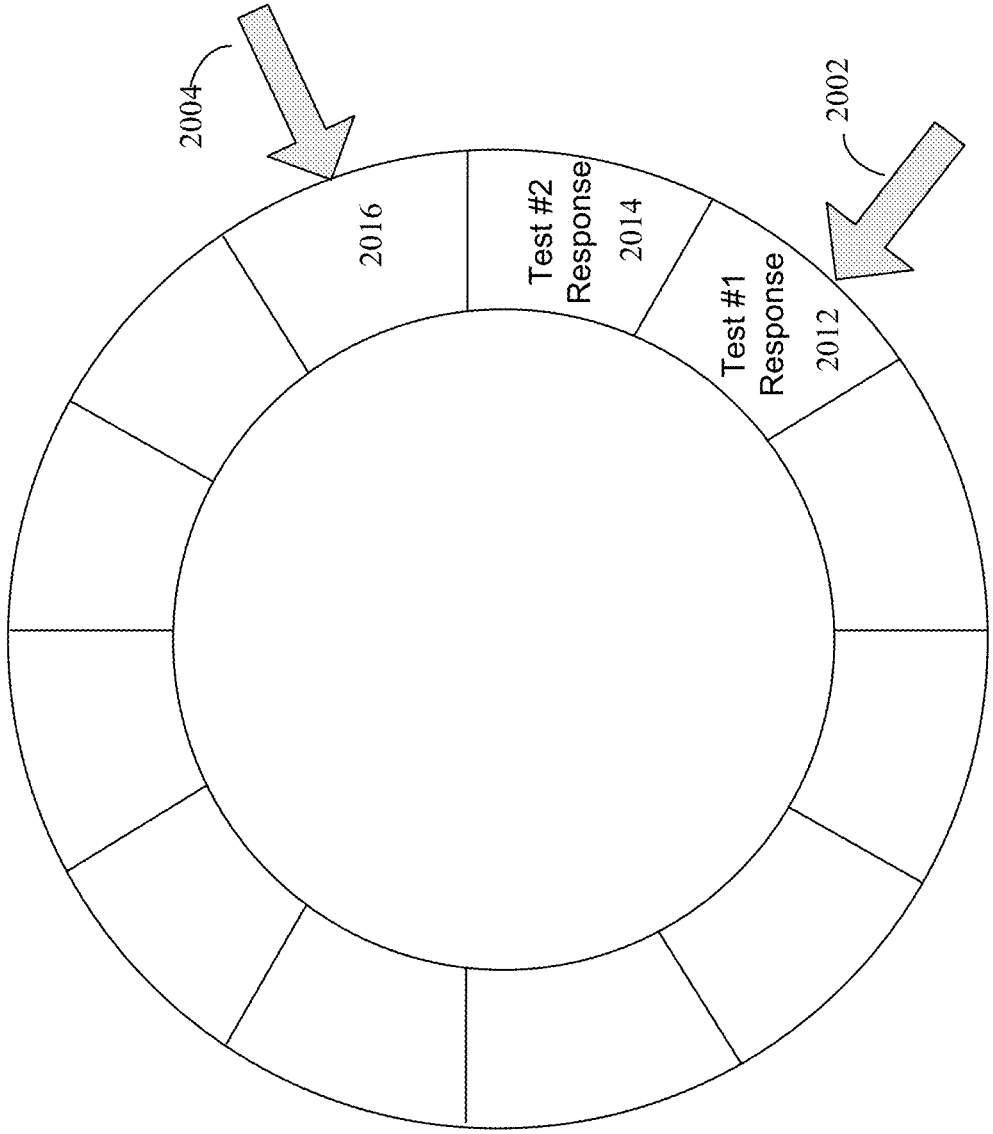
FIG. 20 illustrates a block diagram of a ring buffer for an example MoCA device.

FIG. 20 illustrates a block diagram of a ring buffer for an example MoCA device. Ring buffer 1932 of FIG. 20 is depicted schematically and includes a read pointer 2002 that points on a next object to be read from the buffer, in this case, a first test result 2012. A second test result 2014 would be read subsequently in FIFO order, when, after reading the first test result, the ring buffer read pointer 2002 is incremented to point on the second test result 2014. Ring buffer 1932 also includes a write pointer 2004 that points on a first empty position 2016, into which a next test result can be written. After writing the next test result into position 2016, write pointer 2004 would also be "incremented" "counter-clockwise" to point to the next available location for storing results.

While the foregoing has used a relatively simple "ring" schematic block diagram scenario to illustrate the operation of just one example configuration of shared memory buffer, many complex shared memory configurations not illustrated by FIG. 20 for clarity, such as linked lists, doubly linked lists, queues, and so forth can be used to realize the operation of a circular queue implemented in shared memory space and are readily incorporated into containerized entities for deployment onto network devices of various types and configurations without significantly departing from the techniques described herein.

Test Process Latency Reduction

Figure 21A:
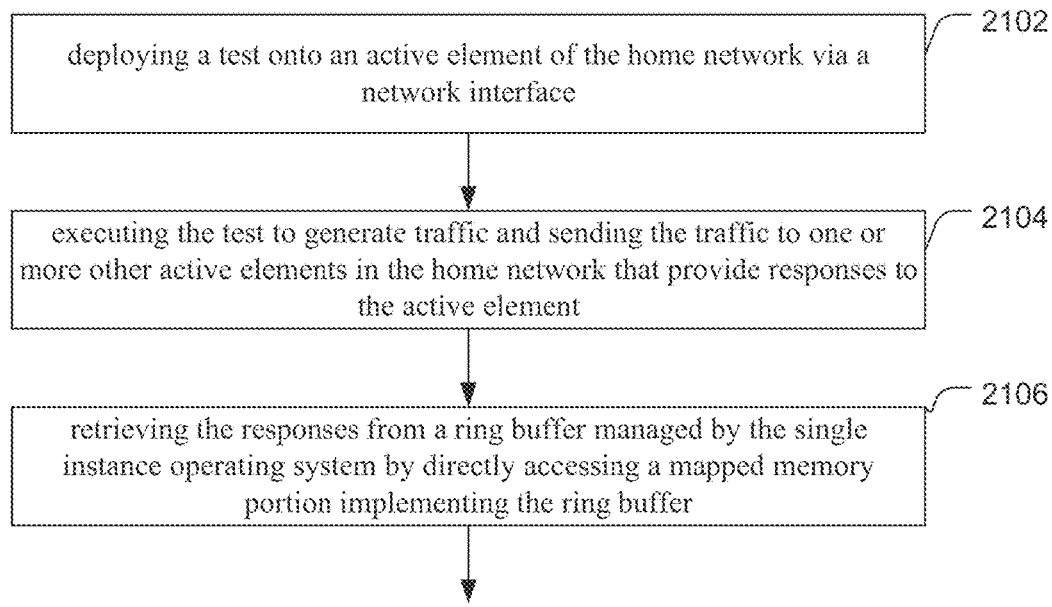
FIG. 21A illustrates a flowchart depicting operation of a containerized test system implementation in an example MoCA network.

FIG. 21A is a flowchart showing a method 2100A of removing latency in performance tests conducted on an in home network by deployable containerized tests. Flowchart 2100A can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21A. Multiple actions can be combined in some implementations. For convenience, this flowchart is described with reference to the system that carries out a method. The system is not necessarily part of the method.

At action 2102, a test is deployed onto an active element of the home network via a network interface. The test can be containerized into an open platform distributed system container that shares with one or more other containers a single instance of an operating system.

At action 2104, the test is executed to generate traffic and to send the traffic to one or more other active elements in the home network that provide responses to the active element.

At action 2106, the responses are retrieved from a ring buffer managed by the single instance operating system by directly accessing a mapped memory portion implementing the ring buffer. Retrieving the responses from the ring buffer by directly accessing the mapped memory portion implementing the ring buffer enables the responses to be retrieved with less latency than retrieving responses using system calls.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 22A:
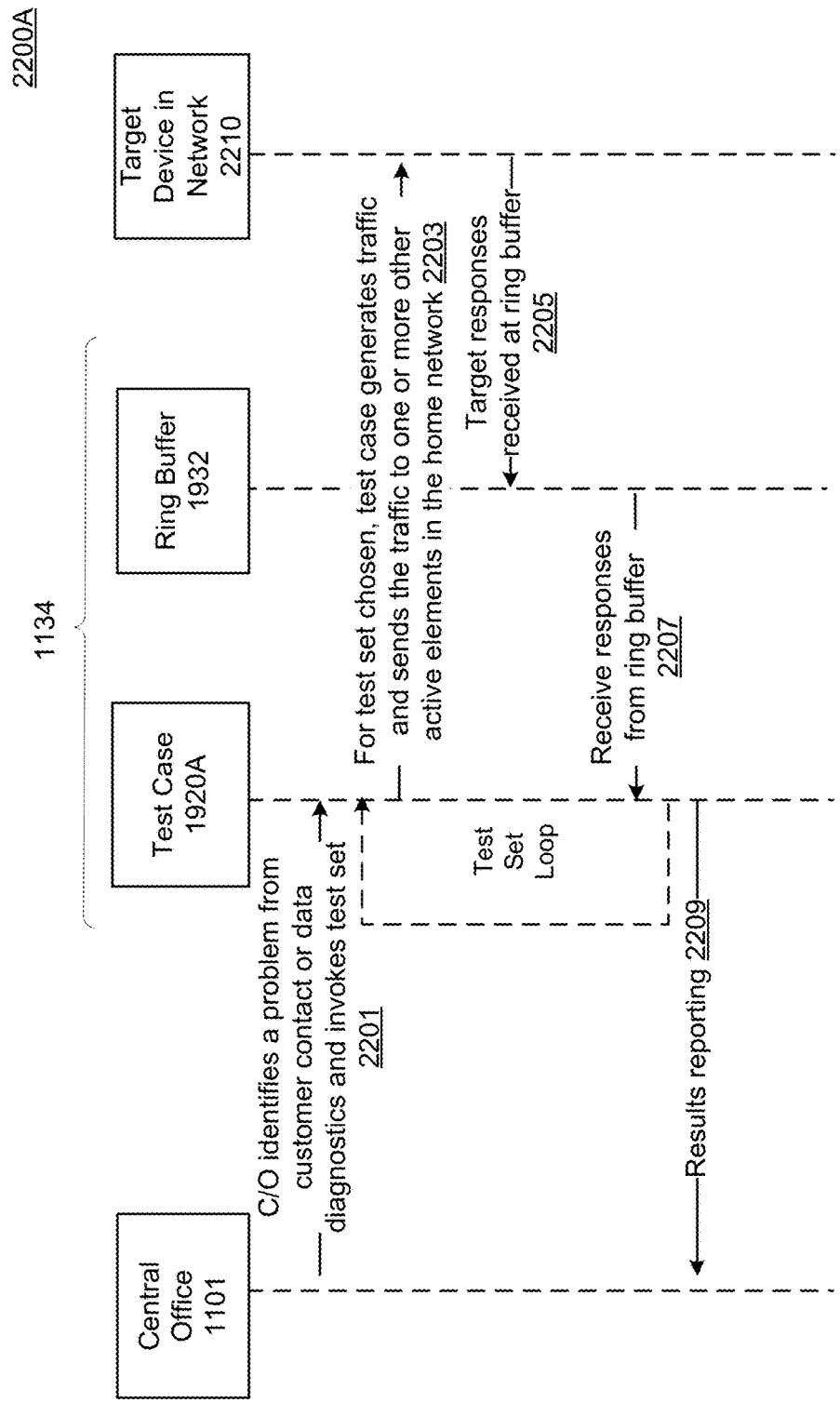
FIG. 22A illustrates one example of messaging during a test.

FIG. 22A illustrates one example 2200A of messaging that includes a sequence of messages between a central office 1101, a test case 1920A, ring buffer 1932 and a device under test 2210. The Central Office 1101 can invoke test cases, such as test case 1920A deployed on one or more devices comprising a MoCA network. Test case 1920A includes a containerized test set that can be deployed on a device as part of the manufacturing process or downloaded by the Central Office after customer install. Central Office activation of the one or more test cases can occur under human operator control, as part of an expert system initiated test operation, in response to a scheduler process activating the test case, or various combinations thereof. The test cases, such as test case 1920A can operate to perform self-testing of the device upon which the test case resides, on other devices on the MoCA network, or combinations thereof. The test case 1920A can relay results from conducting the testing to the central office 1101.

In one example, the central office 1101 identifies a problem with a particular customer installation of a MoCA from a customer contact or data diagnostics and invokes test set 2201.

Problem reports can include example video displays, data, diagnostics or combinations thereof. Some implementations can include an expert system deployed at the central office 1101 to examine video and data problems experienced on the home network and autonomously invoke an appropriate test set. Alternatively, a system operator can invoke discrete tests when the expert system is not used.

The test case 1920A accepts input from the central office 1101 commanding the container to begin the selected test set 1920A. In one application, test set 1920A begins analysis of a MoCA network by conducting tests in the test set that generate test traffic to a target device (under test) 2210 in the MoCA network, retrieve and analyze responses. As testing proceeds, the test set 1920A proceeds based on measurements from, or tests performed, on various devices, such as target device 2210, in the network under test. While many test sets are configured to run autonomously without human intervention, in some instances the test case 1920A can prompt a human operator to enter data or to perform additional actions as needed. The test case 1920A can include a test set that addresses a selected problem or a selected test regime. Test case 1920A can generate and send traffic to one or more active elements (e.g., 2210) in the home network to conduct testing 2203. Results from the test(s) are received 2205 from the target device under test 2210 at a ring buffer 1932 implemented in a mapped memory portion of an operating system hosting the containerized test 1920A. The test case 1920A includes logic to receive 2207 responses from the ring buffer 1932 thereby reducing latency from returning the results via the operating system of the device hosting test case 1920A. As results from the test case 1920A isolate network segments and identify issues within the home network under test, the test case 1920A can report 2209 those results to the central office 1101. Unilaterally and automatically, some test case 1920A implementations can, via use of rules, choose to run additional test sets to gather further information and/or further isolate the problem. For example, a Wi-Fi test can be performed by the test case 1920A to solve a user identified problem with a Wi-Fi device that is not working. The Wi-Fi test may, in a first step, find a fault with the Wi-Fi device in a first test set, or may find no fault with the Wi-Fi device and direct a further test setup to isolate a fault in a cable connecting the Wi-Fi device to the home network.

Deploying Test Sets Using Provisioning

A test set is deployed onto a device being configured as an active element of the home network via a provisioning server. Test sets can be deployed by a manufacturer (or other supply chain actor). The test sets can be provided by a network provider (e.g., Verizon, Comcast or the like) to the manufacturer (or other supply chain actor) of devices under an order for the devices to be configured. Orders can be sent to the manufacturer (or other supply chain actor) via network or the like and provisioned onto devices being configured by a provisioning server.

Figure 21B:
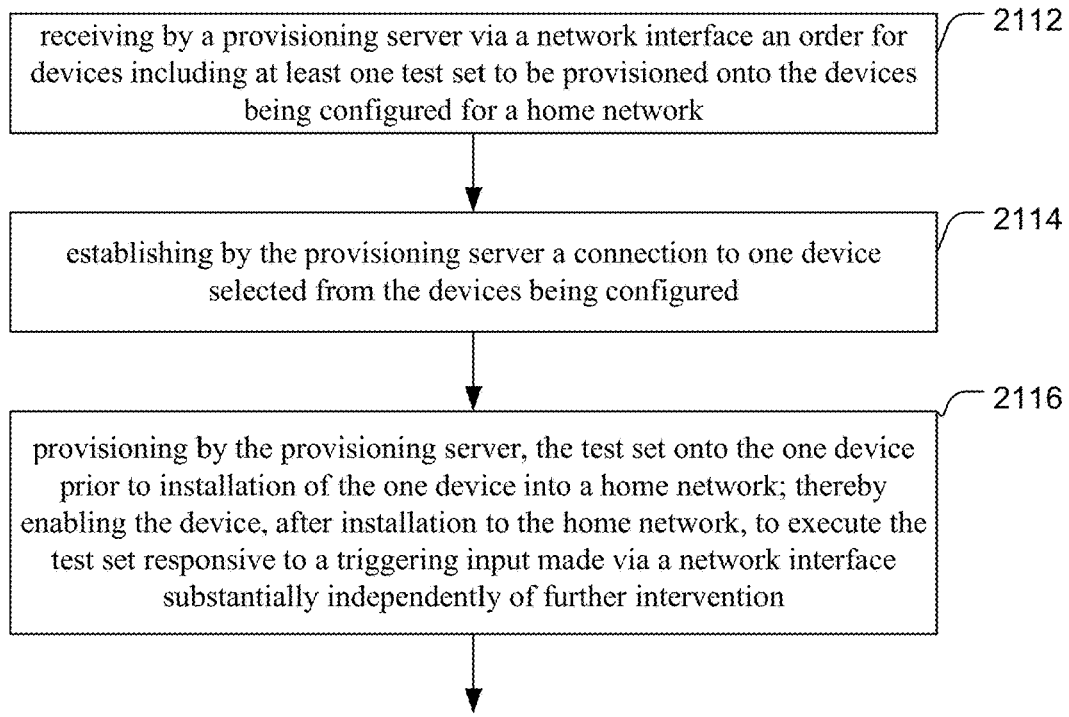
FIG. 21B illustrates a flowchart depicting operation of a provisioning process for provisioning containerized test sets onto devices for use in an MoCA network.

FIG. 21B is a flowchart showing a method 2100B depicting operation of a provisioning process for provisioning containerized test sets onto devices being configured as active elements for use in an MoCA network. Flowchart 2100B can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21B. Multiple actions can be combined in some implementations. For convenience, this flowchart is described with reference to the system that carries out a method. The system is not necessarily part of the method.

At action 2112, a provisioning server receives via a network interface an order for devices including at least one test set to be provisioned onto the devices being configured for a home network.

At action 2114, the provisioning server establishes a connection to one device selected from the devices being configured.

At action 2116, the provisioning server provisions the test set onto the one device prior to installation of the one device into a home network. Such provisioning can enable the device, after installation to the home network, to execute the test set responsive to a triggering input made via a network interface substantially independently of further intervention.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 22B:
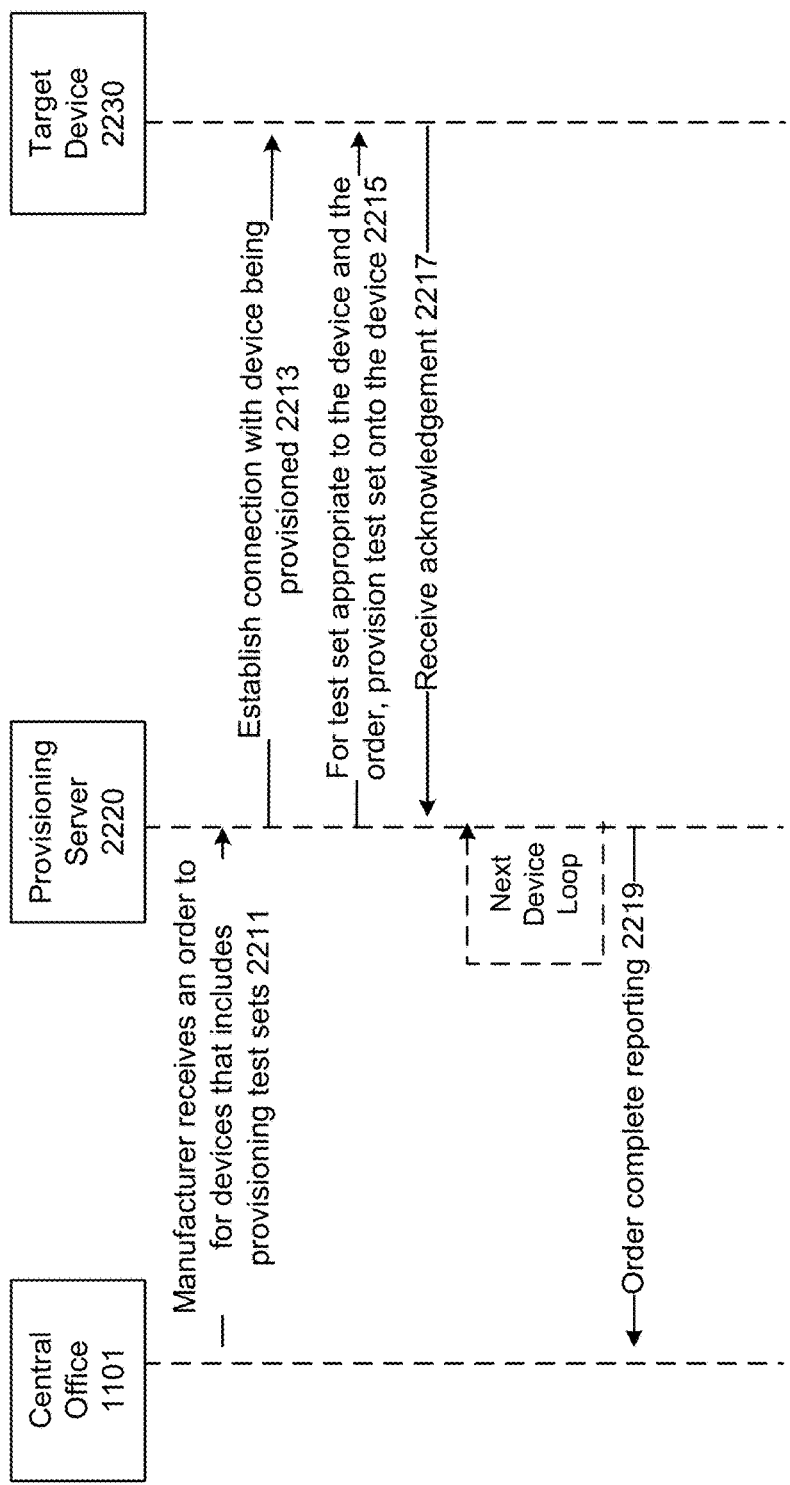
FIG. 22B illustrates one example of messaging during provisioning test sets onto devices as part of manufacturing.

FIG. 22B illustrates one example 2200B of messaging during provisioning test sets onto devices as part of manufacturing. Message map 2200B includes a sequence of messages between a central office 1101, a provisioning server 2220, and a target device 2210 onto which test sets can be provisioned. The test sets can be provided by a network provider (e.g., Verizon, Comcast or the like) to the manufacturer (or other supply chain actor) of devices under an order for the devices to be configured. Orders can be received 2211 from the central office 1101 of the network provider by one or more provisioning servers 2220 of the manufacturer (or other supply chain actor) via network or the like and provisioned onto devices 2230 being configured by a provisioning server. A provisioning server 2220 establishes 2214 a connection with the target device 2230 being provisioned. Once connection is established, the provisioning server 2220 provisions 2215 the test set appropriate to the device and the order onto the target device 2230. When provisioning server 2220 detects that provisioning is complete, either through tracking state or receiving an acknowledgement 2217 from the target device 2230, the provisioning server 2220 can perform the process again repeatedly if needed to provision additional devices until the order is completed. Once the order is completed, the provisioning server 2220 can report 2219 that the order is complete to the central office 1101.

Test Process Examples

Figure 21C:
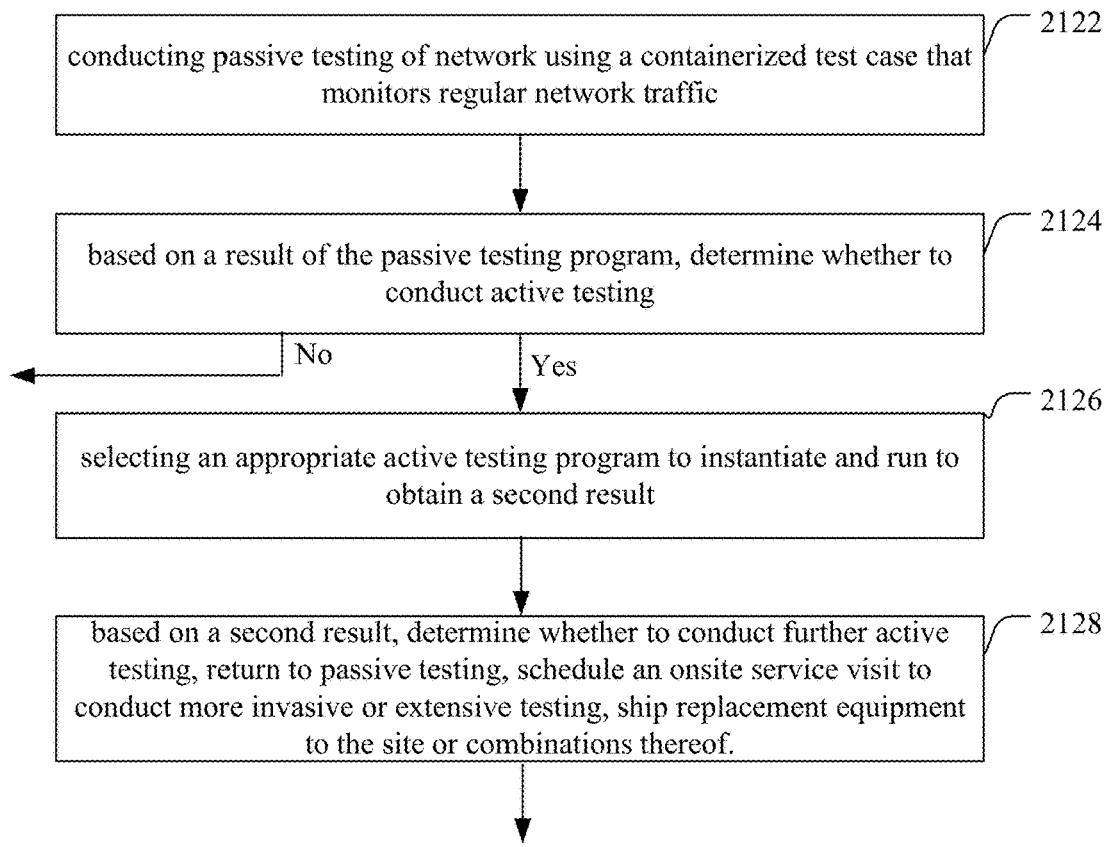
FIG. 21C is a flowchart showing a method 2100C depicting an example operation of a testing process implementable using containerized test sets onto devices being configured as active elements for use in an MoCA network.

FIG. 21C is a flowchart showing a method 2100C depicting an example operation of a testing process implementable using containerized test sets onto devices configured as active elements for use in an MoCA network. Flowchart 2100C can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21C. Multiple actions can be combined in some implementations. For convenience, this flowchart is described with reference to the system that carries out a method. The system is not necessarily part of the method.

At action 2122, a passive testing program is conducted. Passive testing of the network can be conducted using a containerized test case that monitors regular network traffic (e.g., does not generate specific test traffic). Passive monitoring can be initiated at installation, in response to a triggering event, such as a scheduler process activation, or occurrence of specific detected events affecting the network (e.g., installation of new equipment) or combinations thereof.

At action 2124, based on a result of the passive testing program, a determination is made whether to conduct active testing.

At action 2126, if it is determined to conduct active testing, an appropriate active testing program is instantiated and run to obtain a second result.

At action 2128, based on the second result, a determination can be made whether to conduct further active testing, return to passive testing, schedule an onsite service visit to conduct more invasive or extensive testing, ship replacement equipment to the site or combinations thereof. Such flexible and layered testing architectures provide the device, after installation to the home network, with the ability to execute the test set(s) responsive to one or multiple triggering inputs, detection of event(s) or combinations thereof.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In an example implementation, a new network component is installed to the network. The network component can be an upgrade, new installation or a replacement of a prior failing component. A determination can be made to conduct passive testing program for some period of time to verify the performance of the new component. For example, a component failure can be identified using active testing program; one or more failing components can be replaced and a passive testing program initiated to verify the service has successfully repaired the problem by replacing the unit.

Computer System

Figure 23:
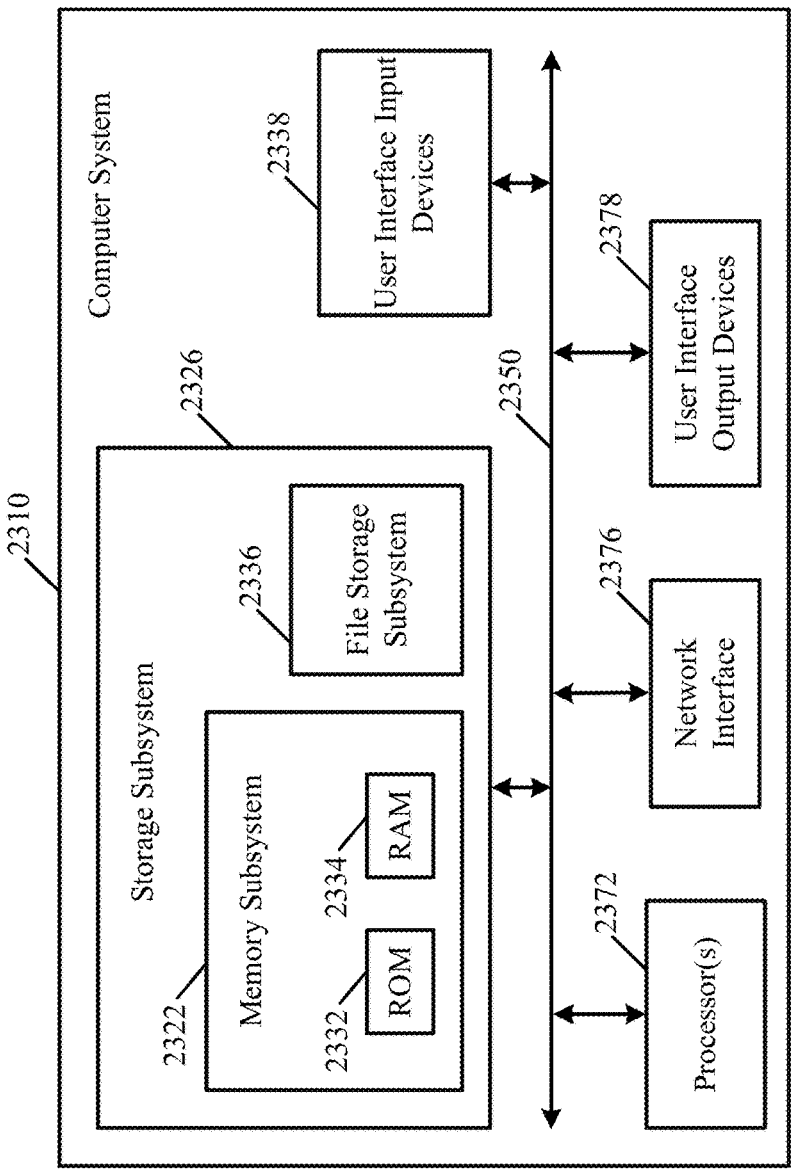
FIG. 23 illustrates a block diagram of hardware implementation for an example MoCA device.

FIG. 23 is a block diagram of an example computer system 2300 that can implement device hardware 1910 of FIG. 19. FIG. 23 is a block diagram of an example networked device, implemented as a computer system according to one implementation. The processor can be an ASIC or RISC processor. It can be an FPGA or other logic or gate array. It can include graphic processing unit (GPU) resources. Computer system 2310 typically includes at least one processor 2372 that communicates with a number of peripheral devices via bus subsystem 2350. These peripheral devices may include a storage subsystem 2326 including, for example, memory devices and a file storage subsystem, user interface input devices 2338, user interface output devices 2378, and a network interface subsystem 2376. The input and output devices allow user interaction with computer system 2310. Network interface subsystem 2376 provides an interface to outside networks, including an interface to corresponding interface devices in other computer systems.

User interface input devices 2338 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2310.

User interface output devices 2378 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 2310 to the user or to another machine or computer system.

Storage subsystem 2324 stores programming and data constructs that provide the functionality of some or all of the modules and methods described herein. These software modules are generally executed by processor 2372 alone or in combination with other processors.

Memory 2322 used in the storage subsystem can include a number of memories including a main random access memory (RAM) 2334 for storage of instructions and data during program execution and a read only memory (ROM) 2332 in which fixed instructions are stored. A file storage subsystem 2336 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2336 in the storage subsystem 2326, or in other machines accessible by the processor.

Bus subsystem 2350 provides a mechanism for letting the various components and subsystems of computer system 2310 communicate with each other as intended. Although bus subsystem 2350 is shown schematically as a single bus, alternative implementations of the bus subsystem may use multiple busses.

Computer system 2310 can be of varying types including a workstation, server, computing cluster, blade server, server farm, or any other data processing system or computing device. Due to the ever-changing nature of computers and networks, the description of computer system 2310 depicted in FIG. 23 is intended only as one example. Many other configurations of computer system 2310 are possible having more or fewer components than the computer system depicted in FIG. 23.

Particular Implementations

In one implementation, a method of removing latency in performance tests conducted on an in home network by deployable containerized tests is described. The method can be used to diagnose faults in a multimedia over coax alliance (MoCA) local area network (LAN) coupled to a wide area network (WAN) using devices already existing as part of the MoCA network, e.g., without the addition of special purpose test devices. In one implementation, existing device(s) on the MoCA network include a processor coupled to a tangible computer readable storage medium that stores computer instructions. The computer instructions, when executed, cause the processor to perform the method. The method includes deploying a test onto an active element of the home network via a network interface. Tests are deployed on the device as part of the manufacturing process or downloaded by a central office via a network connection after installation of the device to the MoCA. Tests can be containerized into an open platform distributed system container. The open platform system container shares a single instance of an operating system with one or more other containers. Executing the test generates traffic that is sent to one or more other active elements in the home network that provide responses to the active element. The responses are retrieved from a ring buffer managed by the operating system of the device hosting the containerized test by directly accessing a mapped memory portion implementing the ring buffer. The retrieving of the responses from the ring buffer by directly accessing the mapped memory portion implementing the ring buffer enables the responses to be retrieved with less latency than retrieving responses using system calls.

In some implementations a container manager can provide interface between the operating system and the open platform distributed system container executing the test. For example, the container manager can provide access to the ring buffer to the test case.

In some implementations the ring buffer can be shared between the operating system and the open platform distributed system container executing the test.

Some implementations also include introducing the test to the home network via a home network access point.

Some implementations also include dispatching a service representative to conduct further testing when the test provides results indicating a need for on-site service.

In some implementations the test can conduct a test of the home network for WiFi interference. In some implementations the test can conduct a test of the home network for packet loss. In some implementations the test can conduct a test of the home network for loopback support. In some implementations the test can conduct a test of the home network for Two-Way Active Measurement Protocol (TWAMP). In some implementations the test can conduct a preemptive testing regimen on the home network. In some implementations, preemptive testing can include packet loss testing, speed tests, and others.

In another implementation, a method of provisioning containerized test sets onto devices being configured as active elements for use in a MoCA network is described. The method can be used to provision tests sets that diagnose faults onto devices for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test set to be provisioned onto the devices being configured for a multimedia over coax alliance (MoCA) local area network (LAN). A connection is established to one device selected from the devices being configured according to the order. The test set is provisioned onto the one device prior to installation of the one device into a home network. Such provisioning can enable the device, after installation to the home network, to execute the test set responsive to a triggering input made via a network interface substantially independently of further intervention.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a further implementation, a method of provisioning devices being configured as active elements for use in a MoCA network is described. The method can be used to provision devices to receive containerized tests sets that diagnose faults for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test application manager to be provisioned onto the devices being configured for a multimedia over coax alliance (MoCA) local area network (LAN). A connection is established to one device selected from the devices being configured according to the order. The test application manager is provisioned onto the one device prior to installation of the one device into a home network. Such provisioning can enable the device, after installation to the home network, to execute the test application manager to receive a containerized test case via a network interface responsive to a triggering input.

Some implementations also can enable the device, after installation to the home network, to execute the test application manager to delete the containerized test case and install instead a second containerized test case received via the network interface responsive to a second triggering input.

Some implementations also can enable the device, after installation to the home network, to execute the test application manager to detect a faulty containerized test case installation; and delete the containerized test case at fault.

Some implementations also can enable the device, after installation to the home network to execute the application manager to install instead of the detected containerized test case at fault, a prior containerized test case thereby recovering from the detected containerized test case fault by reverting to a previous containerized test case.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a yet further implementation, a method of conducting testing using containerized test sets installed to devices configured as active elements for use in a MoCA network is described. The method can be used to conduct testing that diagnoses faults in connections and/or devices used in a multimedia over coax alliance (MoCA) local area network (LAN) coupled to a wide area network (WAN) as part of the MoCA network, e.g., without the addition of special purpose test devices. In one implementation, a passive testing program is conducted using a containerized test case that monitors regular network traffic (e.g., does not generate specific test traffic). Based on a result of the passive testing program, a determination is made whether to conduct active testing. If it is determined to conduct active testing, an appropriate active testing program is instantiated and run to obtain a second result. Based on the second result, a determination can be made whether to conduct further active testing, or return to passive testing, or schedule an onsite service visit to conduct more invasive or extensive testing, or ship replacement equipment to the site or combinations thereof.

In some implementations the passive monitoring is initiated at installation time. In some implementations the passive monitoring is initiated in response to a triggering event. In some implementations the passive monitoring is triggered by a scheduler process activation. In some implementations the passive monitoring is triggered by occurrence of a specific detected event affecting the network. In some implementations the specific event includes installation of new equipment.

In an implementation, test cases can be deployed, invoked, changed, deleted or otherwise managed by transactions conforming all or in part with a standardized protocol, such as CPE WAN Management Protocol (CWMP) published by the Broadband Forum as technical specification TR-069 for remote management of end-user devices. The TR-069 describes a protocol that addresses the growing number of different Internet access devices such as modems, routers, gateways, as well as end-user devices which connect to the Internet, such as set-top boxes and VoIP-phones.

In one implementation, a method for troubleshooting a pixelated video image transmitted over a Multimedia over Coax Alliance (MoCA) LAN is described from the perspective of a probing device. The method includes automatically iterating over a plurality of MoCA devices discovered on the MoCA LAN and transmitting packets to each of the discovered devices. The packets require a response from each of the devices. Packets are transmitted to the devices concurrently such that first and second packets are transmitted to a first device and a third packet is transmitted to a second device in between transmission of the first and second packet. The disclosed method includes detecting a number of lost packets that did not receive a required response from at least one packet-dropping device among the plurality of MoCA devices and reporting identities of one or more packet-dropping devices that have packet loss rates exceeding a preconfigured threshold.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The probing device may join the MoCA LAN by establishing point-to-point communication channels with other devices on a MoCA network that includes a home router that couples the MoCA LAN in communication with a WAN. The probing device may discover IP devices on the MoCA LAN by sending probe packets to IP addresses within a configured range of addresses and receiving a response to each probe packet that includes an IP address and the MAC address of each device. The list of discovered IP devices may be filtered based on the MAC address of each device in the list so that only IP addresses of devices having a MAC address known to be on the MoCA LAN remain on the list. A discovered device may be a set-top box, a digital video recorder (DVR) set-top box, or a television.

In an alternative implementation, the probe device replaces the home router in the network, assuming its role by receiving DHCP requests and responding to the DHCP requests by sending an available IP address in the network.

In another implementation, a test controller device may connect to a separate probing device and causing the probing device to perform the automatically iterating, transmitting packets, and detecting lost packets actions. In addition, the test controller device may receive packet loss data from the probing device detecting the number of lost packets. The test controller may report identities of one or more packet-dropping devices.

The test controller device may connect to the probing device over an Ethernet physical port, and packets may be transmitted over an Ethernet connection through a broadband home router (BHR) on the MoCA LAN. The test controller device may receive from the probing device addresses of MoCA devices on the MoCA network.

In an implementation, at least 10,000 packets may be transmitted over the MoCA LAN to each of the plurality of discovered devices. A predetermined threshold for packet loss may be configured by a user before packets are transmitted. The packet loss may be determined as a proportion of the number of packets sent. The identity of and packet loss rate for each of the plurality of discovered devices may be reported.

Other implementations may include a probing device that includes a processor, network interface, and storage device storing instructions for performing variations of the disclosed method.

Another implementation is a test controller device that includes a processor, network interface, and storage device storing instructions for connecting to a probing device and causing the probing device to perform automatically iterating over discovered devices, transmitting packets, and detecting lost packets, receiving from the probing device packet loss data from detecting the number of lost packets, and reporting identities of one or more packet-dropping devices.

Yet other implementations include a non-transitory computer readable storage medium storing instructions executable by a processor to perform any of the methods described above.

In one implementation, a device is described that will often be operated by a cable network dispatched service person. This device can be used to diagnose faults in a multimedia over coax alliance (MoCA) local area network (LAN) coupled to a wide area network (WAN). The device includes test hardware that implements MoCA protocols coupled to at least one coaxial fitting and a processor coupled to the test hardware and to a tangible computer readable storage medium storing computer instructions. The computer instructions, when executed, cause the processor to perform an expert system method. Responsive to selection of a test sequence, the expert system method including repeatedly causing display of multiple instructional images, invoking the test hardware to perform a test, automatically evaluating results returned by the test hardware, and either reporting a result or initiating an additional test. Often, the operator will select the test sequence. At least two test sequences for diagnosing multi room DVR's and for data speed access to the WAN are described and illustrated above. On this device, the multiple instructional images depict how an operator manually couples the test hardware in connection with MoCA components of the LAN in a position that isolates a portion of the LAN for evaluation. The multiple instructional images can be animated.

Invoking the test hardware, includes selecting a test to perform from the test sequence, without intervening user selection of the test from the test sequence. In the examples above, multiple tests or test steps are included in a test sequence. The sequence of tests is designed to Ron without user selection of individual test in the test sequence. Running the test from the test sequence invokes the test hardware with parameters that control interaction with the MoCA components, for MoCA-related tests.

Evaluating results returned by the test hardware, includes using evaluation criteria of the test sequence, without user interpretation of the results returned, to determine whether to report a recommendation to replace or repair an identified component. Having the device evaluate results returned by the test hardware relieves the operator of the need to understand technical details of test protocols and of the need to understand acceptable and unacceptable test results. It also relieves the operator of the need to choose the next test to perform in a test sequence. Alternatively, the device can determine to repeat the cycle above, including the causing display of multiple instructional images and, for an additional physical location in the LAN, the invoking the test hardware to perform an additional test, and the automatically evaluating results returned by the additional test.

In the course the test sequence, the device can instruct an operator to move the device from one physical location in the LAN to another, isolating segments to evaluate. Both active and passive elements of the LAN can be evaluated.

In one implementation, the device proceeds as determined and makes a report or repeats the cycle described above to perform an additional test in the test sequence. The report can be to the operator on a display.

This device and other implementations of the technology disclosed can include one or more of the following features and/or features described in connection with additional implementations disclosed. In the interest of conciseness, the potential combinations of features disclosed in this application are not individually enumerated and are not repeated with each base set of features. The reader will understand how features identified in this section can readily be combined with the sets of these features identified for other implementations such as Wi-Fi testing or generally for testing a local area network.

The test sequence operating on the device can include at least one test or step that tests connection of the LAN to the WAN. In this LAN-to-WAN test, the multiple instructional images depict how an operator manually couples the test hardware in connection with the WAN in a position that isolates the LAN from the WAN for evaluation. Invoking the test hardware involves the device automatically selecting a test to perform from the test sequence, without intervening user selection of the test from the test sequence, and invoking the test hardware with parameters that control interaction with the WAN. The evaluation of results returned by the test hardware involves using evaluation criteria of the test sequence, without user interpretation of the results returned, to determine whether to report an evaluation of the WAN link.

The test hardware and/or computer instructions can further implement emulation of a variety of active devices on the MoCA LAN. Devices emulated include one or more of a basic home router, a set top box, and a digital video recorder. It also can include a MoCA to Ethernet adapter or a MoCA to Wi-Fi adapter. We refer to the test hardware and/or computer instructions because there is not going migration from hardware and firmware implemented technologies to software defined technologies running on hardware. For instance, software defined radios and software defined networks are now available. This term is not meant to include software per se, for US patent purposes.

In another feature, the device can test a Wi-Fi link on the LAN. In this context, link means a wireless connection between two antennas. Typically, this link is broadcast on particular channel using a particular SSID. The user may be asked to select the SSID of the link to test. This feature can include test hardware that implements WiFi protocols and is coupled to an antenna.

This feature includes computer instructions that implement at least one pair of WiFi steps in the test sequence tests a WiFi link on the LAN, and that pair of WiFi steps optionally includes user selection of a particular WiFi link to test. A pair of steps test the Wi-Fi link in both directions. For the pair of WiFi steps, the elements described above are applied to Wi-Fi instead of MoCA. The multiple instructional images depict how an operator manually couples the test hardware in connection with a wired component and a wireless component of the LAN in a position that isolates a portion of the LAN for evaluation. Invoking the test hardware includes selecting a test (or pair of tests) to perform from the test sequence, without intervening user selection of the test from the test sequence. Performing the test invokes the test hardware with parameters that control interaction with the wireless component. Evaluating results returned by the test hardware includes using evaluation criteria of the test sequence, without user interpretation of the results returned, to determine whether to report an evaluation of the WiFi link. A detailed evaluation of the Wi-Fi link may be reserved for a failed test. Evaluation may include recommended remediation steps.

As above, the test hardware and/or computer instructions can further implement emulation of a variety of active devices on the MoCA LAN.

Test hardware can provide RF capabilities and implement a monitor mode access to MoCA hardware for packet and signal statistics. The device configured to provide protocol level access to MoCA commands for network survey. Passive components of the MoCA network can include coaxial cable and splitters. The test hardware can rapidly sequence multiple tests, more quickly than if an operator were selecting, starting in evaluating the tests. The test device described can be embedded in another device, such as a general-purpose network analyzer. Tests performed using the device can include a packet loss test, an RF single channel test, a Wi-Fi quick test, and a speed test. The device can be configured to identify passive network components, for instance, by reflectometry.

The technology disclosed also can be described as a method of diagnosing faults in a multimedia over coax alliance (MoCA) local area network (LAN) coupled to a wide area network (WAN). The method implementation generally follows the outline of actions carried out by the device described above. These actions necessarily are performed on digital hardware, such as test hardware and processors. In a method implementation, running on a processor, responsive to selection of a test sequence, the method running include a processor, including repeatedly causing display of multiple instructional images, invoking test hardware to perform a test, automatically evaluating results returned by the test hardware, and either reporting a result or initiating an additional test. The method, actions are generally as described above.

The multiple instructional images depict how an operator manually couples the test hardware in connection with MoCA components of the LAN in a position that isolates a portion of the LAN for evaluation.

Invoking the test hardware involves selecting a test to perform from the test sequence, without intervening user selection of the test from the test sequence, and invokes the test hardware with parameters that control interaction with the MoCA components.

Evaluating results returned by the test hardware uses evaluation criteria of the test sequence, without user interpretation of the results returned, to determine whether to report a recommendation to replace or repair an identified component, or to repeat the causing display of multiple instructional images and, for an additional physical location in the LAN, the invoking the test hardware to perform an additional test, and the automatically evaluating results returned by the additional test.

Some implementations include proceeding as determined with the report or the repeat.

Features of the method can include most or all of the features of the device implementation described above and additional features described throughout this disclosure. For the sake of brevity, we forgo repeating those features and instead incorporate them by reference.

The technology disclosed also can be practiced as a tangible computer readable media impressed with computer instructions that, when executed on a processor, cause the processor and the test hardware to carry out the method described above for, when combined with appropriate hardware and processor, produce the device described above. Again, features implemented using the tangible computer readable media can include most or all of the features of the device implementation described above and additional features described throughout this disclosure.

In jurisdictions outside the United States, the technology disclosed also can be practiced as software per se or as computer instructions carried by electromagnetic transmission. For claim purposes, tangible computer readable media is not intended to extend to software per se or computer instructions carried by electromagnetic transmission without a tangible media that persists the computer instructions well beyond signal transit time.

The technology disclosed also can implement a device to diagnose faults in a multimedia over at least one WiFi segment of a local area network (LAN) coupled to a wide area network (WAN). In this implementation, the test hardware implements WiFi and LAN protocols, and is coupled to a wired connector and to an antenna. This device further includes a processor coupled to the test hardware and to a tangible computer readable storage medium storing computer instructions, the computer instructions that cause the processor to perform an expert system method, responsive to selection of a test sequence, the expert system method including repeatedly causing display of multiple instructional images, invoking the test hardware to perform a test, automatically evaluating results returned by the test hardware, and either reporting a result or initiating an additional test. The actions applied above to testing MoCA segments of a LAN are adapted in this implementation to testing Wi-Fi segments. In this implementation, at least one pair of WiFi steps in the test sequence tests a WiFi link on the LAN, and that pair of WiFi steps optionally includes user selection of a particular WiFi link to test.

The multiple instructional images depict how an operator manually couples the test hardware in connection with a wired component and, for at least a pair of tests, also to a wireless component of the LAN in a position that isolates a portion of the LAN for evaluation.

Invoking the test hardware, selects a test to perform from the test sequence, without intervening user selection of the test from the test sequence, and invokes the test hardware with parameters that control interaction with the LAN components.

Evaluating results returned by the test hardware, uses evaluation criteria of the test sequence, without user interpretation of the results returned, to determine whether to report a recommendation to replace or repair an identified component, or to repeat the causing display of multiple instructional images and, for an additional physical location in the LAN, the invoking the test hardware to perform an additional test, and the automatically evaluating results returned by the additional test.

Some implementations further include proceeding as determined with the report or the repeat.

Features of the Wi-Fi testing implementation can include most or all of the features of the MoCA testing implementation described above and additional features described throughout this disclosure. For the sake of brevity, we forgo repeating those features and instead incorporate them by reference.

The Wi-Fi testing implementation most of be practiced as a method or as a tangible computer readable media impressed with computer instructions. The computer instructions and either, when executed, implement any of the methods described, for when combined with suitable hardware and processor, produce any devices described. Once again, the features described above can be combined with the Wi-Fi testing implementation. For the sake of brevity, the features are incorporated by reference, instead of being repeated.

In one implementation, a method of removing latency in performance tests conducted on an in home network by deployable containerized tests is described. The method can be used to diagnose faults in a multimedia over coax alliance (MoCA) local area network (LAN) coupled to a wide area network (WAN) using devices already existing as part of the MoCA network, e.g., without the addition of special purpose test devices. In one implementation, existing device(s) on the MoCA network include a processor coupled to a tangible computer readable storage medium that stores computer instructions. The computer instructions, when executed, cause the processor to perform the method. The method includes deploying a test onto an active element of the home network via a network interface. Tests are deployed on the device as part of the manufacturing process or downloaded by a central office via a network connection after installation of the device to the MoCA. Tests can be containerized into an open platform distributed system container. The open platform system container shares a single instance of an operating system with one or more other containers. Executing the test generates traffic that is sent to one or more other active elements in the home network that provide responses to the active element. The responses are retrieved from a ring buffer managed by the operating system of the device hosting the containerized test by directly accessing a mapped memory portion implementing the ring buffer. The retrieving of the responses from the ring buffer by directly accessing the mapped memory portion implementing the ring buffer enables the responses to be retrieved with less latency than retrieving responses using system calls.

In some implementations a container manager can provide interface between the operating system and the open platform distributed system container executing the test. For example, the container manager can provide access to the ring buffer to the test case.

In some implementations the ring buffer can be shared between the operating system and the open platform distributed system container executing the test.

Some implementations also include introducing the test to the home network via a home network access point.

Some implementations also include dispatching a service representative to conduct further testing when the test provides results indicating a need for on-site service.

In some implementations the test can conduct a test of the home network for WiFi interference. In some implementations the test can conduct a test of the home network for packet loss. In some implementations the test can conduct a test of the home network for loopback support. In some implementations the test can conduct a test of the home network for Two-Way Active Measurement Protocol (TWAMP). In some implementations the test can conduct a preemptive testing regimen on the home network. In some implementations, preemptive testing can include packet loss testing, speed tests, and others.

In another implementation, a method of provisioning containerized test sets onto devices being configured as active elements for use in a MoCA network is described. The method can be used to provision tests sets that diagnose faults onto devices for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test set to be provisioned onto the devices being configured for a multimedia over coax alliance (MoCA) local area network (LAN). A connection is established to one device selected from the devices being configured according to the order. The test set is provisioned onto the one device prior to installation of the one device into a home network. Such provisioning can enable the device, after installation to the home network, to execute the test set responsive to a triggering input made via a network interface substantially independently of further intervention.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a further implementation, a method of provisioning devices being configured as active elements for use in a MoCA network is described. The method can be used to provision devices to receive containerized tests sets that diagnose faults for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test application manager to be provisioned onto the devices being configured for a multimedia over coax alliance (MoCA) local area network (LAN). A connection is established to one device selected from the devices being configured according to the order. The test application manager is provisioned onto the one device prior to installation of the one device into a home network. Such provisioning can enable the device, after installation to the home network, to execute the test application manager to receive a containerized test case via a network interface responsive to a triggering input.

Some implementations also can enable the device, after installation to the home network, to execute the test application manager to delete the containerized test case and install instead a second containerized test case received via the network interface responsive to a second triggering input.

Some implementations also can enable the device, after installation to the home network, to execute the test application manager to detect a faulty containerized test case installation; and delete the containerized test case at fault.

Some implementations also can enable the device, after installation to the home network to execute the application manager to install instead of the detected containerized test case at fault, a prior containerized test case thereby recovering from the detected containerized test case fault by reverting to a previous containerized test case.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a yet further implementation, a method of conducting testing using containerized test sets installed to devices configured as active elements for use in a MoCA network is described. The method can be used to conduct testing that diagnoses faults in connections and/or devices used in a multimedia over coax alliance (MoCA) local area network (LAN) coupled to a wide area network (WAN) as part of the MoCA network, e.g., without the addition of special purpose test devices. In one implementation, a passive testing program is conducted using a containerized test case that monitors regular network traffic (e.g., does not generate specific test traffic). Based on a result of the passive testing program, a determination is made whether to conduct active testing. If it is determined to conduct active testing, an appropriate active testing program is instantiated and run to obtain a second result. Based on the second result, a determination can be made whether to conduct further active testing, or return to passive testing, or schedule an onsite service visit to conduct more invasive or extensive testing, or ship replacement equipment to the site or combinations thereof.

In some implementations the passive monitoring is initiated at installation time. In some implementations the passive monitoring is initiated in response to a triggering event. In some implementations the passive monitoring is triggered by a scheduler process activation. In some implementations the passive monitoring is triggered by occurrence of a specific detected event affecting the network. In some implementations the specific event includes installation of new equipment.

In an implementation, test cases can be deployed, invoked, changed, deleted or otherwise managed by transactions conforming all or in part with a standardized protocol, such as CPE WAN Management Protocol (CWMP) published by the Broadband Forum as technical specification TR-069 for remote management of end-user devices. The TR-069 describes a protocol that addresses the growing number of different Internet access devices such as modems, routers, gateways, as well as end-user devices which connect to the Internet, such as set-top boxes and VoIP-phones.

In one implementation, containerized tests are configured and deployed according to a protocol standard. A standard setting body called Cable Labs specifies an example protocol for use with Linux and Docker in some implementations. In one implementation, a "Virtual Home Network", is provided that includes moving router functionality into a computing "cloud." Docker implementations can include an API framework to create containers. Linux allows access by a container to hardware for testing.

In some implementations Kubernetes, an environment that executes on Docker provided by Google, or other equivalent environment, can be employed to manage a cluster of Linux containers. Some implementations also include a development environment. Some implementations are compatible with the Apple Mac.

In an implementation, a method of removing latency in performance tests conducted on a home network by deployable containerized tests is described. The method can include the method include deploying a test onto an active element of the home network via a network interface, the test containerized into an open platform distributed system container that shares with one or more other containers a single instance of an operating system; executing the test to generate traffic and sending the traffic to one or more other active elements in the home network that provide responses to the active element; and retrieving the responses from a first-in, first-out (FIFO) ordered storage managed by the operating system by directly accessing a mapped memory portion implementing the first-in, first-out (FIFO) ordered storage, whereby the retrieving the responses from the first-in, first-out (FIFO) ordered storage by directly accessing the mapped memory portion implementing the first-in, first-out (FIFO) ordered storage enables the responses to be retrieved with less latency than retrieving responses using system calls.

In an implementation a container manager provides interface between the operating system and the open platform distributed system container executing the test.

In an implementation the container manager provides access to the first-in, first-out (FIFO) ordered storage to the test.

In an implementation the first-in, first-out (FIFO) ordered storage is shared between the operating system and the open platform distributed system container executing the test.

In an implementation the method can include introducing the test to the home network via a home network access point.

In an implementation the method can include dispatching a service representative to conduct further testing when the test provides results indicating a need for on-site service.

In an implementation the test conducts testing of the home network for WiFi interference.

In an implementation the test conducts testing of the home network for packet loss.

In an implementation the test conducts testing of the home network for loopback support.

In an implementation the test conducts testing of the home network for Two-Way Active Measurement Protocol (TWAMP).

Similar system and non-transitory computer-readable storage medium implementations are also provided.

What is claimed is:

1. A method of performing a test on a network, the method including:
deploying a test onto an active element of the network, the test being deployed as a distributed system container, the test including one or more tests that test (i) the network for WiFi interference, (ii) the network for packet loss, (iii) the network with loopback support and (iv) the network with Two-Way Active Measurement Protocol (TWAMP);
the distributed container executing the test to generate data and to send the data to one or more other active elements in the network that provide responses to the active element; and
retrieving the responses from a storage by directly accessing a memory, whereby the retrieving of the responses from the storage by directly accessing the memory enables the responses to be retrieved with less latency than retrieving responses using system calls.

2. The method of claim 1, further including a container manager providing interface between an operating system shared by one or more distributed system containers and the distributed system container executing the test.

3. The method of claim 1, further including introducing the test to the network via a network access point.

4. The method of claim 1, wherein the storage is a first-in, first-out (FIFO) ordered storage managed by an operating system.

5. The method of claim 4, a container manager, interfacing between an operating system shared by one or more distributed system containers and the distributed system container executing the test, provides access to the FIFO ordered storage to the test.

6. The method of claim 4, wherein the FIFO ordered storage is shared between an operating system shared by one or more distributed system containers and the distributed system container executing the test.

7. The method of claim 1, further including dispatching a service representative to conduct further testing when the test provides results indicating a need for on-site service.

8. The method of claim 1, wherein the storage is shared by the distributed system container.

9. The method of claim 1, wherein the test includes two or more tests that test at least two of (i) the network for WiFi interference, (ii) the network for packet loss, (iii) the network with loopback support and (iv) the network with Two-Way Active Measurement Protocol (TWAMP).

10. The method of claim 1, wherein the active element of the network is one of a switching device and a routing device.

11. A non-transitory computer-readable recording medium having computer instructions recorded thereon for performing a test on a network, the computer instructions, when executed on one or more processors, causing the one or more processors to implement operations comprising:
deploying a test onto an active element of the network, the test being deployed as a distributed system container, the test including one or more tests that test (i) the network for WiFi interference, (ii) the network for packet loss, (iii) the network with loopback support and (iv) the network with Two-Way Active Measurement Protocol (TWAMP);

the distributed container executing the test to generate data and to send the data to one or more other active elements in the network that provide responses to the active element; and retrieving the responses from a storage by directly accessing a memory, whereby the retrieving of the responses from the storage by directly accessing the memory enables the responses to be retrieved with less latency than retrieving responses using system calls.

12. A system including one or more processors coupled to memory, the memory loaded with computer instructions to perform a test on a network, the computer instructions, when executed on the one or more processors, causing the one or more processors to implement actions comprising:

deploying a test onto an active element of the network, the test being deployed as a distributed system container, the test including one or more tests that test (i) the network for WiFi interference, (ii) the network for packet loss, (iii) the network with loopback support and (iv) the network with Two-Way Active Measurement Protocol (TWAMP);

the distributed container executing the test to generate data and to send the data to one or more other active elements in the network that provide responses to the active element; and retrieving the responses from a storage by directly accessing a memory, whereby the retrieving of the responses from the storage by directly accessing the memory enables the responses to be retrieved with less latency than retrieving responses using system calls.

* * * * *